United States Patent
Sne et al.

[11] Patent Number: 5,890,207
[45] Date of Patent: Mar. 30, 1999

[54] HIGH PERFORMANCE INTEGRATED CACHED STORAGE DEVICE

[75] Inventors: Gal Sne, Wellesley; Victor Wai Ner Tung, Shrewsbury; Stephen Lawrence Scaringella, Natick, all of Mass.

[73] Assignee: EMC Corporation, Hopkinton, Mass.

[21] Appl. No.: 757,226

[22] Filed: Nov. 27, 1996

[51] Int. Cl.[6] .................................................... G11B 17/22
[52] U.S. Cl. ........................... 711/113; 711/114; 711/140; 711/169; 395/182.04
[58] Field of Search ..................................... 711/113, 114, 711/140, 169; 395/182.04, 185.07, 200.31

[56] References Cited

U.S. PATENT DOCUMENTS

| | | | |
|---|---|---|---|
| 5,233,694 | 8/1993 | Hotta et al. .............................. | 395/375 |
| 5,471,598 | 11/1995 | Quattromano et al. ................. | 395/449 |
| 5,490,261 | 2/1996 | Bean et al. .............................. | 395/448 |
| 5,504,861 | 4/1996 | Crockett et al. ........................ | 395/182 |
| 5,517,662 | 5/1996 | Coleman et al. .................. | 395/200.31 |
| 5,544,347 | 8/1996 | Yanai et al. ............................. | 395/489 |
| 5,557,763 | 9/1996 | Senter et al. ............................ | 395/375 |
| 5,590,309 | 12/1996 | Chencinski et al. .................... | 395/472 |
| 5,617,347 | 4/1997 | Lauritzen .................................. | 365/49 |
| 5,617,559 | 4/1997 | Le et al. .................................. | 395/496 |
| 5,619,664 | 4/1997 | Glew ....................................... | 395/394 |

*Primary Examiner*—Eddie P. Chan
*Assistant Examiner*—Hong C. Kim
*Attorney, Agent, or Firm*—Brian L. Michaelis

[57] ABSTRACT

An integrated cached disk array includes host to global memory (front end) and global memory to disk array (back end) interfaces implemented with dual control processors configured to share substantial resources. Each control processor is responsible for 2 pipelines and respective Direct Multiple Access (DMA) and Direct Single Access (DSA) pipelines, for Global Memory access. Each processor has its own Memory Data Register (MDR) to support DMA/DSA activity. The dual processors each access independent control store RAM, but run the same processor independent control program using an implementation that makes the hardware appear identical from both the X and Y processor sides. Pipelines are extended to add greater depth by incorporating a prefetch mechanism that permits write data to be put out to transceivers awaiting bus access, while two full buffers of assembled memory data are stored in Dual Port Ram and memory data words are assembled in pipeline gate arrays for passing to DPR. Data prefetch mechanisms are included whereby data is made available to the bus going from Global Memory on read operations, prior to the bus being available for an actual data transfer. Two full buffers of read data are transferred from Global Memory and stored in DPR while data words are disassembled in the pipeline gate array, independent of host activity. Timing of system operations is implemented such that there is overlap of backplane requests to transfer data to/from memory, memory selection and data transfer functionality.

29 Claims, 31 Drawing Sheets

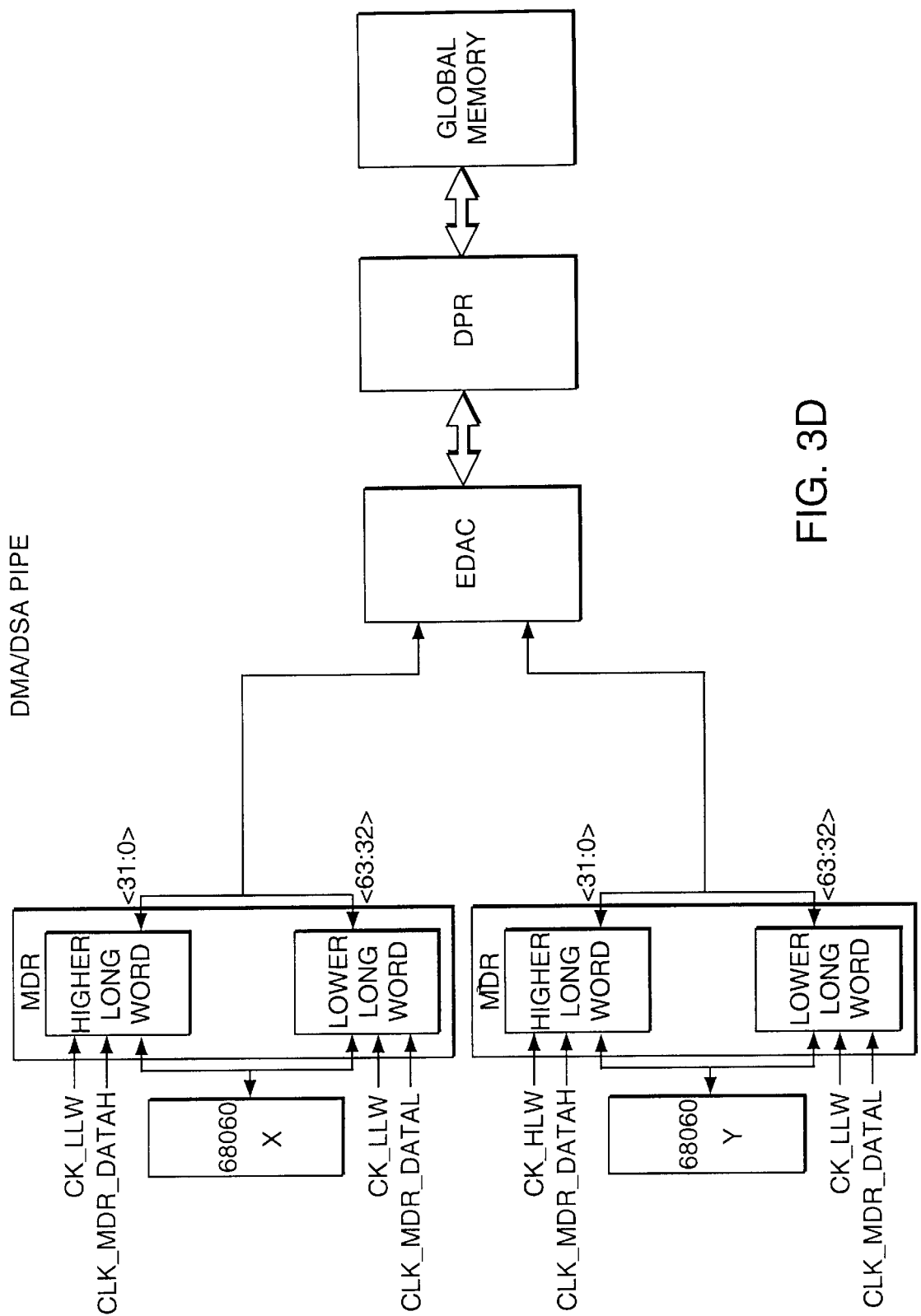

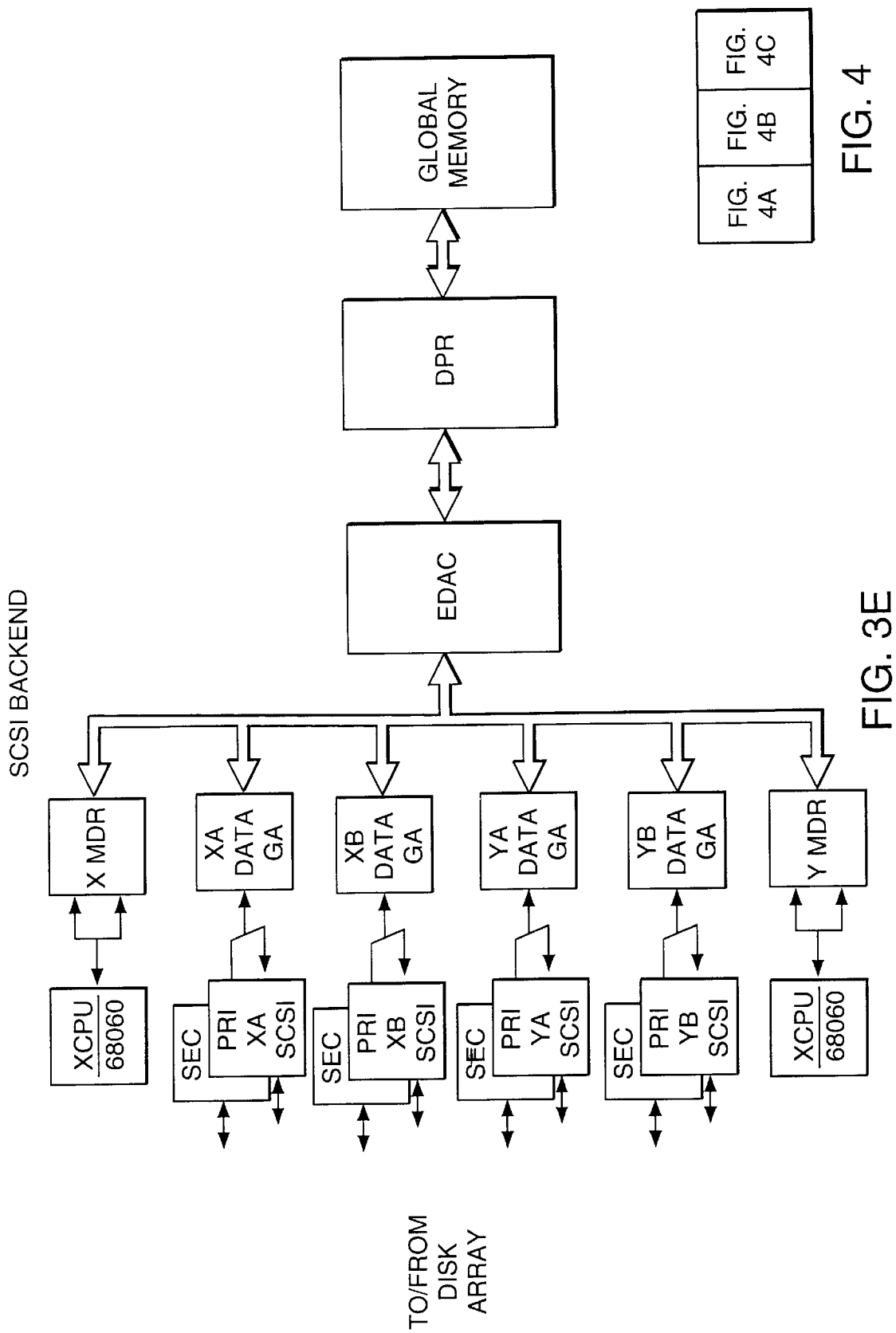

ORBIT G.A.

LOWER MACHINE BLOCK DIAGRAM

LOWER MACHINE FLOW CHART FOR X-SIDE PIPE READ REQUEST

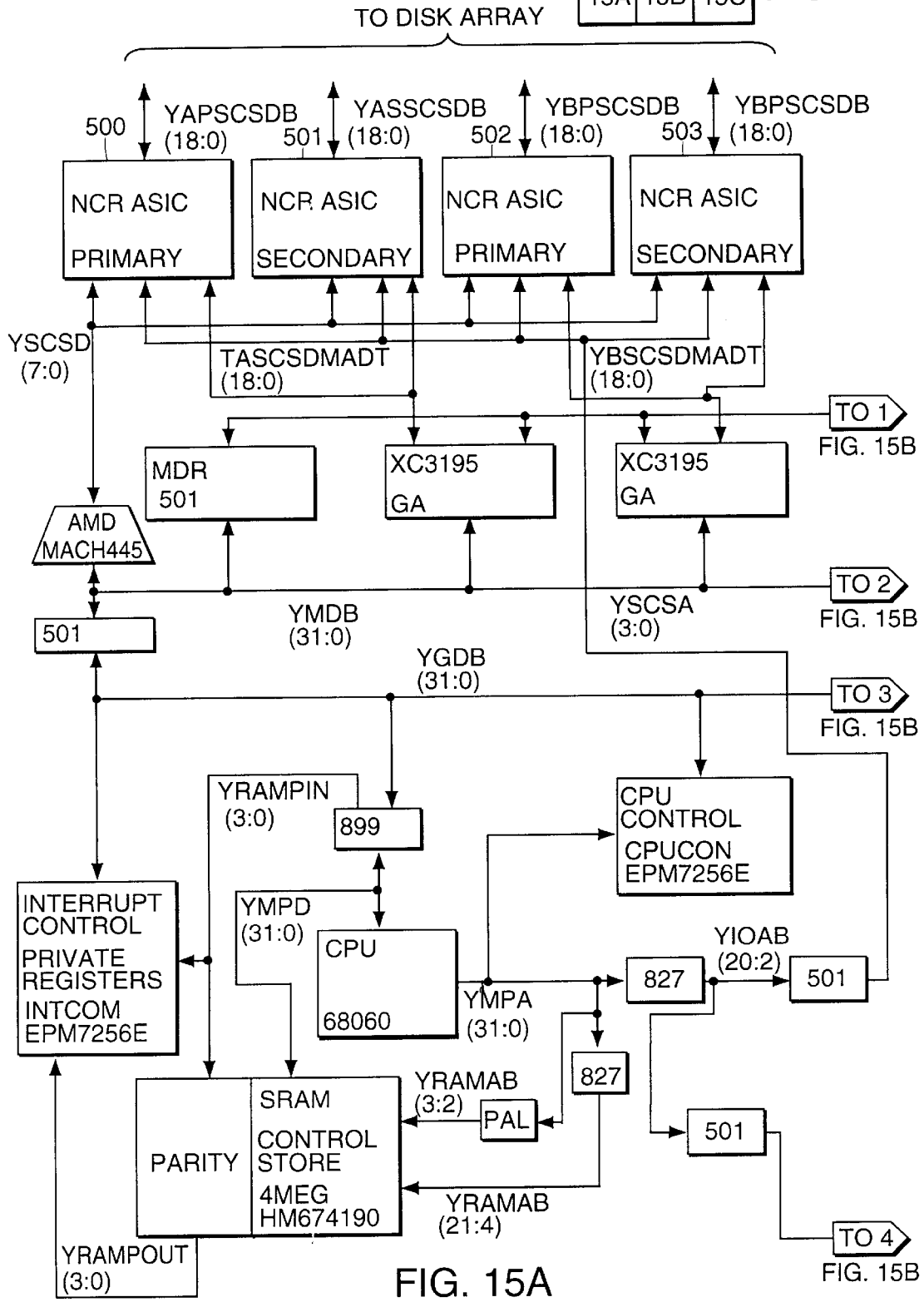

ns of two portions or identical buses designated "A"
HIGH PERFORMANCE INTEGRATED CACHED STORAGE DEVICE

FIELD OF THE INVENTION

The present invention relates to integrated cache storage devices, and more particularly to a high performance integrated cache storage device for high speed, high reliability and high availability data storage.

BACKGROUND OF THE INVENTION

A traditional approach to high performance data storage in modern computer systems has been Direct Access Storage Devices ("DASD"), characterized by a single, large, expensive disk drive ("SLED") attached to a host by some standard interface bus. Included in the numerous drawbacks to this approach is a lack of redundancy in the system which means that data is not available when there is a problem with the drive or media. SLED drive data transfer times tend to be orders of magnitude slower than host system data transfer times. The host is moving data at high performance electronic speeds whereas drive data transfer speeds are limited by disk drive physical constraints such as rotational speed, seek time, etc. Thus, typically, DASD has been a primary factor limiting overall information system operating speeds Solutions to the relative slowness of SLED have been implemented to take advantage of the fact that very often data required from a drive will be located adjacent to the last data read, a phenomenon referred to as "locality of reference", and to take advantage of the fact that in some cases data required will have been accessed previously in a recent data access, a phenomenon known as "data reuse". Such solutions have involved configuring a fast memory buffer or cache between the host and the drive to yield significant improvements in system performance. When the host requests data, more data than has been requested will be fetched ("prefetching") and held in cache in anticipation that the next read will require adjacent data, in which case it can be retrieved very quickly from cache. Similarly on a write, once the host has transferred data to cache the transfer is complete as far as the host is concerned. The data can then be de-staged from cache to the drive at a convenient time.

Known implementations of cache technology in storage systems, include systems referred to as "Integrated Cached Disk Arrays", ("ICDAs"), which replaced the single large expensive disk drive (SLED) with an array of smaller inexpensive disk drives integrated into a single chassis. The high speed caches implemented in ICDAs yielded improved performance. One family of known ICDA products, known as SYMMETRIX produced by EMC Corporation, Hopkinton, Mass., provides a high reliability array of drives and offers great flexibility in terms of performance enhancements such as: mirroring; greater data availability; greater data transfer rates over distributed buses; and various levels of redundancy implemented in systems referred to as "RAID systems" ("Redundant Arrays of Inexpensive Disks").

The EMC² Symmetrix architecture, illustrated in FIG. 1, integrates a high speed cache or global memory between a disk array and a host computer or CPU. The functional elements generally required to integrate the cache include a host-to-cache interface (which in one implementation is an IBM standard Bus and Tag interface referred to as a host "Channel Adapter"—CA), and a cache-to-disk drives interface (which is a Small Computer Systems Interface, "SCSI", referred to as a "Disk Adapter"—DA). The Symmetrix architecture operates under a "cache all" policy, meaning that all transfers, i.e. from the host to the drives or from the drives to the host, go through cache. The principal function of the hardware elements is the movement of data between the host and Global Memory (cache) or between Global Memory and the Disk Drives. The SYMMETRIX family of ICDAs are described in detail in the Symmetrix Product Manuals (for Models 5500, 52XX, 5100, 3500, 32XX and 3100) which are incorporated herein by reference.

The Global Memory Bus (GMB), between the CA and cache and between the DA and cache in Symmetrix, actually consists of two portions or identical buses designated "A" and "B". The use of two buses improves performance and eliminates a possible single point of failure. Plural sets of Channel Adapters and Disk Adapters, which are generically referred to as "Directors" or "Control Units" (CUs), are assigned to a particular bus based on a physical slot number in a system chassis. The number of available slots is a function of the system type within the family, however, all systems use the dual A and B Global Memory Buses with alternate slots on each bus. Even numbered slots are on the A bus portion of the GMB while odd numbered slots are on the B bus. Each system board on the GMB identifies its position in the chassis by reading a 5-bit slot code encoded on the backplane (referred to as the "SLOT ID"). Each bus has independent arbitration and consists of a 32 bit address bus plus 1 parity, a 64 bit data bus with 8 bits of Error Correction Code (ECC) check bits and a number of control lines with parity. The smallest data transfer that may take place over the GMB is 64 bits during each access (however, byte, word and longword operations are performed within a Director).

The Channel interface(s) and SCSI interface(s), i.e. the bus between the host and CAs and between the disk array and CAs respectively, are 8 bit interfaces. Thus each byte received has to be assembled into a 64-bit memory word for transfer to Global memory, i.e. cache. Similarly, 64-bit memory words from Global memory have to be disassembled into bytes for transmission over the SCSI or Channel interfaces. This function is carried out by plural gate arrays located on each Director.

The Symmetrix system is designed around a pipelined architecture. A pipeline or pipe in this system is a registered path along which data is clocked to move it from one location to another. Channel Adapters, implemented on a dedicated board that includes two pipelines of its type, make use of pipeline hardware referred to as the "Channel pipe" which moves data between the host Channel and Global Memory. The Channel pipe stages, illustrated in FIG. 1B, include channel receive and transmit FIFOs that implement the Bus and Tag interface. A channel gate array stage functions to assemble/disassemble 64 bit memory words for byte transfers between the Channel interface and a Dual Port Ram (DPR), via Error Detection and Correction circuitry (EDAC is effected by a standard IDT49C465A.

Disk Adapters make use of pipeline hardware referred to as the "SCSI pipe" (two SCSI pipes per DA board), to move data between the Global Memory and SCSI Disk Drives. The SCSI pipe stages, illustrated in FIG. 1C, include a SCSI interface chip (NCR 53C94) that implements the standard bidirectional interface according to the SCSI protocol. A SCSI gate array stage functions to assemble/disassemble 64 bit memory words for byte transfers between the SCSI chip and Dual Port Ram (DPR), via Error Detection and Correction circuitry.

Each Director includes a Motorola 68030 microprocessor to control its onboard pipelines moving data between the host Channel and Global Memory (if it is a CA), or moving data between the Global Memory and the disk array (if it is a DA). The 68030 microprocessor also requires access to Global Memory, which it can not directly address. Two pipes are provided on each Director to provide facilities for the 68030 to access Global Memory. A Direct Single Access (DSA) pipe facilitates transfers of a single memory word at a time and is typically used for control/status type operations. A Direct Multiple Access (DMA) pipe can transfer from 1 to 8 memory words on each memory access and is thus more efficient for transferring larger blocks of data. The DMA pipe is typically used by the 68030 to transfer large amounts of data for testing/setting up Global Memory.

The principle stages of the DMA/DSA pipes are illustrated in FIG. 1D. A Memory Data Register (MDR) provides a 72 bit wide register set, 64 bit data and 8 bits parity, comprised of upper and lower words that can be independently read or written by the 32 bit 8030 microprocessor. The MDR performs the assembly and disassembly of 6 bit Global Memory words (which is performed by the Gate Arrays in the Channel and SCSI pipes). The MDR is also implemented to facilitate byte swapping for data value compatibility between the data values stored in Global Memory by the host and corresponding data processed according to Motorola 68030 byte conventions. The DMA/DSA pipes include the EDAC stage, the Dual Port RAM, and Global Memory.

The single 68030 processor on each Director is used to control the various pipes moving data to/from Global Memory through the pipe on that Director. Other than the DSA pipe, the pipes with multiple memory word transfer capacity function in a substantially similar manner. Each pipe, except for the DSA pipe, is under the control of a 32 bit (write only) command register which is written by the 68030. Pipe commands are routed to and decoded by data transfer control programmable array logic (PAL), which receives command bits and outputs necessary control lines. Pipe status is maintained in a 32 bit (read only) status register which can be read by the 68030.

In order to keep component counts down and to maximize utilization of circuitry, some components are shared among the pipelines, as illustrated in FIG. 1E. Generally, each pipe has to arbitrate for use of the common hardware. There is independent arbitration for Global Memory, which is shared among all Directors. There is only one MDR on each director for implementing the DMA or DSA pipes for communication between the Global Memory and the 68030, however, the single MDR may be accessed by means of different addresses depending on the pipe being used, i.e. DMA or DSA, or depending on the type of memory operation being performed by the 68030. Each director has only one "flow through" IDT EDAC, and only one DPR.

Dual Port Ram is located on all Directors and is present in all of the data transfer pipes. The DPR serves as a buffer between the Director and the Global Memory. The dual ports to each RAM location facilitate access to each location by different "sides" of the system. One port of the DPR is accessed by a "lower" or "machine side" corresponding to the DPR side accessed by the host, disk array or 68030), and by an "upper" or "global memory side" corresponding to the side accessed by the Global Memory. There is independent arbitration on the "lower" side of the DPR and the "upper" side of the DPR.

Each pipe is allocated a unique block of DPR. Particular locations of DPR are mapped to particular banks/addresses of Global Memory. In using the DPR as a buffer to Global Memory, it is accessed by a system of pointers. An upper pointer points to the upper side and a lower pointer points to the lower side. There is a unique upper and lower pointer for each pipe on a Director, stored in corresponding upper and lower pointer register files. All pointer values are initially loaded by the 68030 executing a control program and Global Memory writes and reads are effected under control thereof. For transfers to Global Memory, ie Global Memory writes, memory words are assembled by the Gate Arrays or MDR and passed to the DPR at the location indicated by the lower pointer. The lower pointer increments until the appropriate sized memory block is written to the DPR (typically 8, sixty four bit memory words). The upper pointer remains unchanged. Transfers from the DPR to the Global Memory commence, typically upon completion of the transfer of the 8 memory words to DPR, whereupon the upper pointer is incremented for each word transfer from DPR to Global Memory. During the transfer to Global Memory, the Gate Array (or MDR depending upon the pipe accessing Global Memory) continues to fill the DPR at the lower/machine side using the lower pointer. For transfers from Global Memory, i.e. Global Memory reads, the processing is effectively the same under control of the 68030 and control program, however in reverse.

Each Global Memory board provides for two port access by the Directors via the two independent buses designated "A" and "B". Global Memory supports a burst transfer feature for all of the pipes whereby 1 to 8 memory words can be transferred sequentially to/from memory for all of the pipes in a single memory access, except for the DSA pipe which only transfers a single memory word at a time. The memory on each board is organized in banks of 8 to facilitate the burst mode transfers. The system operates most efficiently with a burst size of 8 and with a starting address aligned on an 8-word boundary, that is, when the starting address starts at bank 0 and continues up to include bank 7. Each word transfer is clocked by a burst clock signal generated on the memory board, however, the Director is responsible for calculating a final address for each burst transfer. At the end of each transfer, the Director makes a check between address bits and upper pointer bits, which have been incremented by the burst clock, to ensure integrity of the transfer.

As previously indicated, there is independent arbitration for the Global Memory. There are three possible users for the memory array on a Global Memory board: the "A" port or bus, the "B" port or bus; and refresh. Refresh has the highest priority while the A and B ports operate on a rotating priority. The A and B buses effectively combine on the memory board and therefore only one bus can be in use on any single memory board at any time. A Director will request a port to the A or B bus by driving the address and command lines, and asserting a select line for the port under control of the 68030 and control program. A port will be available for use: if it is not in refresh; if any other accesses to it are complete; if the port is not locked through the other port, or if the other port is not in use. If a port is successfully selected, it will return a bus grant signal to the Director selecting it, which will remain asserted until the transfer is complete.

The architecture of the Symmetrix ICDA generally facilitates greater data throughput in the data storage system. High reliability and high performance are achieved, among other things, via the dual A and B bus system that allows odd and even memory banks to be accessed with some overlap. Also, performance is enhanced through pipelining including buffering of memory words via the DPR so that memory words can be assembled/disassembled in the gate array pipeline stage and loaded to/from DPR substantially simultaneously with the transfer of memory words to/from Global Memory. However, there are limits on the performance that can be achieved with this ICDA architecture. Specifically, processing speeds are limited by the 33 MHz speed of the 68030 processor. Furthermore, data transfer rates are limited by latency related to servicing pipeline requests. Higher data rates, while difficult to achieve, continue to be desirable for on-line data storage systems.

SUMMARY OF THE INVENTION

The present invention provides an integrated cached storage device with improved processing speed and enhanced performance capabilities.

According to the invention, host to global memory (front end) and global memory to storage array, e.g. disk drive array, (back end) interfaces (generically "Directors"), are each implemented with dual MC68060 control processors each running at 66 MHz, including a first processor referred to as "X" and a second processor referred to as "Y", configured to share substantial resources in order to keep hardware requirements to a minimum. Each control processor is responsible for 2 pipelines designated "A" and "B" and respective Direct Multiple Access (DMA) and Direct Single Access (DSA) pipelines, for Global Memory access. Each processor has its own Memory Data Register (MDR) to support DMA/DSA activity. The dual processors each access independent control store RAM, but run the same processor independent control program using an implementation that makes the hardware appear identical from both the X and Y processor sides.

Pipelines in the integrated cached storage system implementation according to the invention, are extended to add greater depth by incorporating a prefetch mechanism that permits write data to be put out to buffers or transceivers at the backend awaiting bus access, while up to two full 32 word buffers of assembled memory data is stored in Dual Port Ram (DPR), and memory data words are assembled in the pipeline gate arrays for passing to the DPR buffers. Once a first buffer is full it can be sent to memory while a second buffer is being filled, and vice versa, when the second is full and being emptied the first is filling. The write data is virtually sitting on the bus, which is not enabled for transfer until there is a Director memory connection, while other data transfer operations are occurring in the pipeline. Similarly, data prefetch mechanisms are included whereby data is made available to the bus going from Global Memory on read operations, prior to the bus being available for an actual data transfer. Two full buffers of read data are transferred from Global Memory and stored in DPR while data words are disassembled in the pipeline gate array, independent of host activity. As data is being taken by the host one buffer will empty out and is immediately filled while the host continues to take data from the other buffer. This reduces data transfer overhead or actual data transfer time by facilitating memory access and data availability during non-data transfer time. Additionally, timing of system operations is implemented such that there is overlap of backplane requests to transfer data to/from memory, memory selection and data transfer functionality.

Integrated cache according to the invention, i.e. Global Memory, comprises a plurality of memory boards, with variations of 256 Mbyte, 512 Mbyte, or 1 Gbyte of DRAM cache memory. A system can access up to 32 Gbytes of cache. In order to take advantage of the increased processor speeds of the dual control processors according to the invention, the memory boards support burst transfers of up to 32 memory words. The increased burst size, i.e. amount of data transferred between a Dual Port Ram (DPR) and Global Memory, allows for the transfer of 1 to 32 memory words, 64 bits in length, in a single memory access.

The Global Memory is configured such that a memory board having requested data is responsible for driving the clock associated with the transfer of the requested data. During write transfers, the Director controlling the pipeline moving data onto the Global Memory board provides the clock to move data onto the board. Such an implementation, in contrast to some known ICDA systems wherein the memory board or some central memory controller is responsible for all clocks, reduces the turn around time for data transfers to or from memory, i.e. the time from a data request until the data is sent, as clocking is not dependent upon availability of a single, central clocking facility. According to the invention, this clocking scheme increases data set up and hold time for transfers, which increases reliability and data integrity and creates the potential for faster data transfer rates.

Additionally, the Global Memory includes a lock feature to facilitate read-modify-write (r-m-w) type operations. It is designed to prevent intervention by other Directors in the system, between the read and write portions of a r-m-w sequence. Since there are two possible access ports to a memory board, A and B, the lock mechanism has to prevent access through either port. Access through the locking port is blocked by the locking Director which prevents other Directors from getting the bus until the lock has been released. Access through the non-locking port is prevented by the memory board itself. When LOCK is asserted on either the "A" or "B" ports, the memory board will not allow access through the other port until the LOCK condition is cleared again, typically on the next cycle. The LOCK generally remains active until a request arrives at the locking port without LOCK invoked. A Director can issue multiple read with lock and write with lock commands to retain the lock on the bus. The Global Memory boards are configured such that multiple accesses can be done, but are limited in duration to prevent a bus timeout by other Directors attempting to access the bus or access the same memory board on the other bus.

The lock mechanism according to the invention can facilitate a change of memory address within the same memory board during a lock cycle to permit further operations on the locked memory board without issuing other locks. Such a mechanism allows the system to do house keeping of memory, i.e. cache updating, error handling etc, on the locked memory board under the original lock but prevents the change of address to another memory board while the further operations are ongoing on the locked board. This reduces the number of times the memory board will be locked, unlocked and re-locked to effect operations under lock, effectively reducing the amount of time that other controllers are prevented from accessing the bus or that memory board.

A dual write mode or mechanism facilitates redundancy in data storage by writing the same data to two different locations in Global Memory, while the write data is only processed through the pipeline once.

In further accord with the invention, a special command is implemented to effect prefetch once only to reduce traffic on the backplane. The 68060 in limited circumstances, i.e. during a DMA pipe operation, can use a non-operational instruction that is used when only a small amount of data is needed in limited circumstances, such as by the control processor during a DMA pipe operation. The limited prefetch instruction is issued by a 68060 control processor to override normal memory operation and to effect the prefetching from memory of from 1 to 32 memory words. The limited prefetch capability has the advantage of reducing bus traffic and system latency as overhead memory operations undertaken by the control processor(s) is reduced by the limited prefetch capability.

One embodiment according to the invention, includes a host to Global Memory interface in which bandwidth to Global Memory is increased by an arbitration mechanism that takes advantage of the dual processor architecture. Access to a Dual Port Ram (DPR) that acts as a buffer to Global Memory is interleaved. Both processors share the same DPR so only one can access it at a time, however, the timing for read and write operations is defined as a function of the availability of the DPR taking into consideration what the other processor is doing.

The arbitration mechanism is implemented for arbitrating pipe access to Global Memory in a SCSI embodiment, wherein two SCSI pipes per processor (or side) are processed substantially simultaneously when sending data to memory such that memory access is interleaved. System bandwidth is increased by the mechanism that substantially simultaneously looks at all pipes going to memory, for each of the dual processors, and defines timing of a pipe as a function of the operation of other pipes so that overlap occurs.

Features of the invention include a higher speed, higher reliability integrated cached data storage system effecting greater availability of data in the data storage system with dual high speed processors. The architecture is suited for implementation with a large degree of integration via significant amounts of functionality provided in programmable gate array technology. The gate array technology can be programmed in situ by the control processor(s), which leads to enhanced flexibility in updating and/or modifying functionality. The architecture keeps operations involving the DPR and data going to/from Global Memory (i.e. upper side), decoupled from operations involving data going between the DPR and host (i.e. lower side), and in conjunction with a high degree of pipelining avoids significant delays in operations required for data transfers. Unavailability of the backplane bus for data transfers has a limited impact on host storage and retrieval operations. Arbitration of memory bus accesses for all pipes from both processors at the same time so as to effect overlap facilitates significant increases in memory bus bandwidth, i.e. to/from memory, without having to increase clock speeds. A synchronous counter included on each interface, i.e. Director, provides a simple mechanism to improve time correlation between Directors. The 32 bit counter clocked from a one microsecond clock on a selected Director provides a synchronized, high precision time source. The synchronous counter can be used for time stamping of selected system events.

BRIEF DESCRIPTION OF THE DRAWING

These and other features and advantages of the present invention will be more apparent from the following detailed description of an illustrative embodiment thereof, taken in conjunction with the drawing, in which:

FIG. 3D is a block diagram of a DMA/DSA pipeline in a dual processor implementation according to the invention;

FIG. 3E is a block diagram of a SCSI back end Director according to the invention, for transferring data to a disk array comprising SCSI disk drives;

DETAILED DESCRIPTION

The mechanisms according to the present invention are implemented in a data storage system involved primarily with moving data between a host and at least one array of storage devices, such as a disk drive array. Functional elements in the form of front end adapters or controllers move data between the host and a Global Memory or cache, while other functional elements in the form of back end adapters or controllers move data between the Global Memory and the disk array. Accordingly, a cache is integrated with a disk array data storage system.

Global Memory

Global Memory in a system according to the invention comprises a plurality of memory boards, four in the present illustrative embodiment, that provide from 256 Mbyte to 4 Gbyte of Dynamic Random Access Memory (DRAM) for cache memory. Each board uses up to 576 16 Mbit DRAM memory devices arranged on both sides of four daughter cards. The global memory boards provide for two port access from one or more controllers or adapters configured either to transfer data between a host and Global Memory (front end adapters), or to transfer data between the Global Memory and the disk array (back end adapters). The Global Memory is accessed by the front end or back end adapters, referred to generically as Directors, via two independent buses, an even bus and an odd bus, and two respective ports designated "A" and "B". The A and B ports each consist of a 32-bit address bus plus 1 parity bit, a 64-bit data bus plus 8 ECC bits, 10 command lines plus 1 parity bit, and bus control lines. The term memory word is used herein to denote a 64 bit plus 8 ECC bit memory word. The memory boards support burst transfers of 64 bit memory words through the A and B ports. The burst transfer feature allows for the sequential transfer of 1 to 32 memory words in a single memory access.

Figure 1A:
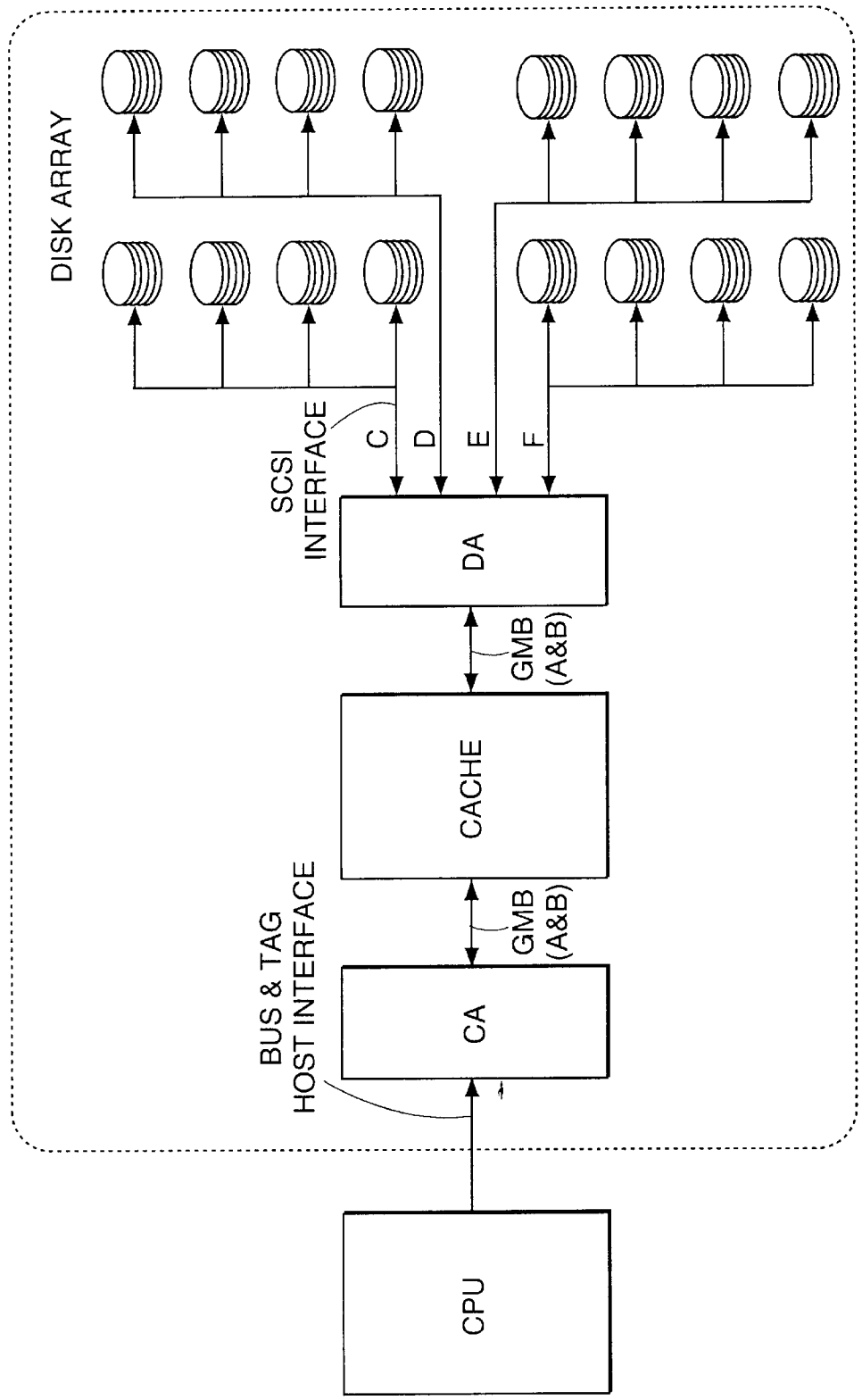
FIG. 1A is a generalized block diagram of a Symmetrix Integrated Cached Disk Array (ICDA), according to the prior art.
Figure 1B:
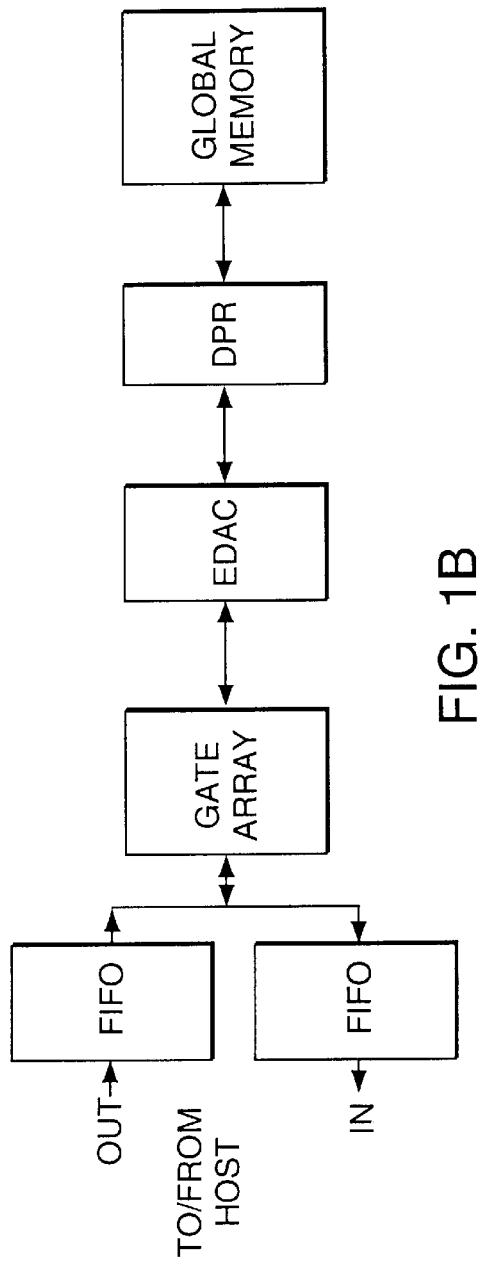
FIG. 1B is a block diagram of a Channel pipeline for transferring channel data between Global Memory and a host/CPU channel of the ICDA of FIG. 1A.
Figure 1C:
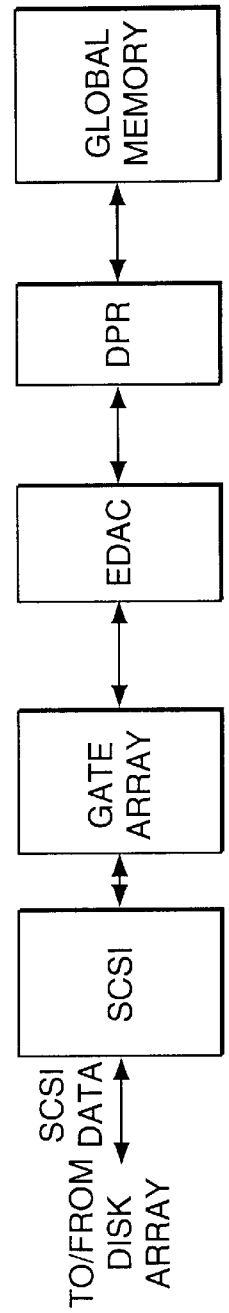
FIG. 1C is a block diagram of a SCSI pipeline for transferring SCSI data between Global Memory and SCSI disk interfaces of the ICDA of FIG. 1A.
Figure 1D:
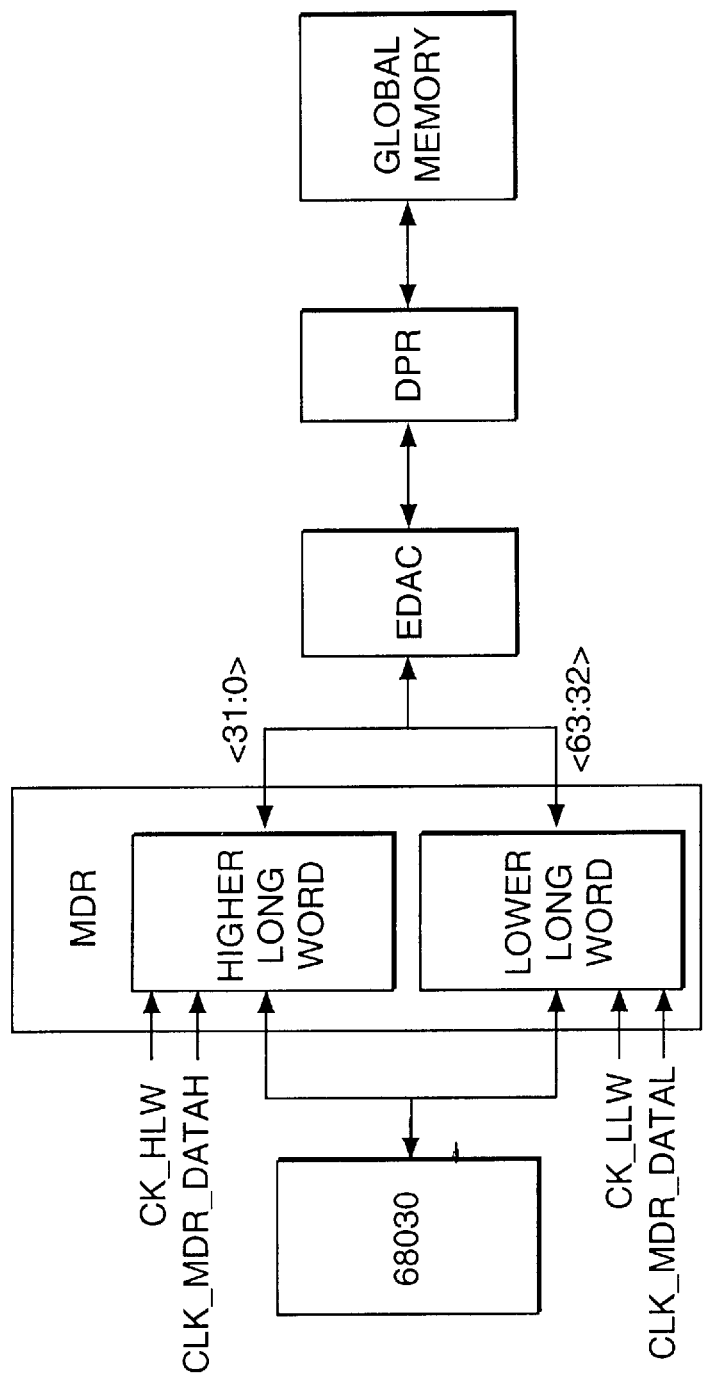
FIG. 1D is a block diagram of a DMA/DSA pipeline for transferring data between Global Memory and a 68030 microprocessor on a Director (CA or DA) of the ICDA of FIG. 1A.
Figure 1E:
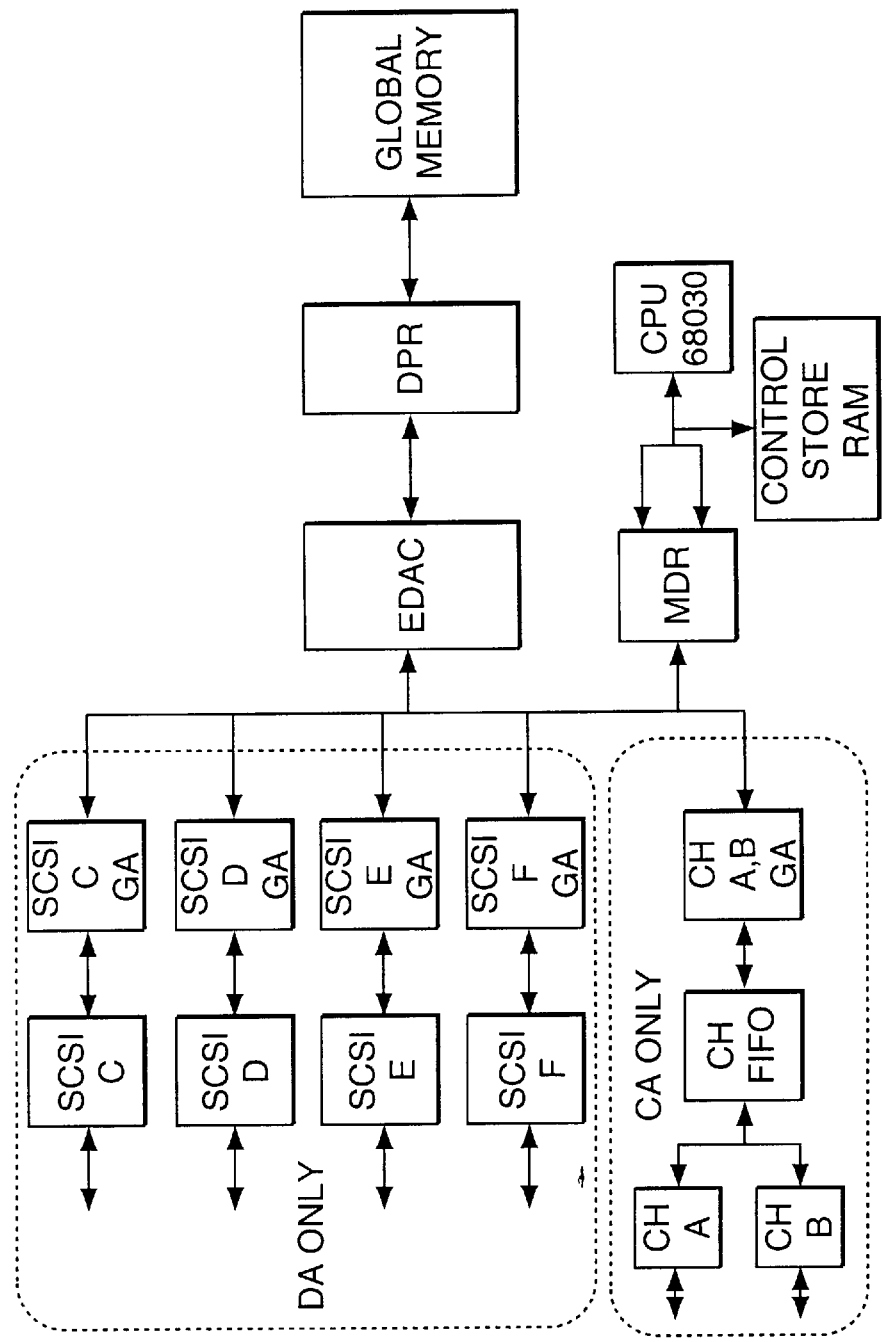
FIG. 1E is a system block diagram of the ICDA of FIG. 1A, illustrating the pipelines of FIGS. 1B–1D and components shared therebetween.
Figure 2A:
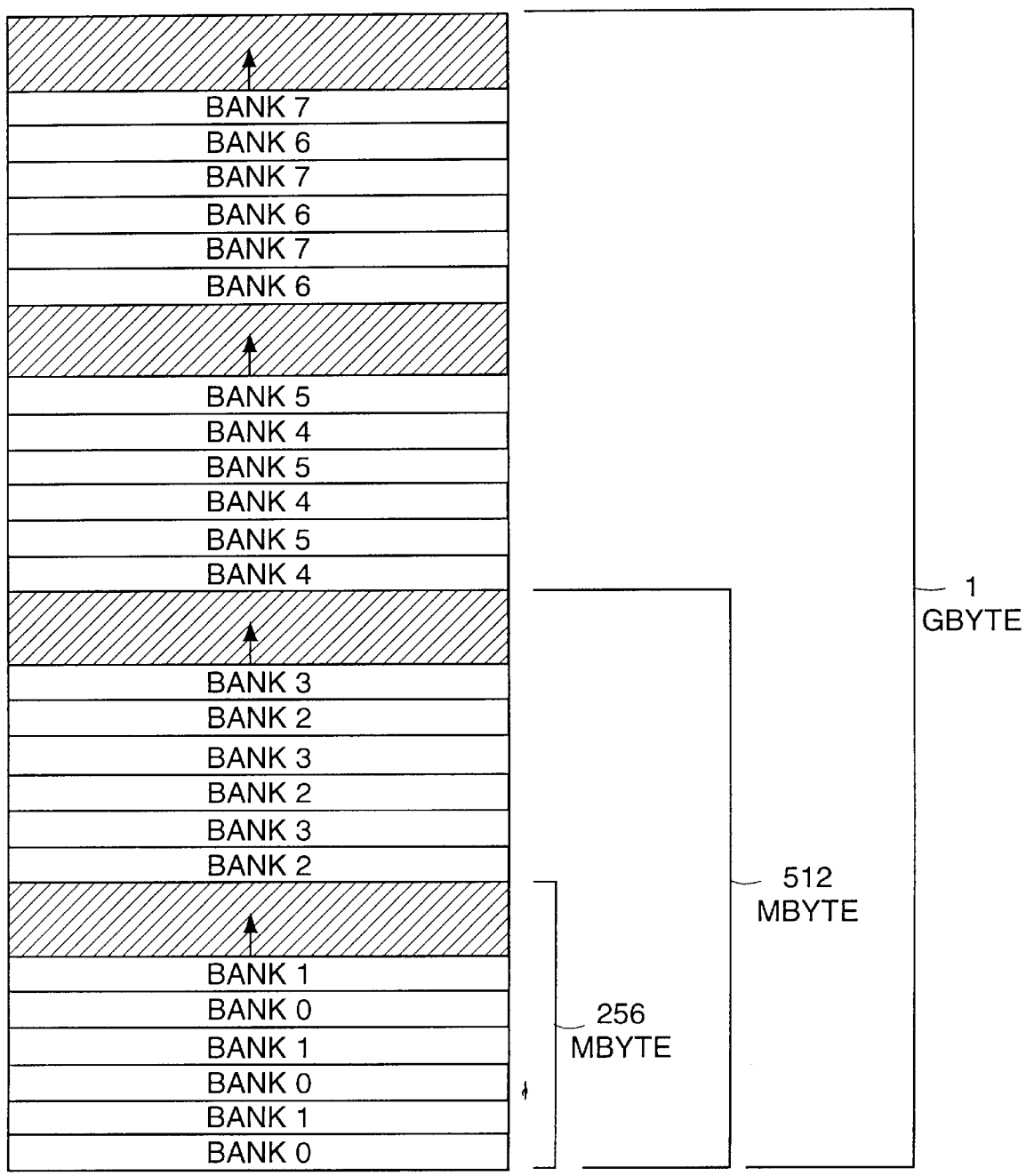
FIG. 2A is a block diagram of Global Memory organization of an integrated cached storage system according to the invention.

The Global Memory is organized in a memory bank structure consisting of interleaved pairs of banks, allowing depopulation of the daughter boards to effect the three memory sizes which correspond to different system configurations. The total possible 32 Gbyte address space of the high end system configuration is divided into 128×256 Mbyte segments for mapping purposes. Each 256 Mbyte segment may be mapped to a particular address range by loading a segment address to a segment table on the memory board at initialization time. In an illustrative implementation, all segments on the same memory board are mapped sequentially for convenience. Each 1 Gbyte memory board, as illustrated in FIG. 2A, is organized in up to four 256 Mbyte segments comprising pairs of odd and even banks: 0 and 1, 2 and 3, 4 and 5, 6 and 7. Using 16 Mbit DRAMs for implementation of alternative system configurations, a 256 Mbyte memory board is organized to have only banks 0 and 1, a 512 Mbyte memory board has banks 0, 1, 2, and 3, while a 1 Gbyte board has all banks, 0 through 7. Addressing of each segment is determined by addresses loaded in segment tables during initialization. The addressing scheme in this illustrative embodiment is based on assigning contiguous memory locations with sequential addresses.

The memory boards have two modes of operation. In a first mode or "operational mode", normal read/write transfers to the Global Memory are effected, as described in detail hereinafter. Operational mode is effectively an on-line/off-line flag signalling the Directors that the Global Memory may be selected for data transfers, including: single memory word write/read via a Directors DSA pipeline; burst read/write of 1 to 32 memory words via an ESCON, Channel or SCSI pipe (depending upon the type of Director). In a second mode or "non-operational mode" a board is non-operational or off-line, and only service cycle reads or writes are possible. Service cycle reads or writes do not write to the Global Memory array and are used for initial set-up and checking memory board status. After power up memory boards wake up in the non-operational state and must be initialized before being available for normal operational memory cycles. During initialization service cycles are used in the non-operational mode to load the segment tables that define what ranges of addresses the board will respond to. Service cycles are also used to read and write status and control information to Maintenance Processors and Memory Controllers on the memory boards.

Service cycles may be used in certain instances when a memory board is in operational mode or on-line. A write service cycle may be used when a memory board is on-line, to write single word to memory board ASICs. Similarly, a read service cycle may be used in operational mode for a single word read from memory board ASICs. During service cycles, in either operational or non-operational modes, memory boards are selected by means of their slot number whereas during normal operational cycles they are accessed by a global memory address.

Most of the timing and control functions required on the memory board are implemented in Application-Specific Integrated Circuits (ASICs). The A and B sides of the memory board function autonomously allowing both buses to be active simultaneously. However, the memory array itself is shared by the two sides, so that access to the physical memory is limited to one side at a time. Each memory board includes two Maintenance Processors (MP), one for each side, i.e. A and B. A Maintenance Processor for each side handles power-up initialization of a Memory Controller for that side, and facilitates service cycle, i.e. non-operational mode, access to an EEPROM on the memory board used to store memory board status and initialization information. The MP associated with each port serves to keep a check on the port's hardware operation. The MP is a programmable logic device configured to monitor critical signals in memory board hardware, including lock signals from a Phase Locked Loop used to ensure that each side of the memory board is operating at the same clock frequency. The MP is configured to sense for power fail, timeout signals and to monitor enable signals to ensure that they are not asserted for longer than a selected time period. The MP can issue a soft reset to the memory board to clear a hung condition. The MP is also used to drive six LED status indicators, three for each port or side, to indicate: if a port is OK, i.e. not timed-out and properly clocked, if a port is in non-operational mode, i.e. off-line, and if a port is active.

Figure 2B:
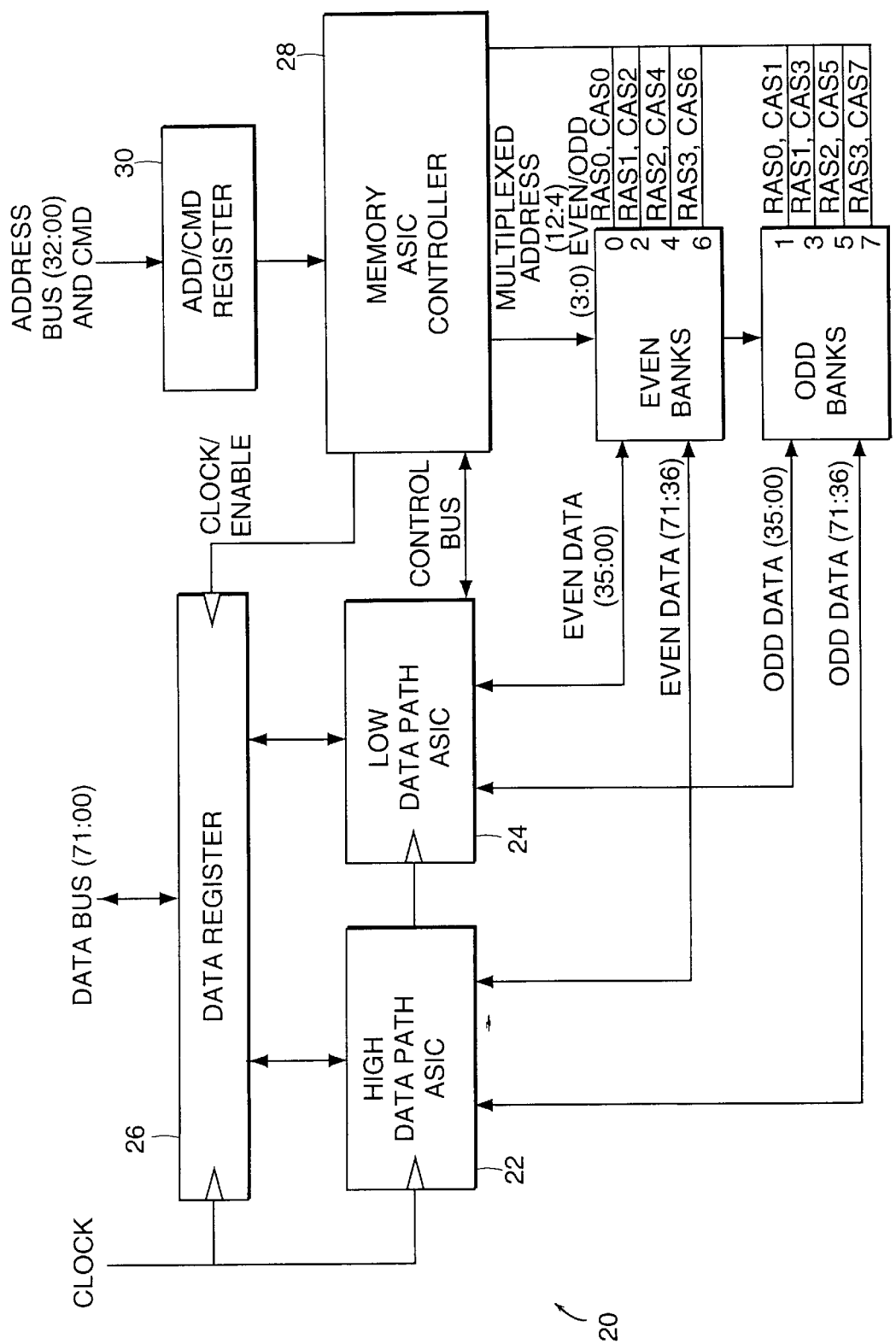
FIG. 2B is a block diagram of functional components of a Global Memory board in the Global Memory of the integrated cached storage system according to the invention.

The main functional components of a memory board 20 are illustrated in FIG. 2B (note that the Maintenance Processor is not shown). Each side, A and B (only one of which is illustrated in FIG. 2B), uses two Data Path ASICs. A High Data Path ASIC 22 handles a portion (bits 71:36) of the 72 bit data bus (consisting of 64 data bits and 8 bits ECC), and a Low Data Path ASIC 24 handles another portion (bits 35:00) of the data bus. The High and Low Data Path ASICS 22, 24 pass data to and receive data from a data register 26 connected to one of the backplane buses (A or B). The High Data Path ASIC 22 and Low Data Path ASIC 24 provide temporary storage and facilitate transfer synchronization for data moving between the system bus or backplane (A or B bus), and odd and even DRAM banks.

A third ASIC, referred to as the Memory Controller ASIC 28, is used for control purposes. The Memory Controller 28 provides clocks and enable signals to the data register 26 and the High and Low Data Path ASICs 22, 24 to synchronize transfer of data between the system bus and the Data Paths. During write transfers a Director provides the clock to move data into the data register 26 and Data Paths 22, 24. The Memory Controller 28 monitors the clock issued by the Director on a write, to determine transfer completion status.

Addressing of the memory on a memory board is also handled by the respective Memory Controller 28. A segment table is maintained by the Memory Controller which maps the address space on the memory board as defined hereinbefore. The data bus is split into odd and even buses within the Data Path ASICs to serve the odd (1, 3, 5, 7) and even (0, 2, 4, 6) banks. The address space to which each board is mapped is programmable by means of the segment table located in each Memory Controller on each memory board, and is set up during memory initialization.

Global Memory addresses originate at an Address Gate Array Low Memory Address register on a Director receiving a command from a host to perform a read or write operation to the data storage system. The Low Memory Address register is loaded with a 32-bit address to a memory word. As the memory board does not handle data entities smaller than 64-bits, byte addresses are unnecessary. The 32-bit Low Memory address value is output directly on the Global Memory address bus during a memory transfer (i.e. read or write). The 32-bit address, aligned for a 64-bit memory word, provides a capability of up to 32 Gbyte of addressable memory. The address word, along with commands derived from a High Memory Address register on the Director are input to the Memory Controller ASICs via an address and command register 30. In operational mode, the 32-bit address is decoded to provide board selection and DRAM addressing. Board selection is determined by comparing the address to the segment table addresses loaded during initialization. The Memory Controller responds to a valid address by asserting a grant signal (BGRANT).

Each of the four 256 Mbyte segments on a memory board may be addressed independently. The segment table is loaded with a 7-bit "match" address for each segment on the board. A 1 Gbyte board requires four match address entries in the segment table, loaded to both sides as MATCH0 through MATCH3 during an initial service cycle. For bank selection, pairs of odd and even banks are selected by comparing the seven most significant bits (MSBs) of the memory address to the segment table address match entry. If the address falls within the segment identified by the table entry, the selection may be completed. The memory address least significant bit (LSB) is used to select the odd or even bank within each segment.

In order for the Memory Controller to correctly format the addresses for the DRAMs and to drive the row address select (RAS) and column address select (CAS) lines appropriately, it needs to know the size of DRAMs used and also the population factor of the daughter cards, i.e. what the system configuration is. Each daughter card has two lines, 1_AM_16 MB and 1_AM_64 MB which are used to encode the DRAM size. A population of 16 MB DRAM devices is indicated by one combination signal levels for these signals, i.e. 0, 1, respectively), while 64 MB devices are indicated by another bit combination (i.e. 1, 0). These lines are routed to the mother board Maintenance Processor(s) and are used to inform the Memory Controller(s) of the board configuration. The Memory Controller uses this information to determine which of the incoming address lines become row and column address bits for the DRAMs. Each daughter card also has two lines, POP1 and POP0 to indicate to the mother board if it is fully or partially populated which ultimately determines the memory board capacity. The POP1 and POP0 lines are used in conjunction with the 1_AM_16 MB and 1_AM_64 MB lines to indicate whether the memory board is 256 Mbyte, 512 Mbyte or 1 Gbyte. The POP1 and POP0 lines are also routed to the mother board MP(s) and are used by the Memory Controller(s) in conjunction with DRAM size to determine which CAS (bank select) lines should be driven for the particular memory board capacity and DRAMs used.

For integrity purposes, the parity of address information arriving at the daughter card is checked. Buffers on each daughter card generate parity on received addresses. The parity bits so produced are routed back to the Memory Controller where they are compared to parity bits generated internally when the gate array supplied the address to the daughter cards. The address bus arriving at the daughter cards is actually a multiplexed bus which carries row address information during the early part of a cycle and column address information during the latter part. Parity is checked for both row and column addresses.

The Memory Controller on each memory board also handles bus arbitration. There are three possible users of the memory array on a global memory board: the A port; the B port; and refresh. Only one of these users may be active at any time and which one is determined by onboard (Memory Controller) arbitration circuitry. Arbitration is handled in a substantially similar manner to that of the Symmetrix ICDA. Refresh has the highest priority while the A and B ports operate on a rotating priority. The A and B buses effectively combine on the memory board and therefore only one bus can be in use on any single memory board at any time. A given port will be available for use: if it is not in refresh; if any other accesses to it are complete; if the port is not locked through the other port, or if the other port is not in use.

A Director will request a port by driving the address and command lines and asserting the select line for the port. The Master Controller will respond to the request by returning a grant (BGRANT) if it determines that the transfer can be completed. The Master Controller arbitration logic is designed to maximize access to the port(s) and can grant access to the bus independent of the other side. If a port is successfully selected, BGRANT will be asserted until the transfer is complete.

To effect refresh of the DRAMs, a CAS before RAS refresh mode is used. The refresh interval, (which is specific to the particular DRAMs used as number of refresh cycles required per unit time), is established by the Memory Controller. If neither the A or B ports are active the internal refresh request is asserted at the appropriate interval. If either port is busy, refresh request will not go active until both ports return to the not busy state. However, if the refresh cycle time limit is exceeded before both ports return to the not busy state, refresh will be forced. Refreshing is normally done independently by the two ports, however, in the event of problems with one port, the other port's Memory Controller can facilitate refresh of the entire array at a rate sufficient to maintain data integrity. Refresh cycles are accomplished in a staggered sequential fashion on pairs of banks. Bank 0 and 1 refresh is started, then banks 2 and 3, followed by 4 and 5, and finally banks 6 and 7. An internal counter in the DRAM chips keeps track of the row being refreshed within each bank.

Four identical Data Path ASICs are used on the memory board. Each of the A side and the B side includes a High Data Path 22 and a Low Data Path 24, as illustrated in FIG. 2B. The High Data Path handles both odd and even data bits 71:36 while Low Data Path handles odd and even data bits

35:00. A hardwired input to each of the ASICs identifies the Data Path as either high or low. Both Data Paths on a side are controlled and monitored by the respective Memory Controller. Signals passed between the two Data Paths are limited to read and write check bytes used in error checking of the entire memory word.

Figure 2C:
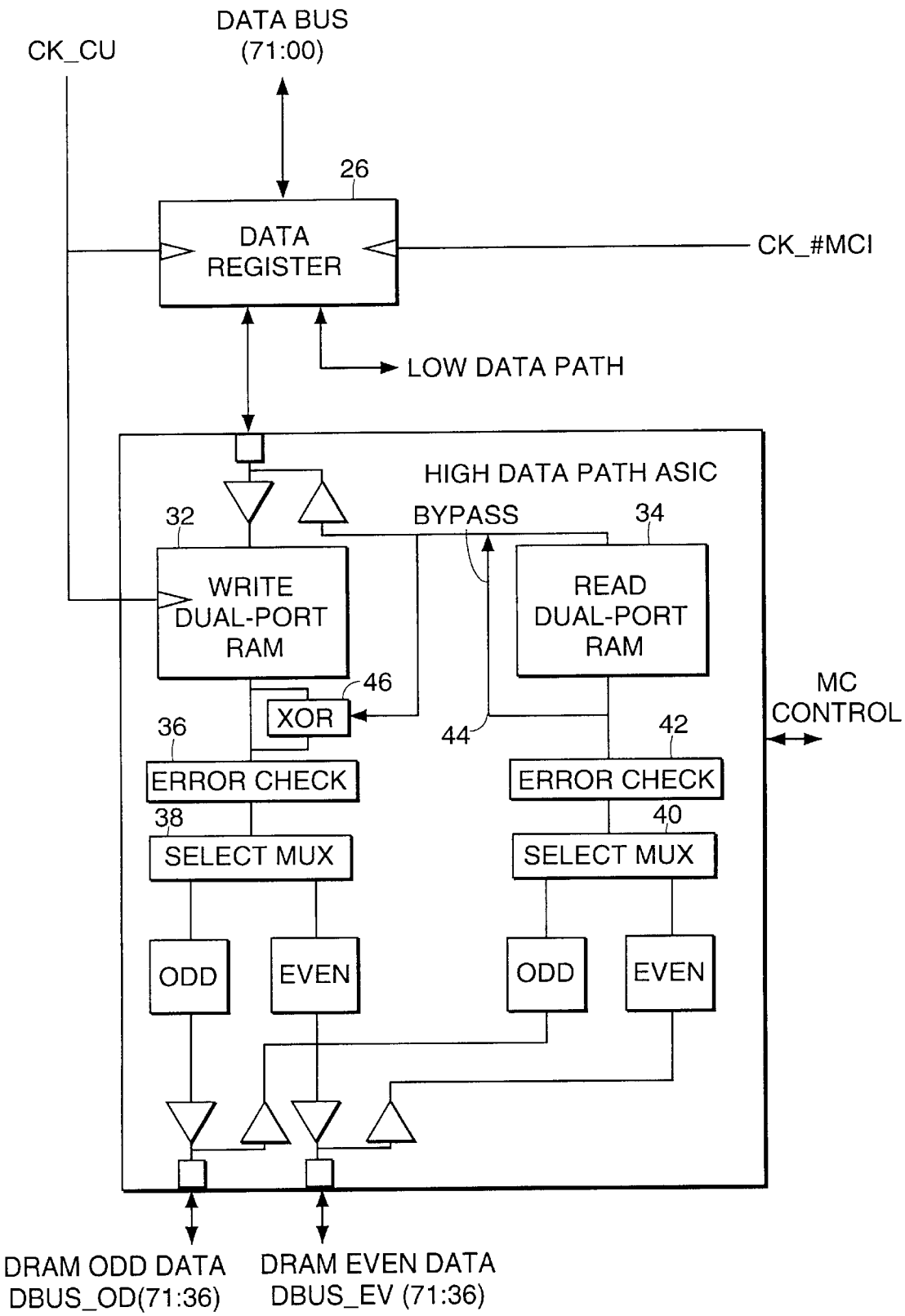
FIG. 2C is a block diagram of functional components of a Data Path Application Specific Integrated Circuit (ASIC) used in the Global Memory board of FIG. 2A.

A single Data Path ASIC is illustrated in FIG. 2C. The primary function of the Data Path ASIC is to provide FIFO buffering, on the Global Memory side of the system bus, for read data transfers (i.e. from the memory board to a Director) and write data transfers (i.e. from a Director to the memory board). Data buffering is effected in the Data Path ASICs by means of two dual-port RAMs: a write dual port RAM 32 and a read dual port RAM 34. Use of the dual port RAMs 32, 34 on the memory side of the system bus allows read and write transfers on that side of the bus to be unconstrained by system bus timing, and allows the system bus to be released while the actual transfers to and from the memory array are in progress.

On a write operation, write data from a Director is accompanied by a data clock (CK_CU) used on the Global Memory side to load data from the system bus into the data register 26. The bidirectional data bus into the ASIC is enabled for input to the write DPR 32, and data is loaded sequentially into the write DPR 32 strobed by CK_CU. Write data read out of the write DPR 32 is passed through an error checker 36, and is then routed via an output select mux 38 alternately to the odd or even outputs as determined by the LSB of the address word. Bi-directional odd and even data buses are enabled for output, and write data is applied to the daughter board DRAMs with synchronization and addressing supplied by the Memory Controller, as described hereinbefore.

On a read operation, read data from the daughter board DRAMs is received by the Data Path via the bidirectional bus enabled for input to the odd and even read DPR 34 inputs. Read data selected via an input select multiplexor 40 is passed through an error checker 42 and loaded into the read DPR 34. A bypass path 44 routes data directly to the output toward the data register 26, bypassing the read DPR when the bypass is enabled by the Memory Controller. If timing and synchronization considerations are such that it is determined that the read DPR 34 will receive/buffer the data, the Data Path will load and read out data to the data register 26. Data emitted from the Data Path is clocked by a Memory Controller clock (CK_AMCI on the A side or CK_BMCI on the B side). The Memory Controller enables the data register output and provides the accompanying data strobe (CK_M) to move data across the system bus.

The Data Path includes an XOR Write function, which facilitates rebuilding of RAID-S parity devices. The XOR Write operational mode is enabled by setting an XOR command line implemented as a bit (bit 30 in this illustrative embodiment) of high memory address. When the Memory Controller determines that the XOR Write mode is enabled, data written to memory is XORed with the data already stored in the addressed location. During an XOR write, the existing contents of the addressed memory locations are loaded in the read DPR 34. The output of the read DPR 34 is then combined with write data in an XOR function 46 at the output of the write DPR 32. The resulting XORed data is written to the daughter board DRAMs, replacing the original data.

A lock feature is included on the memory boards to facilitate read-modify-write (r-m-w) type operations. It is designed to prevent intervention by other Directors in the system, between the read and write portions of a r-m-w sequence. Since there are two possible access ports to a memory board, A and B, the lock mechanism has to prevent access through either port. Access through the locking port is blocked by the locking director which prevents other directors from getting the bus until the lock has been released. Access through the non-locking port is prevented by the memory board itself. As far as the memory board is concerned, lock is invoked when the hardware LOCK line is asserted during a memory access. When LOCK is asserted on either the A or B ports, the memory board will not allow access through the other port until the LOCK condition is cleared again, typically on the next cycle. From the memory board point of view, lock remains active until a request arrives at the locking port without LOCK invoked.

In the integrated cached storage system implementation according to the invention, a Director can issue multiple read with LOCK and write with LOCK commands to retain the lock on the bus to a particular memory board (without receiving an indication that the bus is already locked, and without having to "unlock" the memory board's bus before issuing a new lock). Multiple accesses are limited in duration to prevent a bus timeout by other Directors attempting to access the bus or access the same memory board on the other bus.

The lock mechanism according to the invention facilitates a change of memory address within the same memory board during a lock cycle to permit further operations on the locked memory board without issuing other locks. Addressing as controlled by the Memory Controller is implemented such that Low memory address displacement bits 15:00, specifying an address within a 512 Kbyte block, may be changed between accesses to allow addressing within that 512 Kbyte block. However, if low memory address base bits 31:16 change between accesses (which bits are used to specify other memory boards), an error is generated to prevent the locking of more than one board at a time (the error is indicated in a pipe error status register). Such a mechanism allows the system to do house keeping of memory, i.e. cache updating, error handling etc, on the locked memory board under the original lock and prevents any change of address to another memory board while the further operations are ongoing on the locked board. This reduces the number of times the memory board will be locked, unlocked and re-locked to effect operations under lock, effectively reducing the amount of time that other controllers are prevented from accessing that memory board.

Clock generation for the memory board(s) is accomplished by two crystal oscillators and Phase Locked Loop (PLL) devices located on each memory board. One PLL is used for the A port while the second is used for the B port. The PLLs use one of the two crystal oscillators, 30 MHz or 25 MHz, as a master clock. Both crystal oscillators run continuously but only one is selected by the PLLs. Both ports PLLs use the same clock source at any given time. When a memory board wakes up after reset, the 25 MHz oscillator is selected. Thereafter clock selection is normally made from the Director by means of service or non-operational cycles. That is, the clock rate on the memory board can be changed by a Director under control of a 68060 thereon. The clock rate can be switched by setting/resetting a Select PLL bit in a Maintenance Processor Data Byte. The Maintenance Processors (MPs) output a select signal (SEL_PLL) to select the source oscillator for input to the PLLs. This allows the MP to override clock selection in the event of hardware problems as sensed by the MPs. The outputs from both MPs, A and B are wire ORed onto the SEL_PLL line, so both ports always run at the same clock rate. Other non-operational cycles allow the state of SEL_PLL to be examined.

When using the fast clock, if the MP detects a problem (PLL losing lock), the MP is configured to automatically switch to the slower clock. Should the hardware detect a problem while already using the slower clock, no automatic clock switching will take place. Clock selection or switching can be selectively implemented.

As described, Global Memory constituted by individual memory boards configured as described hereinbefore, is written to and read from over the system bus or backplane by controllers referred to generically herein as "Directors", constituted by controllers/adapters transferring data between the Global Memory and the disk array (back end). A plurality of lines or signals comprise the (backend) Director/Global Memory interface owing signals represent the signals between a Director and a single memory port, i.e. A or B, and are effectively duplicated for a second port.

BD (71:0): 64-bit data (63:0) and 8-bit ECC (71:64) bi-directional bus used for transfer of data between director and global memory.

BAD (31:0) : 32-bit address bus by which a director addresses a memory board location.

BAD (32) : Address parity bit. Odd parity bit for 32-bit address bus.

BBRST(4:0): Burst bus, the means by which a director informs a memory board how many memory words are to be transferred.

BXOR: Read-XOR-Write mode command line, write data from director is XORed with data already stored in the addressed location.

BWR*: Global Memory read/write line.

BSERVICE: Indicates to global memory board that the current request is a service request.

BLOCK: Driven by a Director to lock port on memory board thus preventing access.

BCOM_PAR: Parity bit associated with the BBRST(4:0), BXOR, BWR*, BLOCK, BSERVICE, and SPARE command lines.

BSEL_IN*: Indicates an access attempt by a Director (address bus, read/write lines etc. are valid).

BGRANT_M: Response from memory to Director indicating that arbitration has been won and the Global Memory board is now bus master.

BGRANT_C* Response from Director to memory indicating that arbitration has been won and the Director board is now bus master.

BEND_ST (3:0): Response from memory to Director at the end of a transfer indicating a successful or otherwise transfer.

BINI_ST Initial Status from memory to director indicates that interface selection cannot be completed.

B_CK_CU: Write Data clock, During write transfers, each memory word transferred is accompanied by a B_CK_CU pulse from the Director board doing the transfer.

B_CK_M: Read Data clock, During read transfers each memory word being transferred is accompanied by a B_CK_M pulse from the global memory board.

SPARE: Spare command line. Must be zero.

As described, the basic mechanism for communication between a Director and Global Memory is initiated when a Director selects a memory board by supplying the required parameters and asserting a select line or signal (BSEL_IN) for the port to which it is connected. If successfully selected, the memory responds by asserting an associated grant signal (BGRANT). The memory board is thus enabled for data transfer, either read or write. When the required data has been transferred, the memory board returns a 4-bit completion code on status lines (END_ST, 3:0), and releases BGRANT. The completion code is sampled by the Director after BGRANT is deasserted at the end of a transfer to determine if the transfer completed successfully or otherwise.

In addition to the Global Memory described in detail hereinbefore, the storage system according to the invention comprises Directors for communication between a host and Global Memory, and Directors for communication between the Global Memory and the disk arrays. These Directors or adapters are more particularly described hereinafter.

Front End, Host-to-Global Memory Adapter(s)

At the front end, one of several types of adapters is configured to transfer data between the host and the Global Memory, as a function of the input/output (I/O) interface of the host. That is, one type of front end adapter has a host interface portion configured to transfer data to/from hosts using an IBM Bus and Tag interface (i.e. the Channel Adapter, CA, described hereinbefore). The technical details of the IBM Bus and Tag interface are set forth in an IBM publication entitled Enterprise Systems Architecture/390, System/360 and System/370 I/O Interface Channel to Control Unit Original Equipment Manufacturer's Information (GA22-6974 OEMI), which is incorporated herein by reference. Another type of front end adapter has a host interface portion configured to transfer data to/from hosts using an IBM Enterprise Systems Connection interface (i.e. an ESCON Adapter, EA). The technical details of the IBM ESCON interface are described in various IBM publications including INTRODUCING ENTERPRISE SYSTEMS CONNECTION, IBM 3990 ESCON FUNCTION, INSTALLATION AND MIGRATION, and IBM 3990 STORAGE CONTROL ESCON FEATURES PRESENTATION GUIDE, which are incorporated herein by reference. Still another type of front end adapter has a host interface portion configured to transfer data to/from hosts using an "open systems" interface in accordance with the Small Computer Systems Interface standard (i.e. a SCSI Adapter, SA). The technical details of the SCSI interface are described in the SCSI Standard, ANSI/IPCX3.131 199X Rev10D Enhanced Small Computer Systems Interface-2, SCSI-2 which is incorporated herein by reference. Apart from differences in the host interface portions of the several front-end interfaces, which differences are primarily due to accommodation of the particular host I/O interface, the architecture of the front end adapters, i.e. CA, EA and SA, are substantially similar as described hereinafter.

The Directors are designed around a common pipelined architecture moving data along the pipe under microprocessor control. When the system is operating, it is the pipelines that move the data, not the controlling microprocessors. The microprocessors set-up the pipes to perform a transfer and monitor the pipelines for errors during the transfer. The Directors according to the invention incorporate a dual control processor architecture including a first processor referred to as "X" and a second processor referred to as "Y", configured to share substantial resources in order to keep hardware requirements to a minimum. Each control processor is responsible for two pipelines designated "A" and "B" and respective Direct Multiple Access (DMA) and Direct Single Access (DSA) pipelines, for Global Memory access.

Figure 3A:
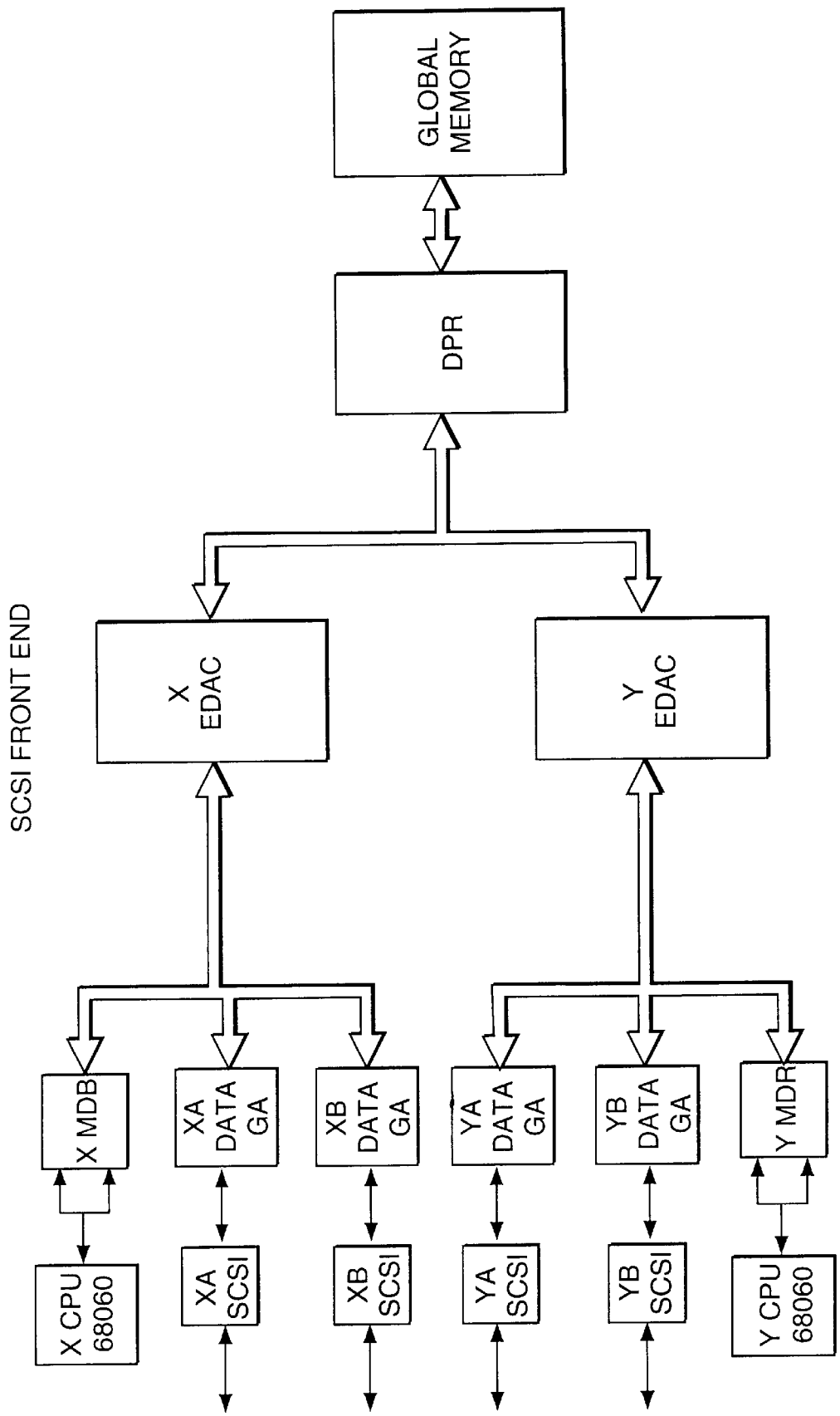
FIGS. 3A–3C are block diagrams of SCSI, Channel and ESCON front end Directors or adapters in a dual processor implementation according to the invention, including SCSI pipes, Channel pipes and ESCON pipes, respectively, for transferring data between a host and Global Memory.
Figure 3B:
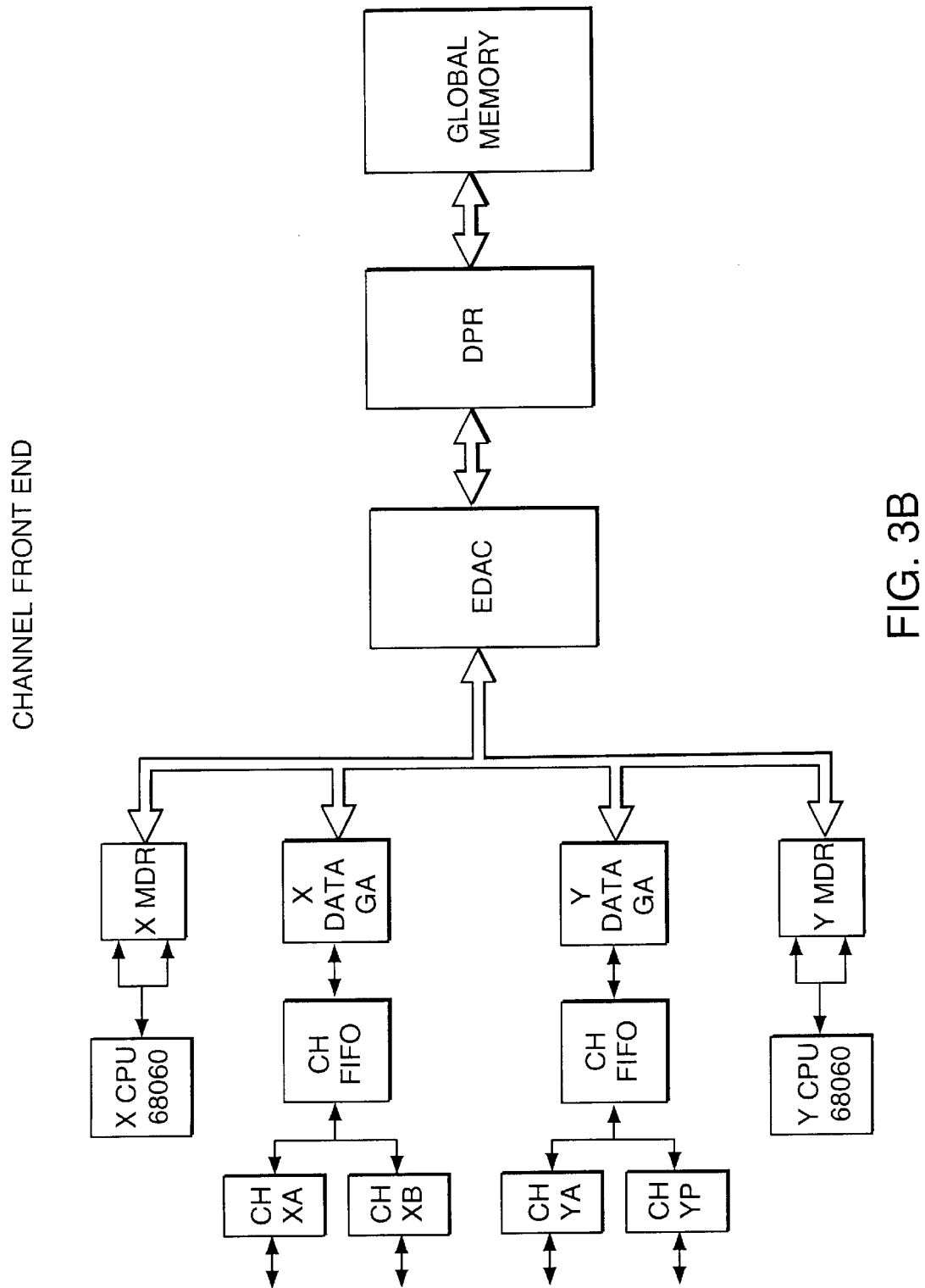
Figure 3C:
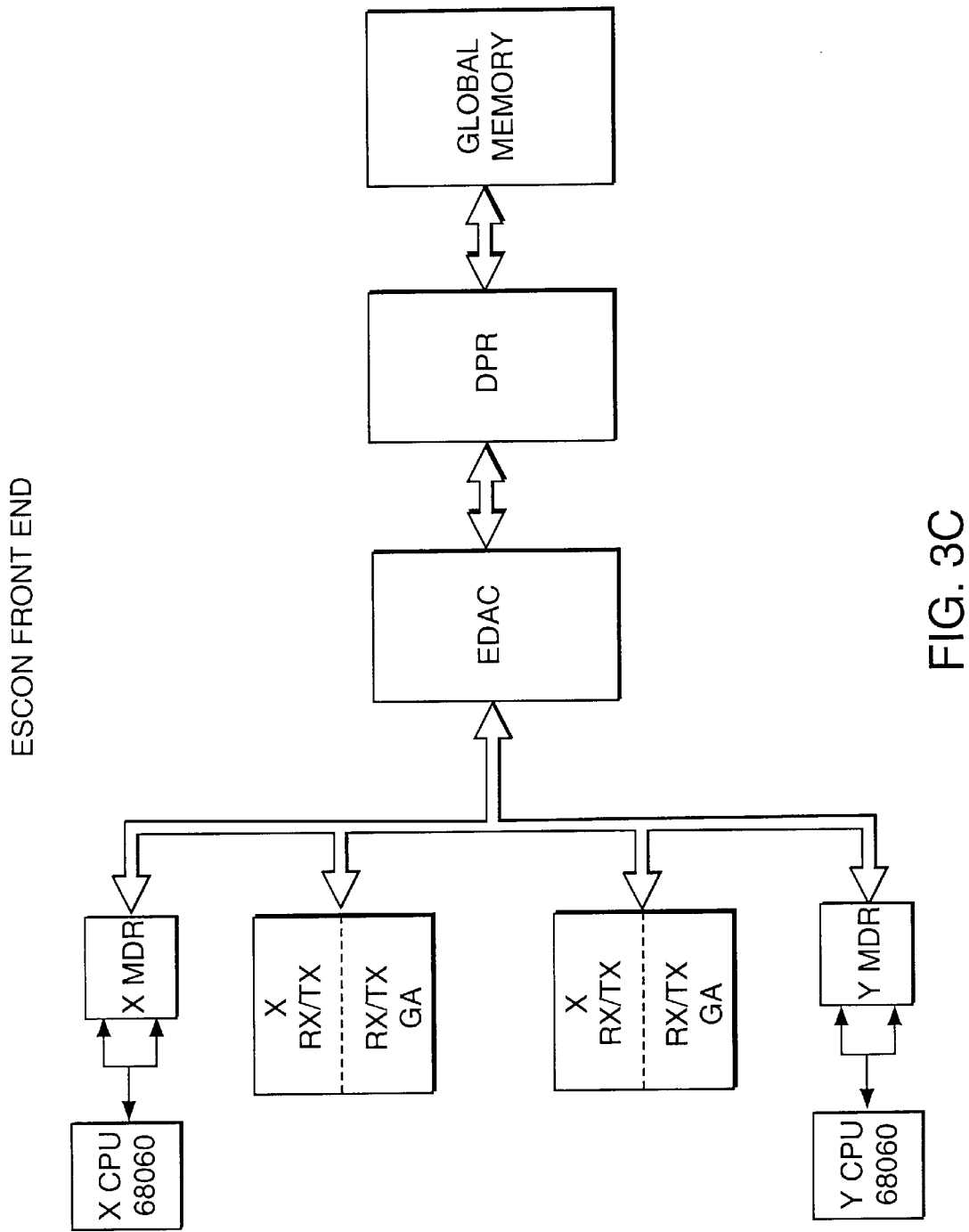

The Directors, implementing respective pipelines for each of the various front end interfaces are illustrated in FIGS. 3A–3C. A front end SCSI Director, for transferring data between a host and Global Memory according to the SCSI standard known in the art, is illustrated in FIG. 3A. The SCSI pipe is the means by which SCSI data is transferred to/from Global Memory. The primary stages of the SCSI pipe include a SCSI chip which implements standard SCSI protocol(s). The interface chip, is a modified SCSI Controller ASIC, part no. 53CFW96-3, manufactured by Symbios Logic. The chip includes selectable SCSI differential 16-bit wide mode capabilities to communicate with a SCSI host (i.e. in the front end application illustrated in FIG. 3A), and is modified in order to additionally provide both the functionality of an NCR 53C94 controller containing drivers to directly drive a single ended 8-bit (narrow) SCSI bus, and to selectable drive a 16-bit single ended (wide) SCSI bus. The same chip is used in the SCSI back end Director to communicate with the disk array (as described hereinafter). The chip implements SCSI standards described in detail in the referenced SCSI standard (which are incorporated herein by reference). The SCSI chip(s) implement the standard bidirectional protocol and pass 16 bit Wide SCSI data in four pipes: an A and B pipe (XA and XB, respectively) on the X side controlled by an X control processor; and an A and B pipe (YA and YB, respectively) on the Y side controlled by a Y control processor. The SCSI data is passed in the four pipes on a bidirectional bus connected to respective SCSI Data Gate Array (GA) devices which assemble/disassemble 64 bit memory words going to/from Global Memory. Error detection and correction (EDAC), and Dual Port Ram (DPR) for buffering, are implemented in the four pipes for data transferred between the SCSI host and Global Memory.

A front end Channel Adapter or Director, for transferring data between a host and Global Memory according to the IBM Bus and Tag (Channel) standard known in the art, is illustrated in FIG. 3B. The principle stages of the Channel pipe include Channel Receive and Transmit FIFOs which receive and transmit Channel data between the host Channel I/O and the Channel Director pipes. Channel data is transmitted in four pipes: an A and B pipe (XA and XB, respectively) on the X side controlled by an X control processor; and an A and B pipe (YA and YB, respectively) on the Y side controlled by a Y control processor. The eight bit Channel data is passed in the four pipes on a bidirectional bus connected to respective Channel Data Gate Array (GA) devices which assemble/disassemble 64 bit memory words going to/from Global Memory. As in other pipes, error detection and correction (EDAC), and Dual Port Ram (DPR) for buffering are implemented in the four pipes for data transferred between the Channel host and Global Memory.

FIG. 3C illustrates an ESCON front end Adapter or Director, for transferring data between a host ESCON I/O and Global Memory according to the IBM Bus ESCON standard known in the art. Data in accordance with the ESCON protocol is received on the ESCON Director by ESCON Receiver/Transmitter Gate Arrays (Rx/Tx GA), which receive and transmit ESCON data between the host ESCON I/O and the ESCON Director pipes in accord with the ESCON I/O protocol. ESCON data is transmitted in two physical pipes that are configured to operate as four pipes, two on each side: an A and B pipe (XA and XB for transmit and receive, respectively) on the X side controlled by an X control processor; and an A and B pipe (YA and YB for transmit and receive, respectively) on the Y side controlled by a Y control processor. Parallel ESCON data is passed in the pipes on a bidirectional bus connected to respective Rx/Tx Gate Array (GA) devices which in turn assemble/disassemble 64 bit memory words. The Rx/Tx GA transmits or receives data to/from an ESCON adapter board that effects data conversion with devices known in the art. The adapter board (not shown) converts parallel data to serial using a Cypress CY7B923 device (for transmit), or converts serial data to parallel with a Cypress CY7B933 (for receive). As in other pipes, error detection and correction (EDAC), and Dual Port Ram (DPR) for buffering are implemented in the ESCON pipes for data transferred between the ESCON host and Global Memory.

The two microprocessors on each of the Directors described herein also each require access to Global Memory, which, from the microprocessors point of view is not directly addressable. Each processor has two pipes with which to access Global Memory. A DSA (Direct Single Access) pipe which transfers a single 64-bit memory word at a time, is typically used for control/status type operations. A DMA (Direct Multiple Access) pipe can transfer from 1 to 32 64-bit memory words on each memory access and is thus more efficient for transferring larger blocks of data. The DMA pipe is generally used to transfer large amounts of data for testing/setting up Global Memory.

The DMA and DSA pipes, of which there are a total of four—two DMA and two DSA per Director, are substantially similar in topology. An exemplary DMA (or DSA) pipe is illustrated in FIG. 3D. As illustrated, each processor has its own Memory Data Register (MDR) to support DMA/DSA activity. As in the known Symmetrix ICDA, the MDR provides a 72 bit wide register set, 64 bit data and 8 bits parity, comprised of upper and lower words that can be independently read or written by the microprocessor. Similarly, the MDR performs the assembly and disassembly of 64 bit Global Memory words (which is performed by the Gate Arrays in other pipes). The MDR also facilitates byte swapping for data value compatibility between the data values stored in Global Memory by the host and corresponding data processed according to Motorola 68060 byte conventions. Each of the DMA/DSA pipes includes the EDAC stage, the Dual Port RAM, and Global Memory.

At the back-end, i.e. as an interface between the Global Memory and the disk array(s), only one "type" of interface is implemented. A SCSI back end interface is illustrated in FIG. 3E. The back end SCSI Director incorporates the SCSI interface chip which is modified to selectably implement one of several standard SCSI protocols. The interface chip, discussed hereinbefore with respect to the front end SCSI Director illustrated in FIG. 3A, is a modified SCSI Controller ASIC, part no. 53CFW96-3, manufactured by Symbios Logic. The chip is operated in the back end application to selectably drive a 16-bit single ended (wide) SCSI bus (although it can be selectably configured to directly drive a single ended 8-bit (narrow) SCSI bus as well). The SCSI chip(s) implement the standard bidirectional protocol and pass 16 bit Wide SCSI data in four pipes: an A and B pipe (XA and XB, respectively) on the X side controlled by an X control processor; and an A and B pipe (YA and YB, respectively) on the Y side controlled by a Y control processor. At the back end, there is a primary set of two SCSI interfaces and a secondary set of two SCSI interfaces (for a total of four SCSI interface chips) per side. On each side the primary or secondary SCSI interfaces are added for redundancy. The primary and secondary SCSI interfaces are alternately selectable. When two back end interface boards are configured next to each other in a system, the primary of one board can access the drives connected to the secondary of the adjacent board. This redundancy mechanism facilitates data availability even when one back end controller dies. The SCSI data from the selected, i.e. primary or secondary, SCSI interface(s) is passed in the four pipes on a bidirectional bus connected to respective SCSI Data Gate Array (GA) devices which assemble/disassemble 64 bit memory words going to/from Global Memory. Error detection and correction (EDAC), and Dual Port Ram (DPR) for buffering, are implemented in the four pipes for data transferred between the SCSI host and Global Memory. The SCSI back end Director also includes two DMA pipes and two DSA pipes (as illustrated in FIG. 3D), one of each for each of the X and Y processors.

The architecture according to the invention is implemented to maximize advantages associated with having dual processors, while minimizing the additional hardware associated with implementing such advantages. The architecture (implemented throughout all of the Directors) involves the sharing of functional elements among pipelines on a Director. In particular, each Director has only one EDAC (except for the differential SCSI front end Director described hereinafter). Likewise. each Director has only one DPR. The Global Memory is shared among all of the Directors in a system. Accordingly, independent arbitration is implemented for shared resources as described, i.e. on the lower side of the DPR, on the upper side of the DPR and for the Global Memory.

Figure 4A:
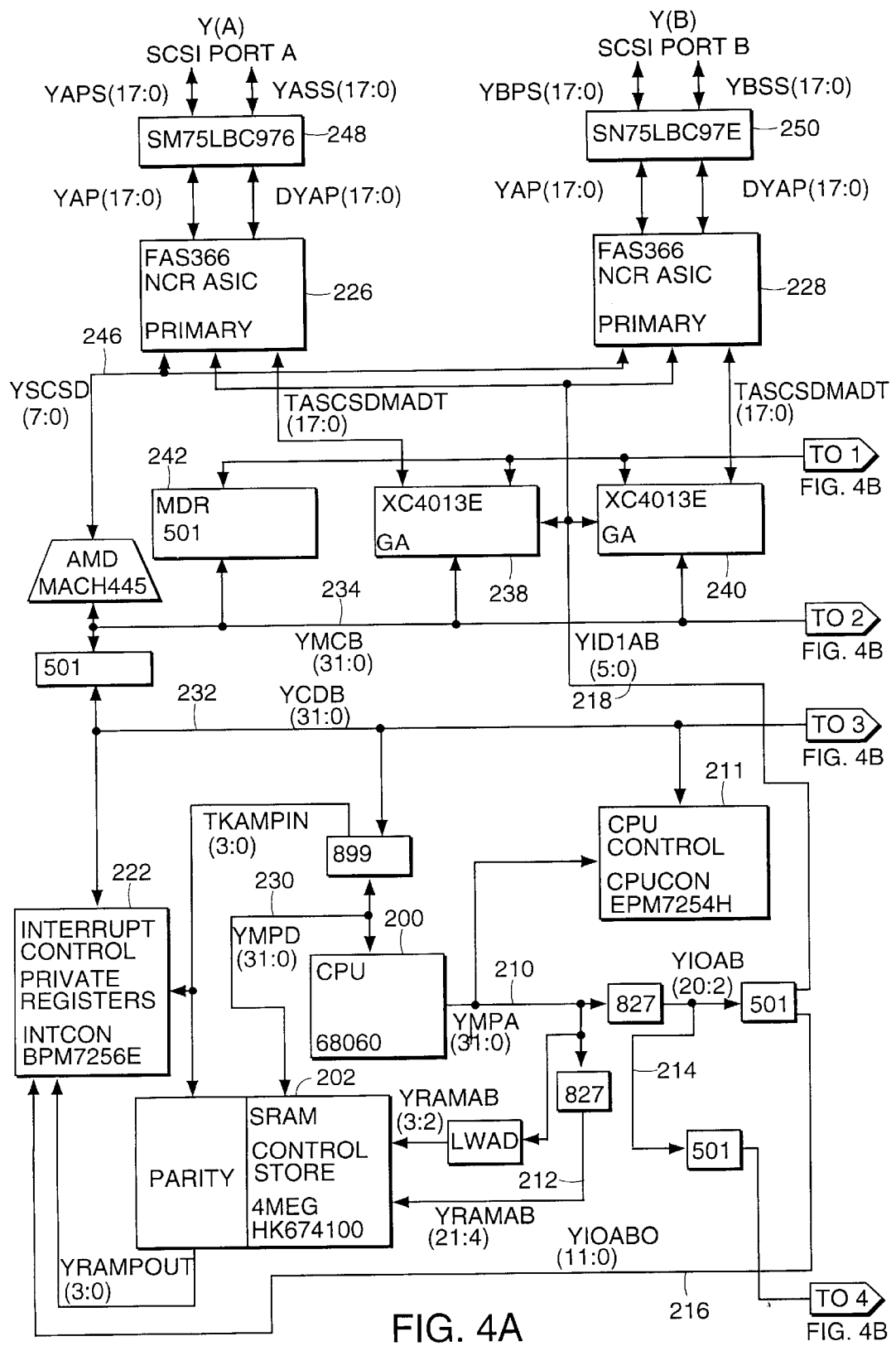
FIG. 4 is a detailed block diagram of a front end SCSI Director or adapter of an integrated cached storage system according to the invention.
Figure 4B:
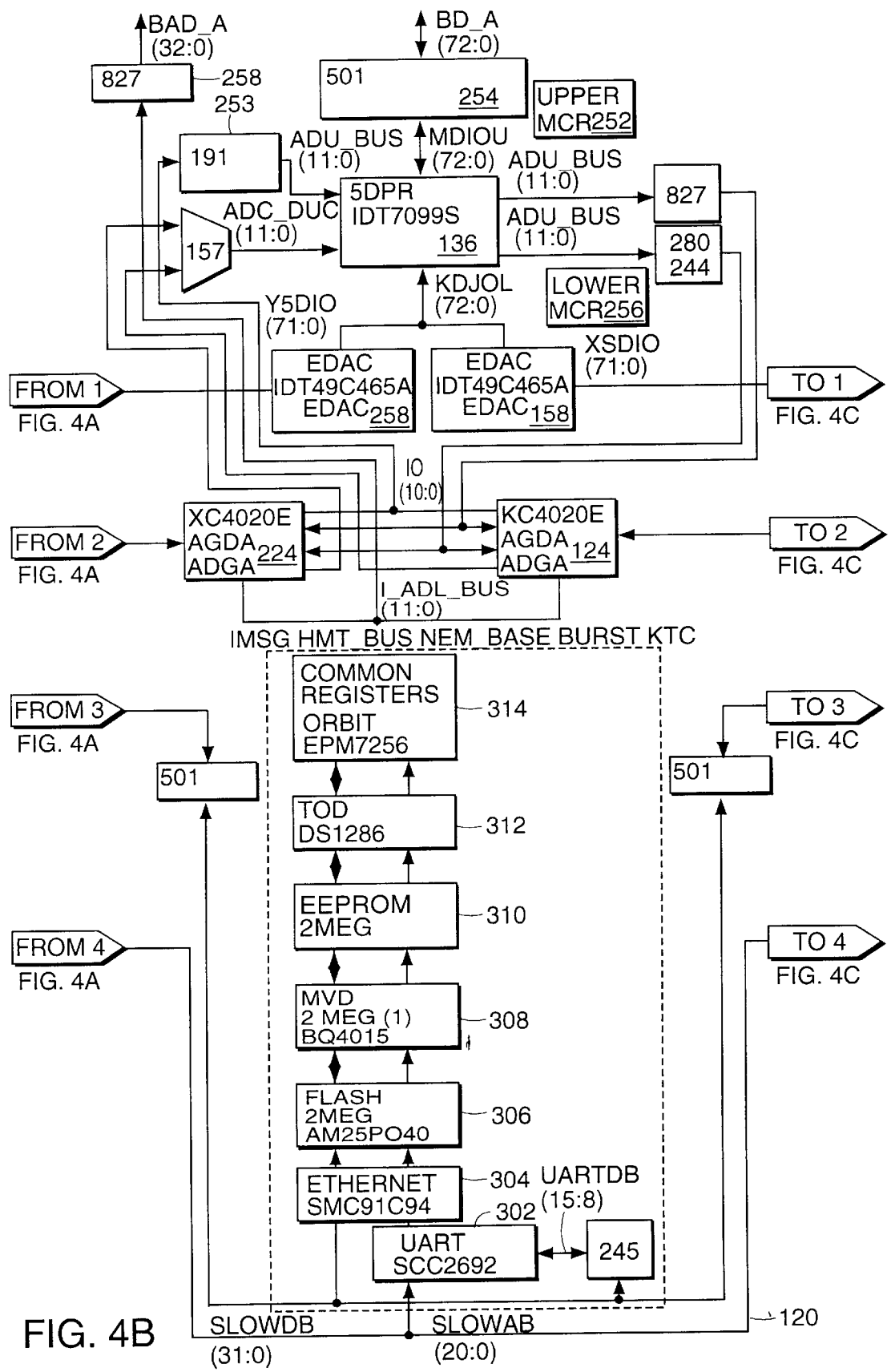
Figure 4C:
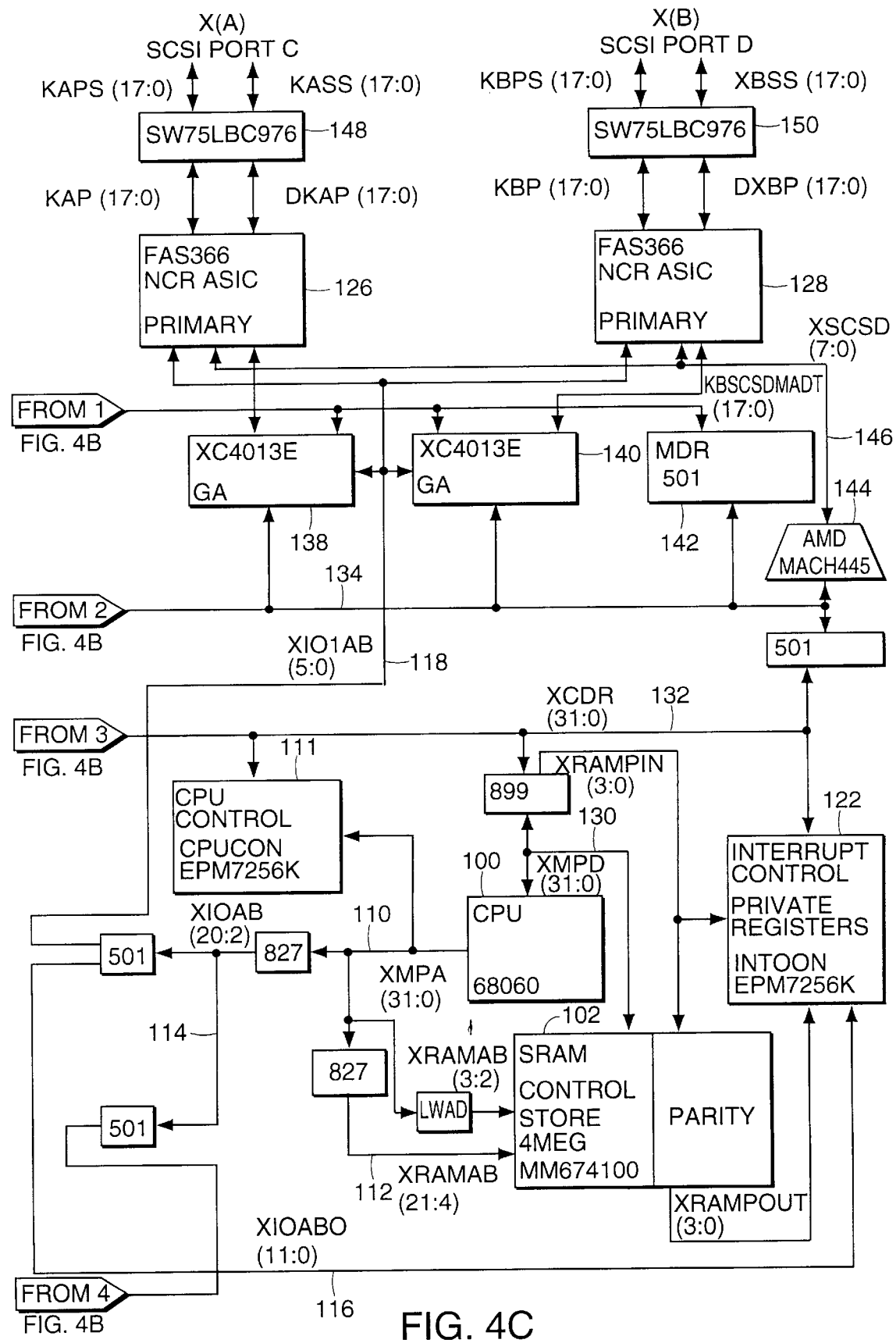

Referring now to FIG. 4, an exemplary front end adapter is illustrated in the form of a SCSI Adapter (SA), which includes components functioning, as with the various other types of front end Directors, to move data between the host and Global Memory. The SA, like the other front end Directors, is configured having two processor sides, an "X" processor side based around one Motorola 68060 microprocessor 100 designated the "X processor", and a "Y" processor side based around a second 68060 microprocessor 200 designated the "Y processor". The dual 68060 microprocessors, designated "X" and "Y", are implemented on the SA and on each of the other Directors to oversee pipeline operation. Each microprocessor 100, 200 is responsible for two respective "A" and "B" pipes, accounting for four pipes, designated "XA", "XB", "YA" and "YB". Generally, these four pipes, XA, XB, YA, and YB, are each of a type in accordance with the type of Director (front end or back end) on which they are located. That is, the XA, XB, YA, and YB pipes on the illustrative SCSI Director board described in detail hereinafter are all SCSI pipes (while the XA, XB, YA, and YB pipes on a Channel Adapter (CA) Director board are all CA pipes, etc.).

There is a shared hardware section 300 on each Director that contains hardware that is not duplicated for each processor. The shared hardware section includes communications mechanisms, such as a UART 302 and Ethernet 304 capabilities for communication with devices connected to the system and/or Director. Certain local memory, defined as memory on board a Director which is directly addressable by a 68060 (as opposed to Global Memory which is external, shared by all directors and is not directly addressable by a 68060), is shared by the X and Y side processors.

There are four kinds of local memory on a Director: Boot PROM or EPROM 310; Flash EEPROM 306; NVDRAM 308; and Control Store RAM 102, 202. All but the Control Store Ram are shared resources. The Boot PROM sometimes referred to as EPROM is actually a "Flash" type EEPROM device, similar to that used for the Flash EEPROM 306 devices. Boot EPROM is organized as a 512k×32 bit array, which is configured to be in the 68060 address space to allow the 68060 to boot. The boot EPROM contains bootstrap code, user commands and maintenance utilities. It may be updated in the board by downloading code using a download mechanism, or by copying code from another Director through Global Memory non-operational accesses.

The Flash EEPROM is also configured as a 512k×32 bit array and is mapped to the 68060 address space. Flash contains diagnostic code, initialization data used to configure gate arrays and kernel code and emulation code used during normal operation. Code is copied from Flash 306 to both processor's Control Store RAM 102, 202 for execution. Flash code may also be updated in-situ by downloading or by copying from another Director through global memory.

The control store RAM 102, 202 is where the 68060 fetches instructions from once the system is up and running. Code is copied from the flash (EEPROM) to RAM for execution. Running from control store RAM means that the system can run without wait states at its maximum rate (2 clock cycles/transfer) given a RAM access time of 20nS, this is much faster than running from EPROM or EEPROM with a typical access time of 200nS. The section of control store normally used to hold 68060 execution code may be write protected to prevent corruption.

Figure 5:
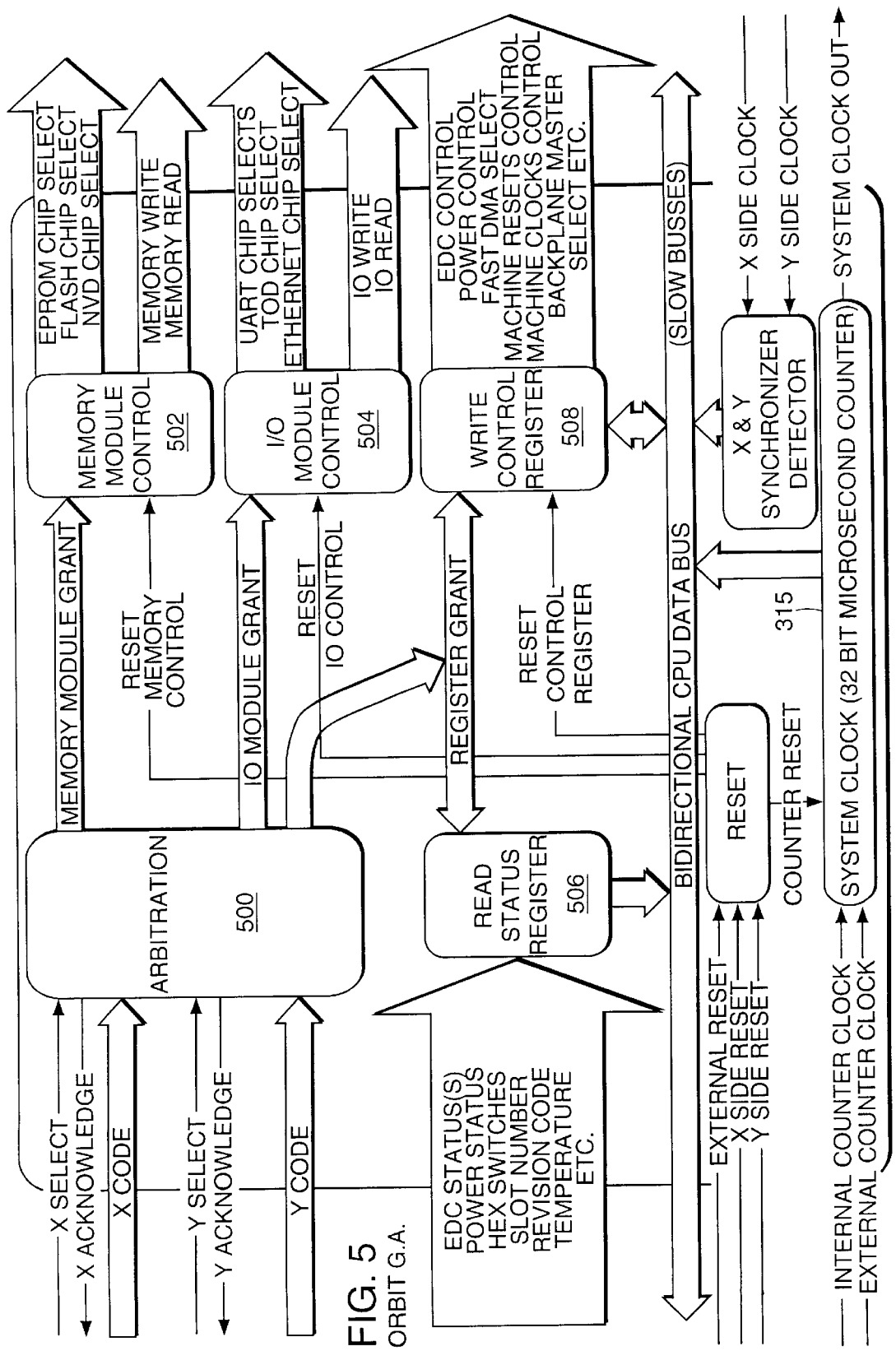
FIG. 5 is a block diagram of an ORBIT Complex Programmable Logic Device used to arbitrate and grant X and Y side processors access to shared resources.

The dual processors 100, 200 each access and run from independent control store RAM 102, 202. However, the processors 100, 200 run the same processor independent control program using an implementation that makes the hardware appear identical from both the X and Y processor sides. In some cases this means that the X and Y sides appear to use the same addresses but in actual fact the addresses are translated by a hardware mechanism located in an "ORBIT" PLD (Programmable Logic Device) 314, that is accessible to both the X and Y sides. All of the resources in the shared resources section 300 are available to the X and Y processors 100, 200 over a common bus. With the exception of Control Store RAM 102, 202 which is directly attached to the processor data bus(es) (XMPD, YMPD), all other local memory devices, and the ORBIT PLD and a Time of Day device 312 (TOD, as known in the art), reside on a Slow Data interface which includes a Slow Address bus (SLOWAB) and a Slow Data bus (SLOWDB) shared by the X and Y processors. The ORBIT PLD 314, a block diagram of which is illustrated in FIG. 5, is responsible for arbitration and control of the shared slow interface.

The ORBIT PLD also includes a 32 bit microsecond counter 315 which counts based on a one microsecond clock that is generated by a selected master Director. The clock is reset whenever the master Director holds a clock line low for more than three microseconds. When the clock line resumes toggling all of the Directors will then have available a substantially synchronized count in microseconds. This high precision time reference facilitates precision time stamping of errors and other events of interest in the system. Further, since all of the Directors share some system resources, e.g. Global Memory, and since some system-wide housekeeping is required, a known, high-precision time reference makes for more accurate and expeditious scheduling.

An arbitration mechanism 500 in the ORBIT PLD 314 determines access to all shared resources on the slow bus(es). Access to shared local memory (EPROM, FLASH and NVDRAM) is arbitrated by the ORBIT 314 and granted through its memory module controller 502. Processor access to shared UART and Ethernet communications mechanisms and the TOD are arbitrated by the ORBIT and granted through ORBIT I/O Module controller 504. The ORBIT PLD also maintains shared registers, Read Status Register 506 and Write Control Register 508 accessible to the X and Y processors, which include common registers GENSTAT and GENCON, respectively. The X and Y processors control and monitor the pipeline hardware by means of the GENCON and GENSTAT registers, access to which is determined by the ORBIT PLD.

The arbitration mechanism 500 in the ORBIT PLD 314 enables the X and Y processors to run the same control code, and to access different portions of a shared resource, e.g. NVDRAM or a common register, while appearing to the code to be accessing the same location. Such a "transparency" (or translation) mechanism (FIG. 6, 510), makes the code processor-independent and avoids having to replicate some resources that can otherwise be shared. The transparency mechanism causes the X and Y sides to appear to use the same addresses but in actual fact the addresses are translated by the arbitration transparency mechanism located in the ORBIT PLD.

Figure 6:
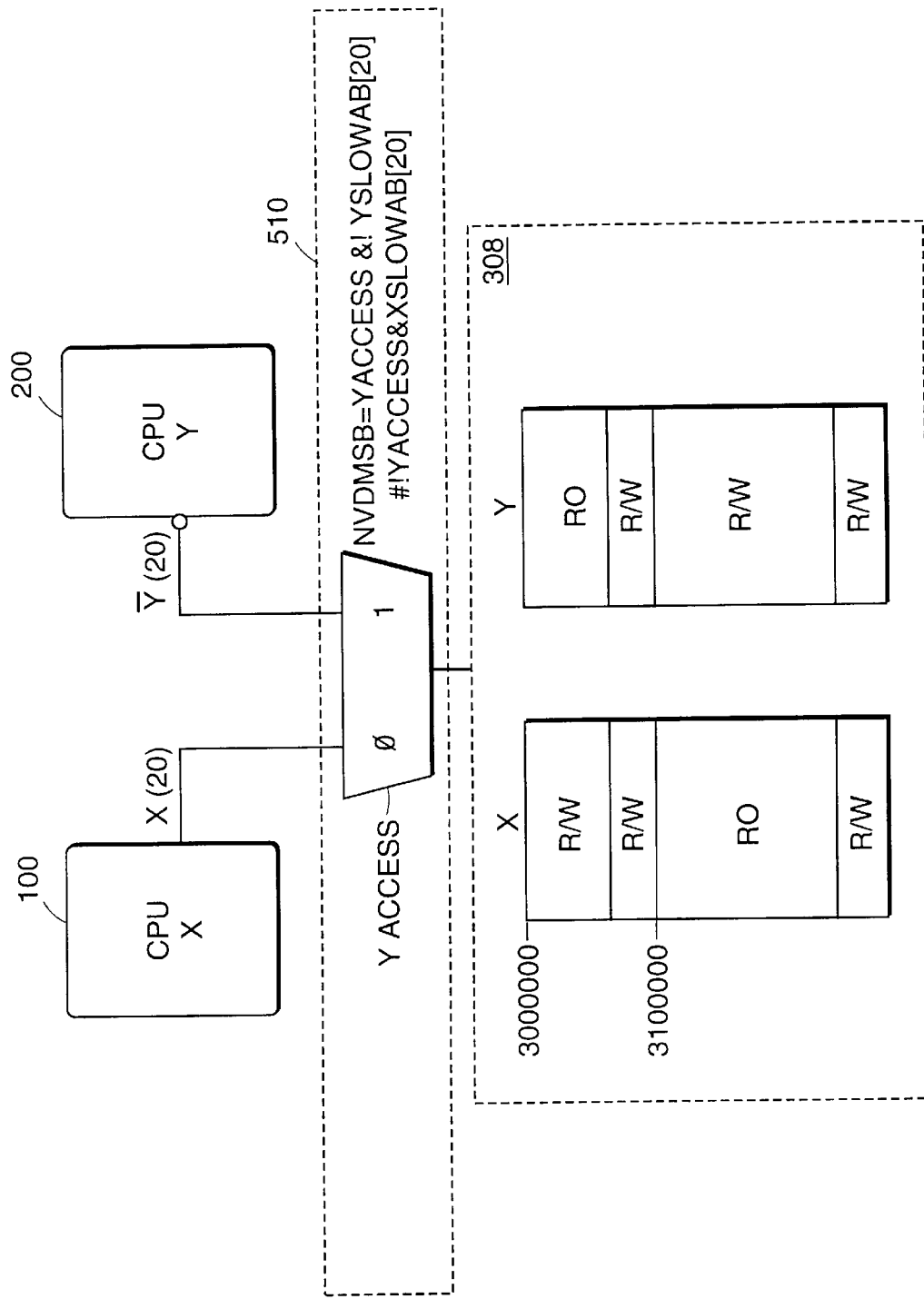
FIG. 6 is a block diagram of an NVDRAM shared resource accessible to both X and Y side processors.

For instance, in running the control program, independent but identical versions, the processors will on occasion need to access NVDRAM 308 which is shared by the X and Y processors on the slow bus. The NVDRAM 308 is used for logging and tracking error information, time stamping via the TOD 312, and also for communication between the x and y processors 100, 200. The information in the NVDRAM may be critical and thus by the non-volatile nature of the RAM it is retained until manually cleared. As illustrated in FIG. 6, NVDRAM 308 comprises 2 Mbytes of available NVDRAM, divided into two 1 Mbyte sections. According to the ORBIT arbitration mechanism, the first 1 Mbytes is read and writable by a current processor while the second 1 Mbyte is only readable by that processor. The second 1 Mbyte section is read and writable by the other processor, while the first 1 Mbyte section is read only to that other processor. Thus the two processors X and Y have a different overall view, i.e. capabilities, with respect to the same 2 Mbytes of NVDRAM. Each 1 Mbyte section is independently addressable, that is, each section is in reality a different address range. In executing the control program, the processors, X and Y, may need to access some NVDRAM location which to the control program would be the same location. The transparency mechanism causes the X and Y sides to appear to use the same addresses but in actual fact the addresses are translated by the ORBIT arbitration transparency mechanism 510 located in the ORBIT PLD.

The transparency mechanism 510 comprises a boolean equation, as illustrated in FIG. 6, which manipulates the most significant bit (MSB) of an NVDRAM address to effect the transparency. The NVDRAM address is passed over the slow bus (SLOWAB) shared by the processors (YSLOWAB indicates that a Y address is on the slow bus, while XSLOWAB indicates that an X processor seeks to address the NVDRAM). In this implementation the MSB determines which portion of the NVDRAM will be accessed. If the Y processor currently has access (i.e. is the current processor) accessing the NVDRAM (Yaccess), the state of the MSB (bit 20) is inverted ("!YSLOWAB[20]") and fed to the NVDRAM to access a Y portion of the NVDRAM. If it is not the Y processor ("#!Yaccess") attempting access (i.e. X processor or no one is accessing NVDRAM) then the MSB will stay the same ("XSLOWAB[20] ").

The dual 68060 processors 100, 200 run at 50/60/66 MHz from a crystal oscillator/PLL derived clock (depending upon the particular 68060 device used). Referring again to FIG. 4, a 32-bit microprocessor address bus, #MPA 110, 210 is provided for each 68060. The prefix "#" is used throughout the bus nomenclature, wherein "#" refers to either X or Y depending upon the processor side, as the buses are duplicated on each side. A CPU Control device 111, 211, comprised of a Altera EPM7256 Complex Programmable Logic Device (CPLD or PLD), is addressable over the #MPA bus. The CPU Control device 111, 211 carries out much of the 68060 address decoding, generation of control lines to various elements and return of acknowledge back to the processor. It also looks after buffer direction control, initiates DMA/DSA pipe operations, flags the occurrence of bus faults and provides a time-out function for 68060 bus cycles where no transfer acknowledge (TA*) is returned within a specific time period.

The CPU Control CPLD also handles address decode/wait state insertion/acknowledge generation for devices attached to or directly addressable by the 68060, this includes RAM, boot EPROM, Flash, NVDRAM, and I/O space used by pipes, UARTS, interrupt control, TOD, private and shared GENCON/GENSTAT registers which are contained in the ORBIT device 314 and used to control and monitor pipelines. The CPU control CPLD is used to control and monitor pipelines by having the functionality to decode the associated processors address bus and generate read/write, chip select and output enable lines for SCSI primary and secondary SCSI chips, Address gate array, A and B port Data gate arrays, and MDR. Acknowledge in the form of TA* is returned by the CPU Control CPLD to the processor to indicate completion of a bus cycle.

The #MPA bus is buffered to produce #RAMAB 112, 212 and #IOAB 114, 214 buses. The #IOAB 114, 214 bus is further buffered to produce the #IOABO 116, 216, the #IO1AB 118, 218 and SLOWAB 120 address buses. The SLOWAB bus 120 is shared by the X and Y processors and has "slow" 68060 shared resources on it, i.e. boot EPROM, FLASH, UARTS etc., as discussed hereinbefore.

The #RAMAB bus 112 addresses the control store RAM 102, 202. containing the control program for the respective processors. The #IOABO bus 116 addresses an interrupt control device or CPLD 122, 222 which is used to encode to various interrupt levels various sources of interrupts to the X and Y processors 100, 200. The #IOABO bus 116, 216 also addresses an address gate array 124, 224 through the interrupt control device 122, 222. The #IO1AB bus 118, 218 addresses SCSI interface chips 126, 128, 226, 228 used in the pipeline to read and write data as described in detail hereinafter.

The control store RAM 102, 202 is attached directly to 32-bit data bus #MPD 130, 230. The data bus is buffered to produce a general data bus, #GDB 132, 232, the buffers between the #MPD and the #GDB can be implemented so as to selectively generate/check byte parity, i.e. for transfers between certain devices. Known 74ABT899 buffers, manufactured by Cypress Semiconductor, are used to generate the #GDB bus 132, 232 from the #MPD and to selectively generate/check byte parity. The 899 buffers have their output enables controlled by the CPU control device 111, 211. The 899s are also responsible for generating/checking parity during processor write/read transfers respectively. Parity is not supported for transfers between all devices. Based on the address present on the processor address bus, the CPU Control device 111, 211 determines if parity should or should not be checked. Where parity should be checked the CPU control CPLD generates the appropriate byte check parity strobes, (XCKPAR*, 3:0), which are routed to the Interrupt Control CPLD 122, 222. Parity errors are latched by the Interrupt Control device 122, 222 and may be monitored via a 68060 register (PGENSTAT2).

Figure 7:
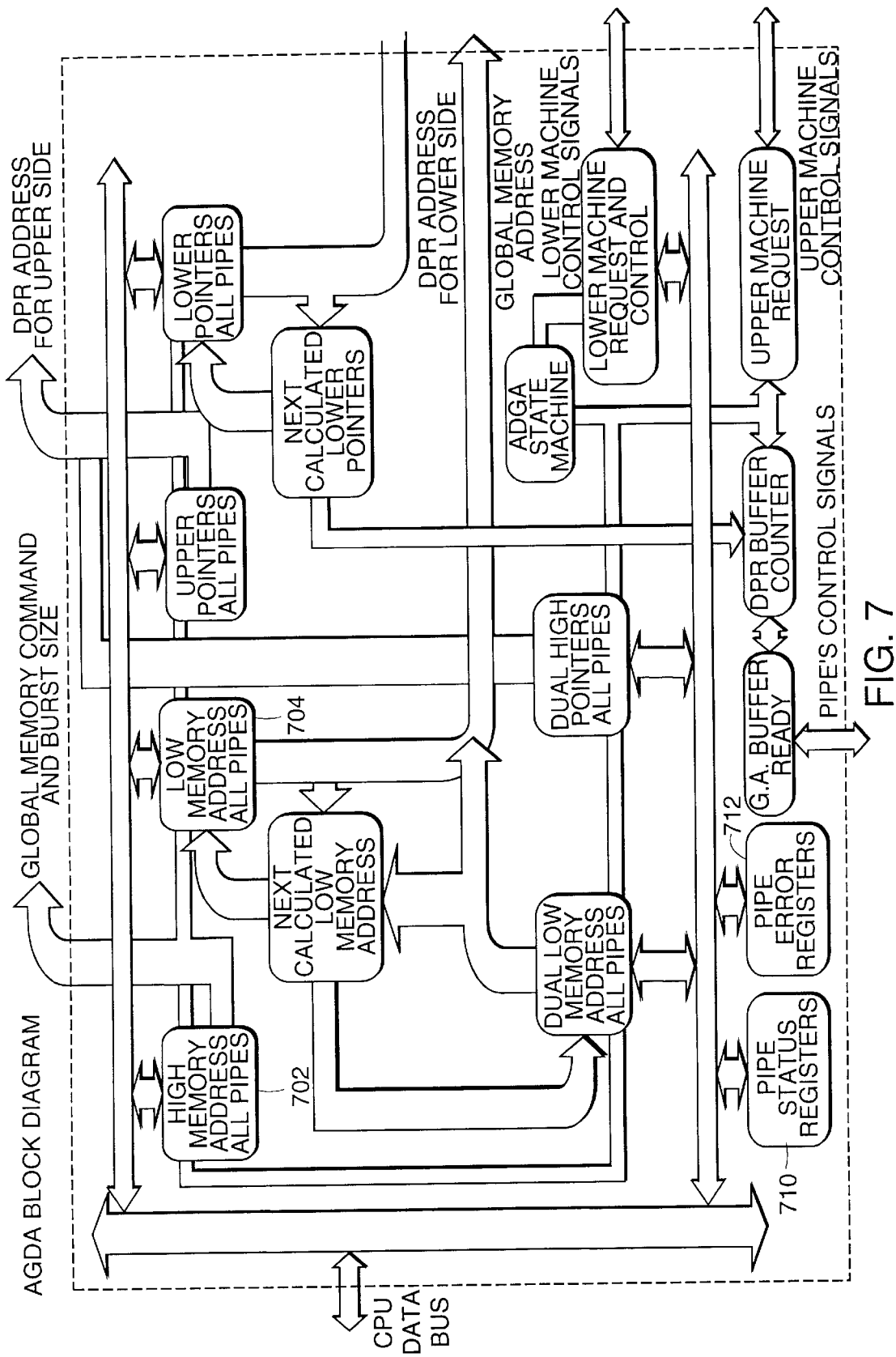
FIG. 7 is a block diagram of an address gate array.

The interrupt control gate array 122, 222 is on the #GDB bus. The #GDB bus is further buffered to produce a Memory Data Bus #MDB 134, 234 to which is attached, among other things, the address gate array (ADGA) 124, 224. The ADGA, illustrated in FIG. 7, provides a significant amount of functionality and control related to Dual Port Ram (DPR) 136 used in the pipelines to buffer data transfers to/from Global Memory. Global Memory operations are initiated by the specification of a Low Memory Address, by a 68060, which specifies a starting address for a Global Memory operation. A High Memory address is also specified to provide the limits of the memory transfer. Each of the pipes utilizes the DPR and its pointer system, which is substantially similar to the known pointer system described hereinbefore. The ADGA provides High Memory Address storage 702 for all pipes. It also provides for Low Memory Address storage 704 for each pipe, Upper pointer storage 706 for each pipe, and Lower pointer storage 708 for each pipe. The ADGA is configured with circuitry to monitor upper and lower pointers and generate memory requests issuing Global Memory commands and indicating burst size as required. The ADGA increments memory address and modifies DPR pointers during Global Memory operations. The ADGA maintains pipe status registers 710 and pipe error registers 712 for the A, B, DMA and DSA pipes.

Logic is also implemented in the ADGA to facilitate a limited prefetch operation used by a 68060 control processor in some situations, i.e. DMA pipe memory accesses. A command can be issued by the 68060 to the ADGA to effect prefetch once only to reduce traffic on the backplane. The 68060 command is a non-operational instruction that is used when only a small amount of data, i.e. one to 32 memory words is needed by the control processor. The limited prefetch overrides normal memory operation in that it does not undertake the filling of first and second buffer sections in the DPR. Only the number of words actually specified by the 68060 with issuance of the command will be retrieved and loaded into the DPR to be read by the 68060. The limited prefetch capability has the advantage of reducing bus traffic and system latency as overhead memory operations undertaken by the control processor(s) is reduced by the limited prefetch capability. That is, unnecessary traffic on the backplane, and additional delay of other Directors memory users is avoided.

The ADGA implements a state machine 714 that effects arbitration for the upper side of DPR between pipes in the same group. Arbitration between the four pipes in group, that is under one processor, the A, B, DMA and DSA is handled internally by the address Gate array. The address gate array then asserts a request signal out to an "Upper Machine" 252 controlling transactions on the upper side of the DPR as described hereinafter. In the event of an X side request and a Y side request being asserted simultaneously the Upper Machine arbitrates between the X and Y groups.

If the ADGA receives an indication of a need to use Global Memory, the ADGA will initiate a request to the Upper Machine to access the Global Memory. In the event of multiple requests to use the DPR on the upper side (i.e. the Global Memory side) the ADGA will first arbitrate internally on a per side basis. The ADGA then asserts a request line to the Upper Machine/upper arbiter. Assuming arbitration between the X and Y groups is won, the ADGA will present address and pointer information to the Upper Machine which will proceed to request/select Global Memory and output the upper pointer value on the IB(10:0) lines. From here it is loaded to a counter where it initially passes straight through to become the address to the upper side of DPR. In the case of all transfers except DSA pipe (which only transfers a single word), the counter will increment the upper pointer as each memory word is transferred. The most significant bit is a function of the X or Y group and is generated by the Upper Machine. At the end of a burst transfer, the current value of the incremented pointer, from the counter outputs, is buffered and fed back to the ADGA for error checking.

If the DPR fills up during a read, or needs to fill during a write, circuitry internal to the ADGA will initiate a Global Memory request by asserting a request line to the upper machine 252. Assuming arbitration between the X and Y groups is won, the upper machine will respond by asserting an acknowledge back to the ADGA, which will proceed to request the Global Memory bus. Assuming the request stage is successful and the Director wins the bus it will then attempt to select the memory by outputting a memory address and driving the command lines. If the Director does not obtain the bus or the memory board does not respond by asserting grant within a certain interval, the Upper Machine will generate a memory time-out. The time-out line is routed to the ADGA and will cause the attempted memory operation to terminate. On completion of the memory cycle, when the memory board de-asserts grant to the Director, the upper machine will assert a done signal to the address gate array.

The ADGA also generates overflow interrupts when a pipe memory address hits a 512k boundary on a Global Memory operation. When overflow is received, the processor has to access ADGA to increment the Low memory address. The ADGA is involved in substantially all reads and writes to Global Memory and is integral in the implementation of a Dual Write feature, as described hereinafter.

Figure 8:
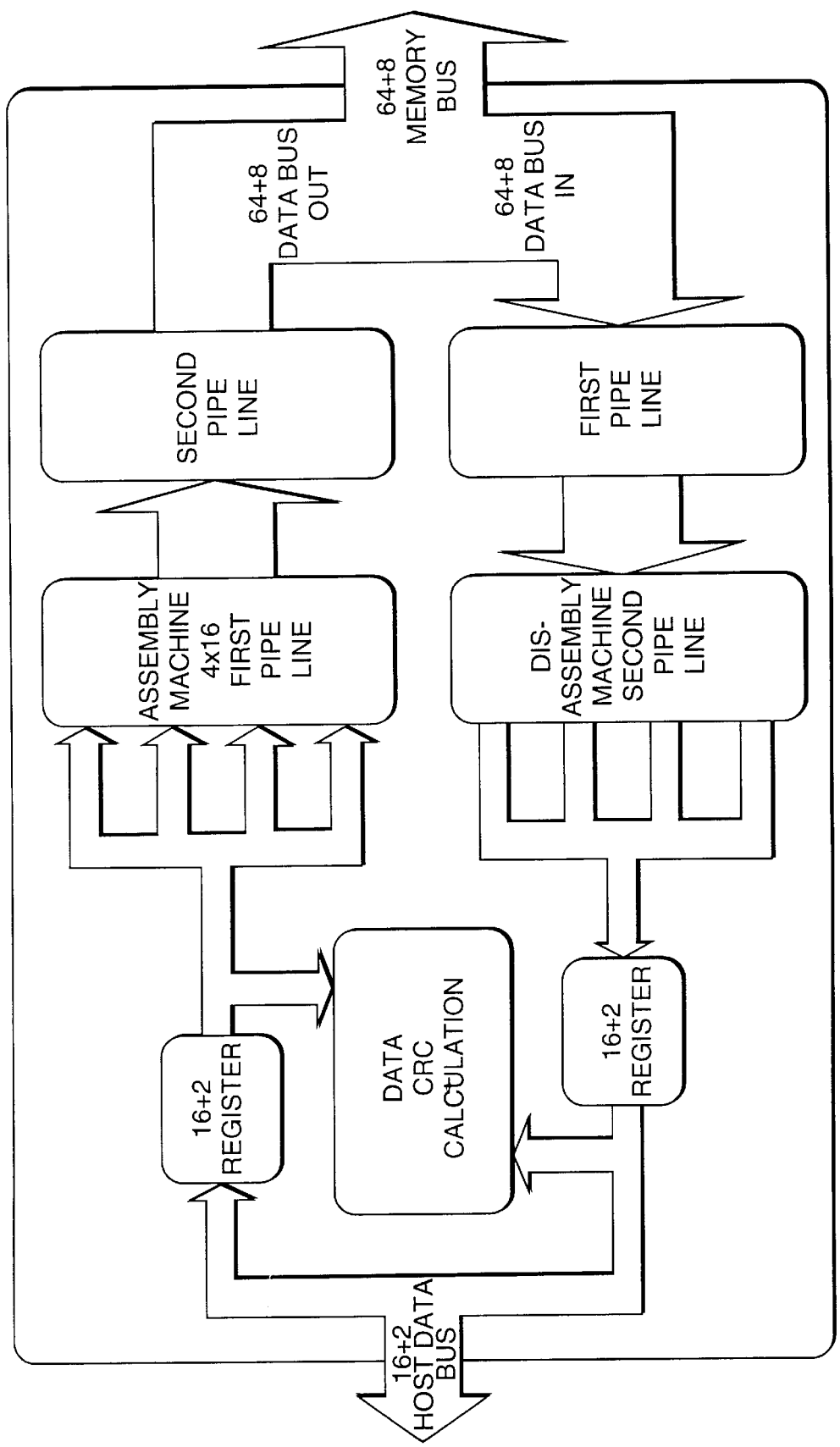
FIG. 8 is a block diagram of a data gate array.

The #MDB bus which communicates with the ADGA, also communicates with data gate arrays 138,140 for the A and B pipes on the X side, and data gate arrays 238,240 for the A and B pipes on the Y. A data gate array, as illustrated in FIG. 8 and as discussed hereinbefore, merely assembles or disassembles memory words for transfer between a host and the Global Memory. In some cases, such as in a Channel front end implementation as illustrated in FIG. 3B, data format conversion functionality to format data to a host interface protocol will be implemented in the data gate array stage of a pipe to transform data in accordance with the particular requirements of a host. The MDR 142, 242, functioning in the DMA and DSA pipes as described hereinbefore, is also accessible over the #MDB bus.

The #MDB bus 134, 234 is muxed/buffered by AMD MACH445 devices 144, 244 configured as a bus multiplexor, to generate an #SCSD bus 146, 246. The #SCSD bus is a SCSI data bus to the A and B SCSI chips 126, 128, 226, 228. The SCSI chips in this front end application are configured for 16-bit Wide differential SCSI communication as known in the art. The SCSI chip is capable of sustaining data transfer rates up to 20 Mbytes per second in synchronous mode and 14 Mbytes per second in asynchronous mode. Asynchronous bursts up to 20 bytes/second are possible with proper cabling. The device contains a 32-byte FIFO. All commands, data, status and messages pass through the FIFO on their way to or from the SCSI bus. The FIFO is accessible via the SCSI bus (#SCSD), the microprocessor bus (#MDB), and a DMA bus (#IO1AB). Each of the SCSI chips 126, 128, 226, 228 goes to the backplane, i.e. for communication with a SCSI host, through respective SN75LBC976 differential transceivers 148, 150, 248, 250, forming SCSI ports A, B, C and D.

Transfers of data to/from Global Memory effected by the pipes on the SA board involve the DPR 136, which is used by all of the pipes to buffer data transfers effecting pipeline staging and effectively decoupling data transfers from system bus timing. The DPR 136 has an "upper" side whereat transfers between the DPR and the backplane to/from Global Memory are effected, and a "lower" side whereat memory words are assembled/disassembled and transferred to/from the DPR. At the upper side, an FCT16501 bi-directional transceiver provides a final pipeline stage in write operations, basically putting a memory word on the backplane for access to a memory board data path. At the lower side, the DPR is preceded by Error Detection and Correction provided by an IDT 49C465A EDAC implementation (involving sets of IDT EDAC chips known in the art, illustrated as a pair of EDAC sets) 158, 258. The pass through EDAC stage is preceded by memory word assembly/disassembly via the gate array devices 138, 140, 238, 240.

Dual Port RAM (DPR) 136 on the Director(s) is a random access memory that can be accessed simultaneously via two independent ports, typically referred to as left and right. The devices have duplicate address, data and control lines for each side and allow simultaneous access on both sides. The DPR devices are synchronous devices, that is all transfers are controlled by a clock. The address, read/write line state (and data for a write cycle) are latched on the first rising edge of the clock after clock enable (CLKEN*) and chip enable (CE*) are asserted. The devices are 4k deep by 9-bits wide (designed for 8-bit data plus parity). The parity bit has separate control lines, output enable and read/write, from the other 8 data bits.

The DPR located on each Director serves as a buffer between the Director and main memory. The dual port features imply that the device has two independent ports which provide access to the same memory locations. The two ports, are referred to in the present illustrative embodiment, as lower or machine side (right) and upper or Global Memory side (left). Although the devices permit apparent simultaneous access from both sides, even to the same location within the device, the nature of the present application is such that this should never occur. In the present illustrative application the control lines for the 8 data lines are connected to the control lines for the parity lines as the devices are effectively used to hold nine data bits. The 72-bits of a memory word (64-bit data and 8 ECC bits) will then fit in 8 physical devices, the least significant 7 devices containing all data while the most significant device contains the most significant data bit and the 8 ECC bits.

DPR is organized as a 4k×72-bit (64-bit data+8 ECC bits) buffer using eight 4k×9-bit devices. It is divided in two, using the most significant address bit, bit-11. The section from 0 to 7FF is used solely by the pipes under the X processor while the section from 800 to FFF is used solely by the pipes under the Y processor. The buffer is configured such that it is not possible for any of the X processor pipes to use the area of DPR normally used by the Y processor pipes and visa versa. From a programming point of view, to make the code independent of processor, both the X and Y processors appear to operate in the 0 to 7FF range. The hardware however translates addresses in the 0–7FF range to the 800-FFF range for the Y processor. DPR is not directly addressable by the X or Y processors and is in fact addressed by means of pointers.

The DPR is addressed by means of a system of pointers. There is one pointer, the upper pointer for the upper side and another, the lower pointer for the lower side. The pointer value is a memory word rather than a byte address and therefore increments by one as each memory word is transferred. Each pointer originates in a 16-bit register where the least significant 12-bits are actually used as address bits for the DPR. Every pipe on a Director has a unique upper and lower pointer associated with it. These pointer values are stored in registers in the ADGA, as described hereinbefore. As there is only one bus on the lower and one bus on the upper side of DPR, only one pointer can be active on each side at a time. All pointer values are initially loaded by the X or Y processors. The appropriate pointers for the pipes which are active on the upper and lower sides of DPR will be selected by the upper machine/arbiter 252 and a lower machine/arbiter 256, which are responsible for arbitration on the upper and lower sides of the DPR, respectively.

When any pipe, other than the DSA is operating, its pointers, maintained in the ADGA 124, 224 will be incremented automatically as the data transfer progresses. No incrementing of pointers takes place for the DSA pipe which only transfers a single word. For the pointers to be able to scan through the 64 memory word locations used by each pipe (32 in a first buffer portion and 32 in a second buffer portion, as illustrated and described hereinafter with respect to FIG. 9), the machine has to be able to increment 6-bits of the pointer. Incrementing of the lower pointer is done by the ADGA. Incrementing of the upper pointer is done by a counter external 253, external to the ADGA and at the end of a memory transfer the incremented value is fed back to the ADGA for error checking.

Since the DSA pipe only transfers a single memory word per transfer there is no need to increment the pointer values. In the case of the upper pointer for the DSA pipe, the "next" pointer is still written back to the ADGA by the machine, the difference with the DSA pipe being that the "next" pointer should be the same as the previous pointer as no incrementing takes place. The current pointer value can be read from the ADGA by the controlling X or Y processor at any time. The lower pointer is written/read on bits (15:0) of the data bus while the upper pointer is on bits (31:16). This allows the processor to read or write both pointers in one bus cycle and thus makes for more efficient operation.

Figure 9:
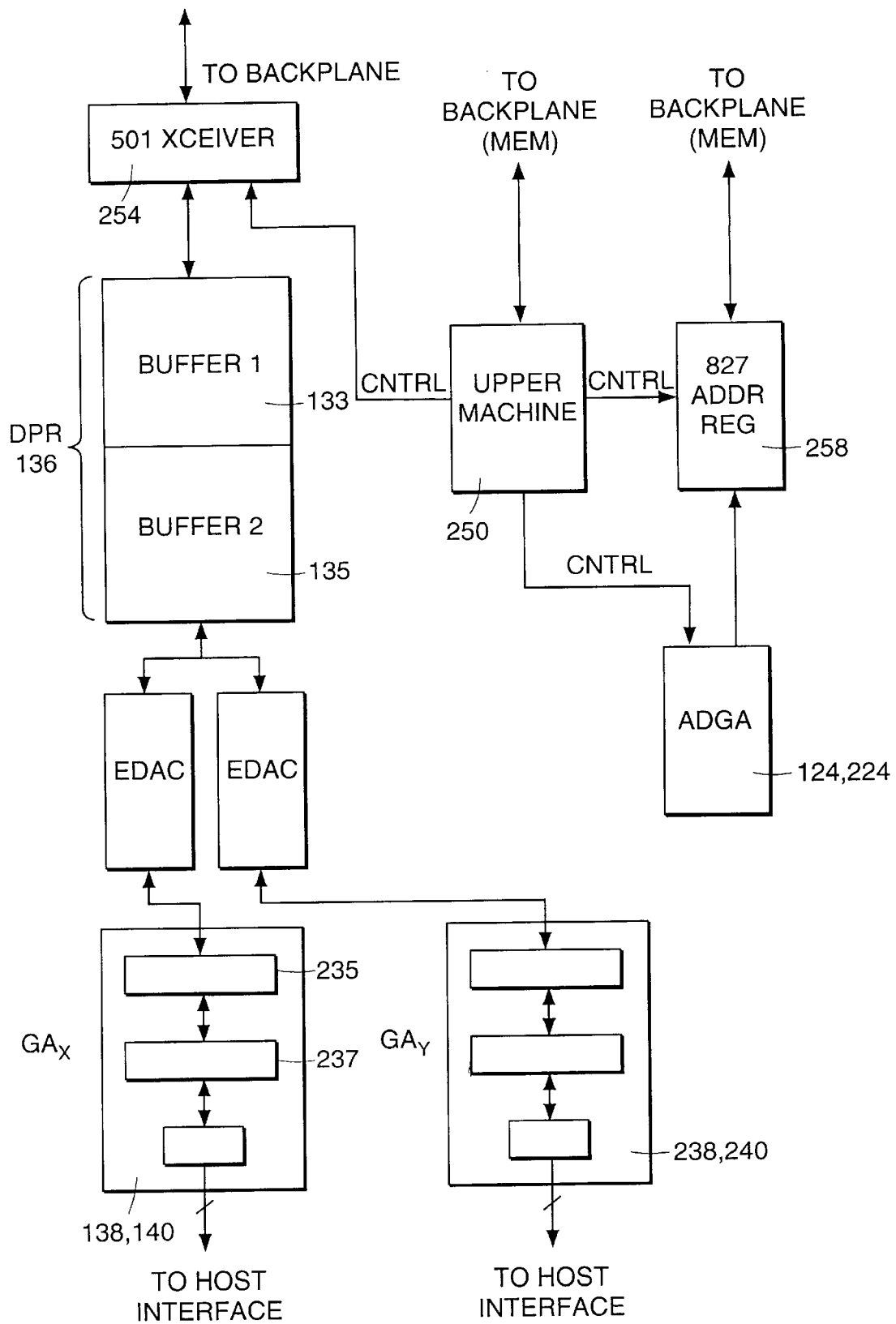
FIG. 9 is a block diagram illustrating a portion of a pipeline including pipeline stages in a data gate array of FIG. 9 and buffer stages in a Dual Port Ram.

Referring now to FIGS. 4 and 9, the DPR is integrally involved in data transfers from Global Memory, i.e. read operations. In a situation where a host requests a read, interface logic (i.e. in the case of the SA board the SCSI ASIC(s), otherwise the ESCON Adapter or Channel CPLD) receives an operation command and provides information to the Director's processor. A 68060 processor reads the information from the interface logic registers and determines what setup is required as a function of the pipe being used. The processor writes the primary memory address, pointers for the DPR and command to the ADGA 124, 224, using the CPU control interface chip 111, 211 to access the ADGA 124, 224. The processor writes the command, transfer size, and direction (i.e. read or write) to the interface logic (SCSI ASIC, ESCON Adapter or Channel CPLD). Once the processor writes the read command to ADGA 124, 224, the ADGA requests the Upper Machine 252 to prefetch two buffers of data (64 memory words). The Upper Machine 252 requests a backplane access to Global Memory and at the same time informs the ADGA 124, 224 to present the memory address, burst size, memory command and DPR pointers (address) for the data to be read from memory. The memory address is sent to a FCT16827 address register 258, and a memory command is sent to FCT806 drivers (not shown), to be sent over the backplane. The DPR pointer (upper) is loaded into counters that are used to generate the address for the DPR.

The DPR 136 is initially empty. The pipeline direction is set to "read from Global Memory" as a result of the memory command, and a pipe is enabled. As the DPR 136 is empty, a request (UREQ*) will be asserted immediately to request the use of global memory. If all is in order, the Director will ultimately succeed in getting the Global Memory bus and selecting the memory board. When the Upper Machine 252 is granted the backplane the memory command, burst and address are sent to Global Memory. The memory in turn is responsible for driving the clock that sends the data to the Director. The memory clock is received on the Director and in turn generates the clocks for the FCT16501 (254, FIG. 4), DPR 136 and the F191 counters 253. A first buffer section (buffer 1, 133, FIG. 9) of the DPR will be filled from global memory, using the upper pointer. A second buffer section (buffer 2, 135, FIG. 4) is still empty so the request (UREQ*) will remain asserted initiating another memory request to fill the second buffer section.

The ADGA 124, 224 maintains the request to the Upper Machine to fill the second buffer. Once the first buffer section 133 has been filled data will be available to move along the pipe, this will be indicated by the ADGA, by asserting a signal (e.g. XA_DPR_GA_RDY*). The pipeline can now remove this data from the low side using the lower pointer while the second buffer section 135 is being filled . The data is received by the Director in the DPR full/first buffer section is available to the Assemble/Disassemble GA's (e.g. 138, 140). A prefetch out of the DPR to the GA's of 2 memory words is done to fill two pipeline stages 235, 237 in the GA. This is done by requesting a Lower Machine access. The Lower Machine arbitrates requests from all pipes. When arbitration is granted to the GA, data is sent from the DPR to the GA. The Lower Machine will inform the ADGA which pipe has been selected by a 2 bit code. The ADGA decodes the code lines for the pipe and asserts the pointer (lower) to the DPR. The Lower Machine is responsible for asserting the control logic that will allow the DPR to send the buffered data and the EDAC (IDT49C465) to check this data. A control signal from Lower Machine output enables the data from the DPR onto the system data bus (SDIO) and another signal latches it into the GA. The ADGA will then internally increment the pointers for the next piece of data. It will also perform some error checking on the transfer to make sure the data was written successfully to the DPR. ADGA provides an Error and Status register that the processor reads for the transfer information.

The GA will continue requesting data from the DPR to fill its pipeline stages by requesting Lower Machine access as long as it has empty pipeline stages. The GA will disassemble the memory words into the format for the appropriate interface logic. The GA will send the data to the interface logic when the Host starts requesting data. The GA and DPR repeat the operation until the transfer count of the Host operation is reached. On the lower side, as the pipe removes data to the GAs and the lower pointer crosses the 20 hex boundary the first buffer section will become available to the high side once again to be re-filled from Global Memory. The second buffer section, if filled, becomes available to the lower side to be emptied.

For burst transfers during reads, the Director calculates the final address for each burst transfer. As a check at the end of each transfer, the Director compares bits 5:0 of the address with bits 5:0 of the upper pointer which has been incremented by the bus clock. The address and pointer bits should be equal, any difference is reported by the director as a read count miss error.

If a DPR buffer empties, the ADGA will automatically request another buffer as described. If the host finishes the data transfer, the interface logic will generate an interrupt. The processor will poll on the interrupt register looking for the interrupt bit to be set. When the processor detects this bit being set it will end the transfer and check for status. The processor will then disable the interface logic and ADGA.

Referring still to FIGS. 4 and 9, in effecting a write operation a host requests a write operation. Interface logic (i.e. SCSI ASIC, ESCON Adapter, Channel CPLD) receives an operation command and provides information to the Director's 68060 processor. The processor reads the information from the interface logic registers, determines what setup is required based on the command specified, and writes the primary memory address, pointers for the DPR 136, and command to the ADGA. The CPU controller 111, 211 is used for these operations to access the ADGA. The processor writes the command, transfer size, and direction (read or write) to the interface logic (SCSI ASIC, ESCON Adapter or Channel CPLD). The write operation starts when the command is written to the interface logic.

The operation starts with the DPR 136 empty . The pipeline direction is set to "write to Global Memory" as a result of the command, and the pipe is enabled. As the DPR is empty, a signal (XA_DPR_GA_RDY*) from the ADGA 124, 224, will be asserted indicating to the pipe data gate array (GA) that the DPR can accept data. When data is received by the Director's Assemble/Disassemble GAs it is assembled in the GA's pipeline stages. When one memory word (8 bytes) is assembled a Lower Machine 256 access is requested by the GA, effectively requesting bus access to the DPR 136. The interface logic allows the Host to continue transferring data, because the built in pipeline stages the GA has (and the pipelining/buffering provided by the GA, EDAC, DPR, and 501 transceiver) effectively decouple data transfer processing from the system bus timing. The Lower Machine arbitrates requests from all pipes. Arbitration is undertaken by the lower machine as described hereinafter, to grant access to the DPR to the GA that has assembled the memory word, and to issue a control signal which enables the GA onto the data bus to the DPR 136. After arbitration is effected according to the suitable arbitration scheme, a 2-bit code is sent to the ADGA on lines corresponding to the pipe that won arbitration. This code identifies one of the four pipes, A, B DMA or DSA. When a valid code is asserted an appropriate lower pointer is selected, which comes out of the address gate array on the ADL_BUS(10:0) lines. These lines are routed to the DPR 136 through a mux 152, the mux outputs being the address lines on the DPR lower side. The mux 152 is used to select between a lower pointer for the X or Y group of pipes under control of the Lower Machine PLD 252. The lower pointer is incremented internally in the ADGA after each memory word is transferred.

The ADGA decodes the code lines for the pipe and asserts the pointers to the DPR. The Lower Machine 256 is responsible for asserting the control logic that will allow the DPR 136 to write/receive the data and the pass-through EDAC (IDT49C465) to check the data.

As data is presented on the low side the DPR first buffer section 133 starts to fill. The ADGA will then internally increments the pointers for the next piece(s) of data. It will also perform some error checking on the transfer to make sure the data was written successfully to the DPR. ADGA provides an Error and Status register that the processor reads for the transfer status information. The GA will continue sending data to the DPR. When the lower pointer crosses a 20 hex boundary, indicating in the ADGA that the first buffer section 133 of the DPR 136 is full, a memory request will be initiated by the ADGA asserting a request signal (#UREQ). The ADGA switches the pointers to start filling the second buffer with the next memory data. As the second buffer section is still empty, the GA ready signal (XADPR_GA_RDY#*) remains asserted so the pipe can continue to write data to be assembled in the GA pipeline stages and moved to the second buffer section 135 from the lower side.

When the ADGA detects the first buffer section 133 full, the memory request is made to the Upper Machine 252 which requests a backplane access to Global Memory and at the same time informs the ADGA to present the memory address, burst size, memory command and DPR pointers for the first piece of data to be written to memory. The Upper Machine 252 clocks the DPR so data is sitting in the backplane transceivers 254. The memory address is sent to the FCT16827 address register 258 and the memory command is sent to FCT806 drivers. The DPR pointers are loaded into F191 counters that are used to generate the next address for the DPR. However, none of these devices are enabled on the backplane bus. If all is in order and the controller succeeds in getting the global memory bus and selecting the memory board, the data will be transferred from the upper side of the first buffer section 133 of DPR 136 to global memory (while assembly of memory words and filling of the second buffer section 135 are ongoing). When the Upper Machine is granted the backplane, it enables the backplane drivers (254, etc) and sends a backplane clock to memory, to clock in the data. It also sends clocks to the DPR and F191 counters. This operation will be repeated as a function of the size of the burst.

The data being transferred to Global Memory is moved from the DPR 136 tracked by the upper pointer. When the upper pointer crosses a 20 hex boundary the first buffer section 133 will become available to the low side once again. When the transfer is complete the Upper Machine notifies the ADGA which in turn checks for errors. Status is given to the processor in the form of a register.

During the time that the first buffer section is being emptied to Global Memory the pipe continues filling the second buffer section 135 from the low side. When the lower pointer crosses the 40 hex boundary a further memory request will be initiated by the ADGA (by again asserting XUREQ). This time data is transferred from the second buffer section 135 of DPR 136 using the upper pointer. When the upper pointer crosses the 40 hex the second buffer section will become available to the low side once again. At this time the first buffer section 133 should have been emptied so should be available again to the lower side which will start to fill it once again. In effect, the first buffer section and the second buffer section alternately fill from the low side and empty to the upper side (i.e. Global Memory).

If memory is not accessible when the DPR pipe fills the first and second buffer sections of the DPR, the GA ready signal (#ADPR_GA_RDY*) will de-assert thus blocking any attempted transfers to the DPR by the pipe and effectively stalling pipe operation until data gets moved from DPR to Global memory.

It should be noted that during burst write transfers, the number of 64-bit memory words transferred depends on the burst size and the memory starting address. The Memory Controller on the selected memory board determines the number of memory words it is to receive, from address bits (4:0) and burst bits (4:0) and loads a transfer counter with the appropriate value. The counter decrements as the transfer progresses and produces a termination signal when the transfer is complete. The Director supplies the initial address including the starting bank address on memory address bits BAD(4:0) for a burst transfer involving more than a single word. The Memory Controller alternates addressing to odd and even banks until the required number of words are transferred, or until a 100 hex byte boundary (32 words) is reached, whichever occurs first, whereupon the memory returns the ending status on END_ST(3:0) to the Director. A write count miss error is returned if the actual clock count is not equal to the count calculated on the starting address and burst size determined at the start of the transfer. The status bits are latched by the Upper Machine and provided to the ADGA. The ADGA then reports the status in the error status register.

The integrated cached storage system according to the invention implements a "Dual Write" mode feature or mechanism that facilitates redundancy in data storage by writing the same data to two different locations in Global Memory, while the write data is only processed through the pipeline once. The Dual Write mode is a modification of the write described hereinbefore. The feature is implemented by setting a bit in the command when issuing a write command to a Director. The ADGA (FIG. 7) includes dual memory address and dual pointer storage for use when the dual write mode is effected. When the mode is set, at the initial part of the operation the processor reads the information from the host interface logic registers, determines what setup is required based on the command specified, and writes the primary memory address, pointers for the DPR 136, a command, and a dual memory address to the ADGA. The dual memory address is the location in Global Memory at which a second copy of the data will be written.

In the dual write mode, the data is only assembled in the DPR one time as described hereinbefore. After the data is written a first time and when the transfer is complete the Upper Machine notifies the ADGA, as usual, which in turn checks for errors. Status is given to the processor in the form of a register. The ADGA then does another Upper Machine request to send the data to the Dual Memory address specified with the command (before any new data can be written into the same DPR buffer). The normal operations for a write are repeated with the memory address being changed to the dual address the processor loaded with the command. The ADGA will reset the DPR pointers to the beginning of the buffer and send the same data to the new address. When the transfer finishes the ADGA then makes the buffer in the DPR available.

The write process, in the normal or dual mode, is continued until the transfer count of the host specified operation is reached. The interface logic will generate an interrupt. The processor will poll on the interrupt register of the interface logic (i.e. SCSI, Channel Adapter etc.) looking for the interrupt bit to be set. When the processor detects this bit as set it will end the transfer and check for status. The processor will then disable the interface logic and ADGA.

Figure 10:
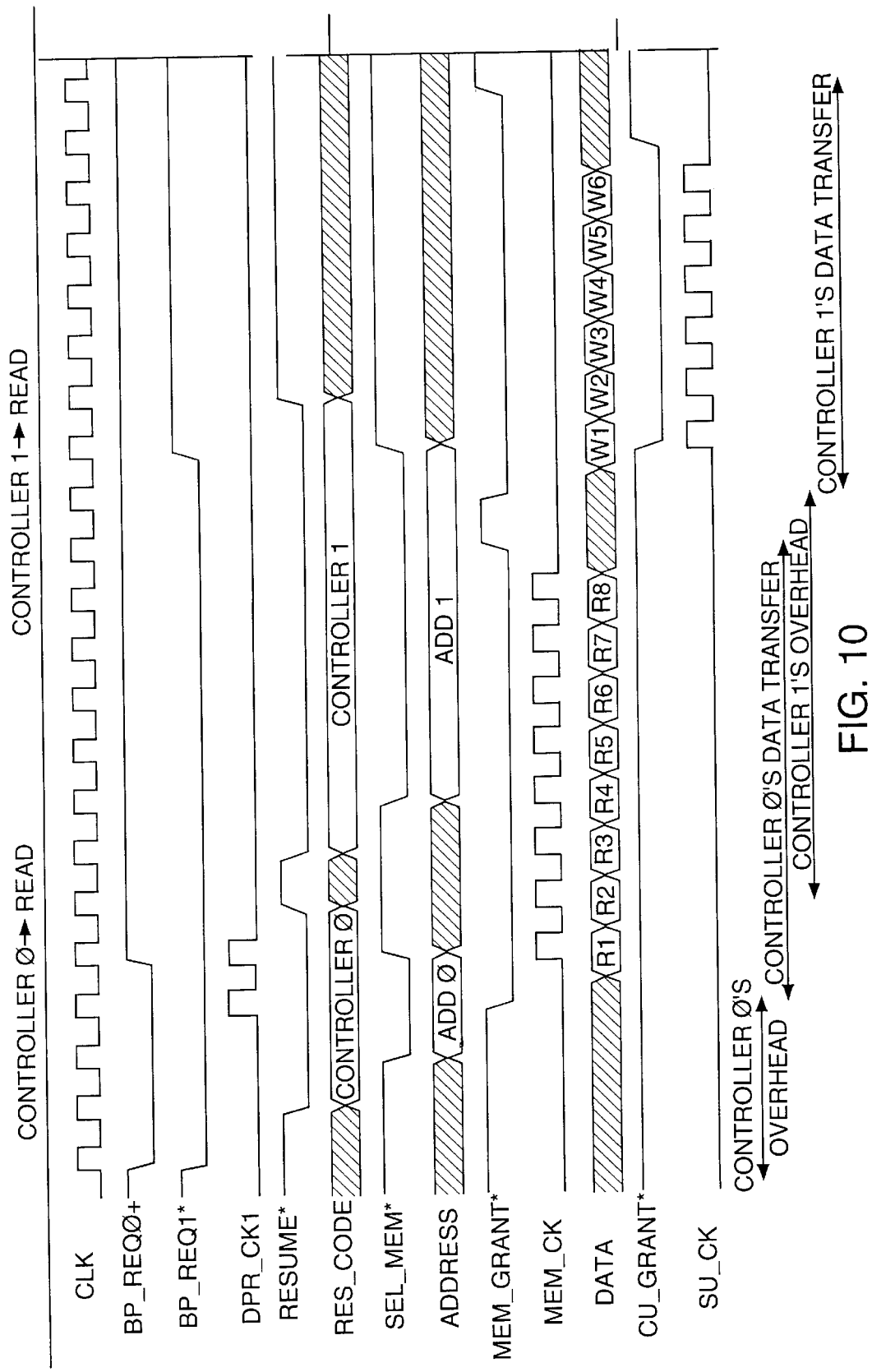
FIG. 10 is a timing diagram illustrating concurrent read and write by two controllers/Directors and timing relationships available with the pipelined architecture according to the invention.

Pipeline timing on reads and writes by different processors in the system according to the invention enjoy enhanced processing speeds due to the pipelining described, and the capability to time operations so as to have some overlap between operating processors as well as within a pipelines operation. As illustrated in FIG. 10, when one Director is transferring data (controller0), the bulk of a second (controller 1) Director's overhead can be effected i.e. memory words assembled, DPR buffers filled etc. With the pipeline stages described, upon completion of the overhead by the second Director (controller 1), its data can be effectively sitting on the backplane waiting for the first Director to relinquish the bus upon completion of the first Directors transfer, while the first director is undertaking a significant portion of its overhead, even during its data transfer. In effect, there will always be data available for transfer across the backplane to/from memory, maximizing utilization and minimizing latency associated with setup time.

Figure 11:
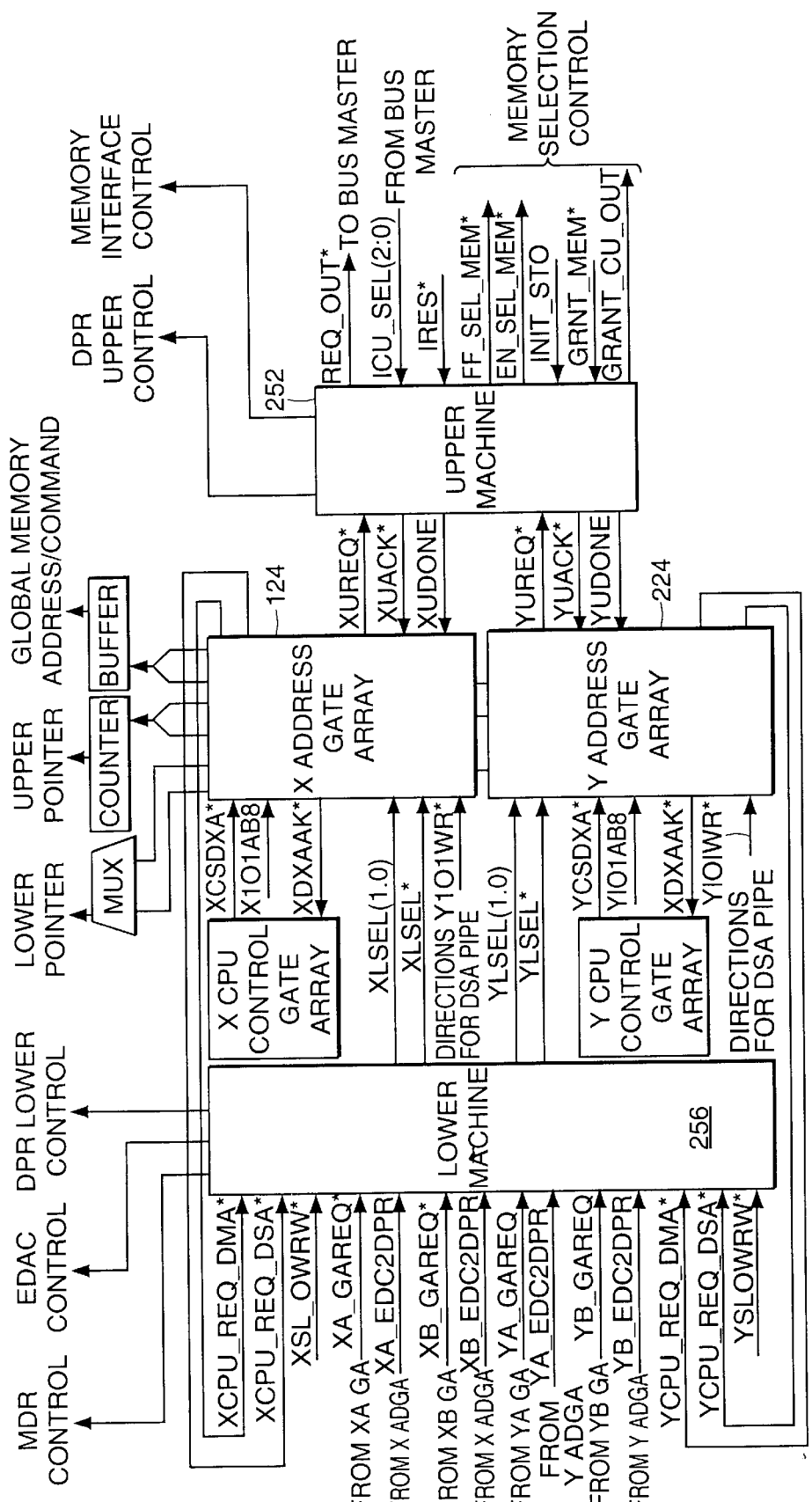
FIG. 11 is a block diagram of pipeline arbitration mechanisms.

Much of the pipeline hardware as described herein is common to and shared between the various pipes, e.g. the EDAC, DPR and Global Memory. Only one of the processors/pipes can use this hardware at any one time and has to arbitrate for it, although one pipe may use the upper side of DPR while another, or the same pipe uses the lower (leading to enhanced performance such as illustrated in FIG. 10). Although arbitration can be handled in any of various ways within the grasp of those skilled in the art, there is a division of arbitration responsibilities facilitating a number of arbitration stages implemented in the system described herein. Pipeline arbitration and control mechanisms are illustrated in FIG. 11. The Lower Machine 256, includes a lower arbiter that handles the lower or machine side of DPR 136. The EDAC is effectively transparent and goes with the lower side of DPR, as it is a pass-through device and will support whichever pipe has the DPR. The lower arbiter is contained in the Lower Machine PLD, illustrated in FIG. 12. There is one lower machine PLD per Director.

Figure 14:
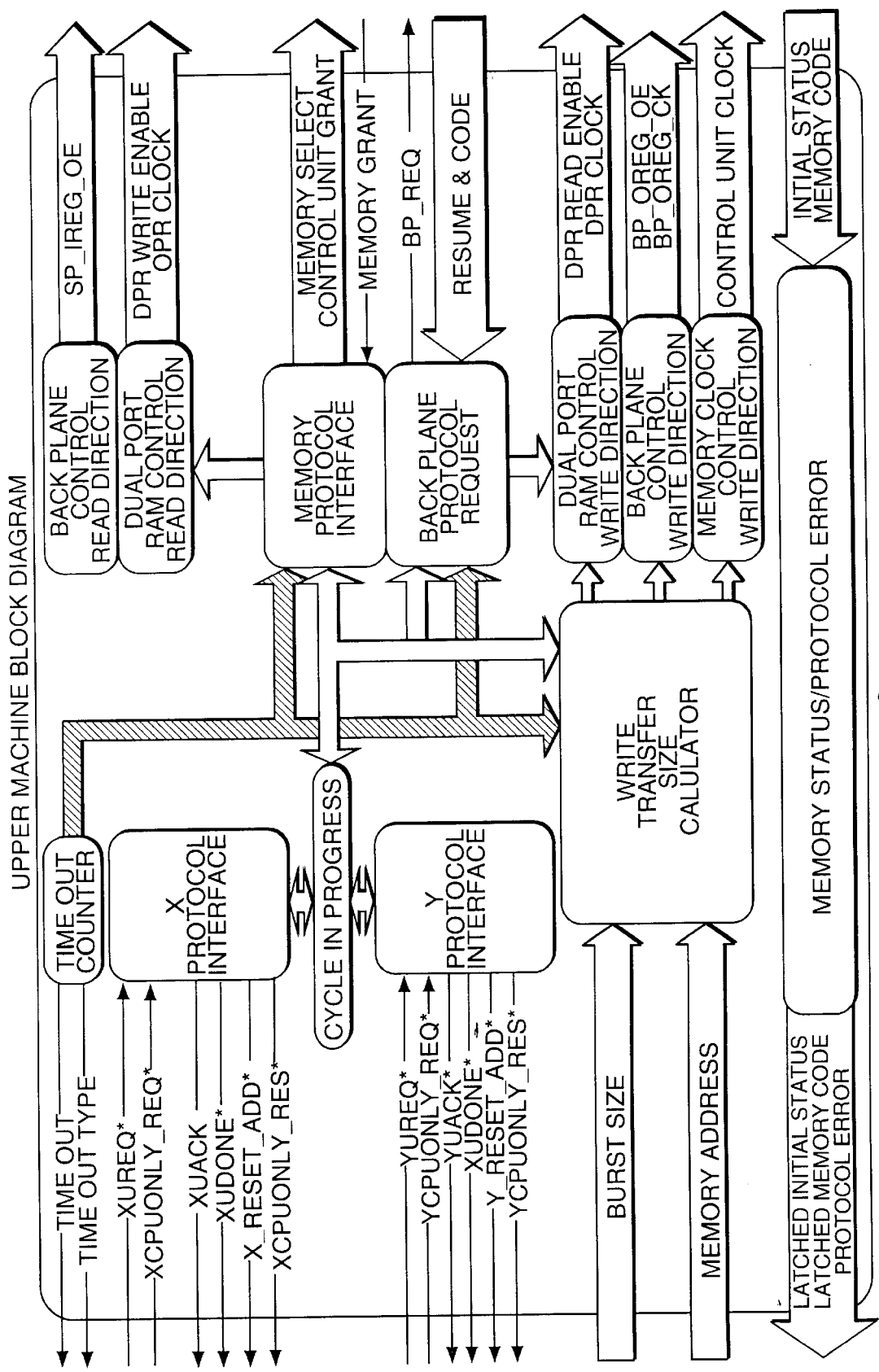
FIG. 14 is a block diagram of an Upper Machine implemented in the pipeline arbitration mechanisms of FIG. 11.

An upper arbiter handles the upper side of the DPR, that is the path from the upper side of the DPR to Global Memory. On the upper side, arbitration within a group, that is within "X" or "Y" pipes as described herein is handled by the X and Y ADGA respectively, while arbitration between the X and Y groups is handled by the upper arbiter in the Upper Machine PLD, which is illustrated in FIG. 14. There is one upper machine PLD per Director.

Figure 12:
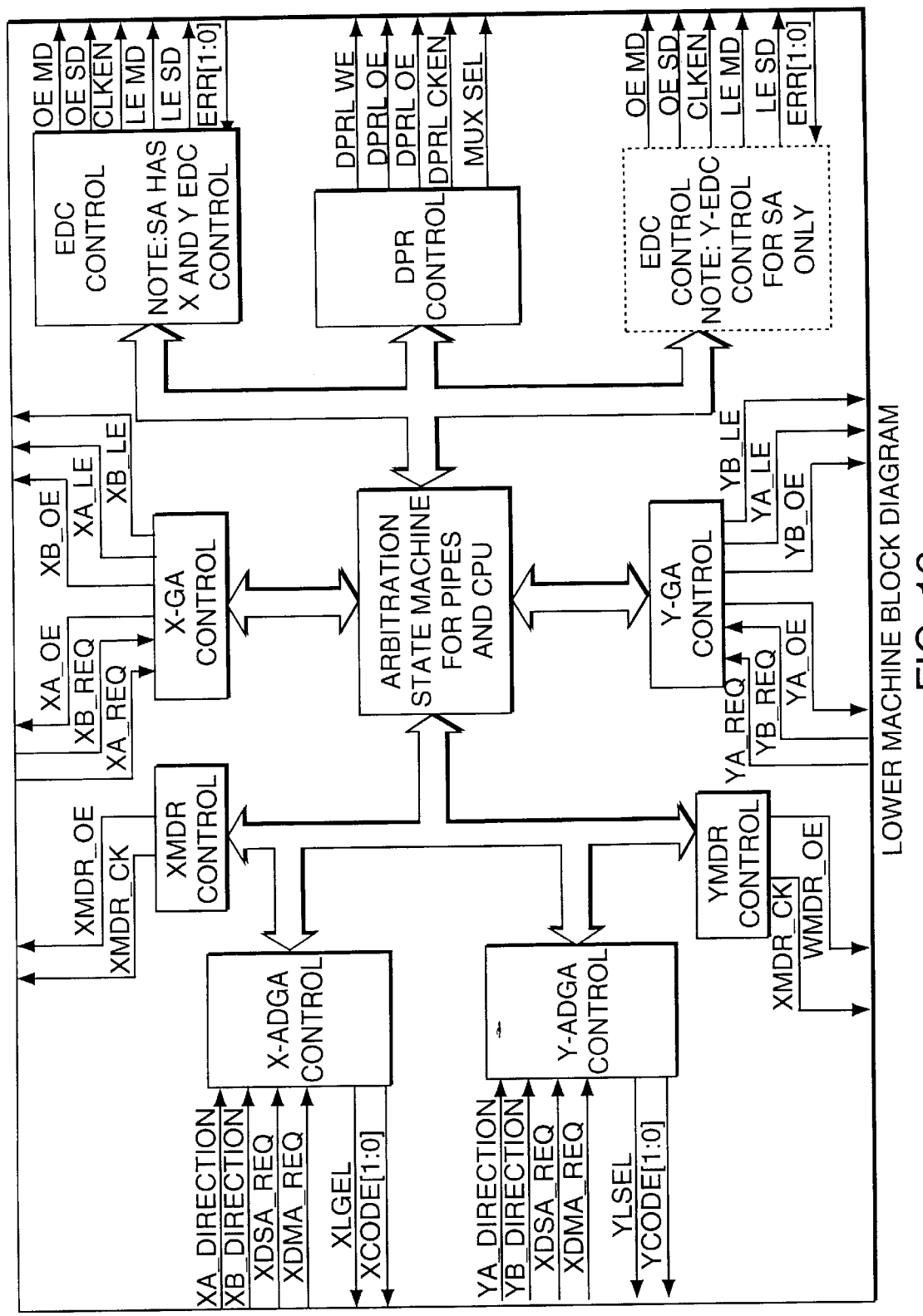
FIG. 12 is a block diagram of a Lower Machine implemented in the pipeline arbitration mechanisms of FIG. 11.
Figure 13:
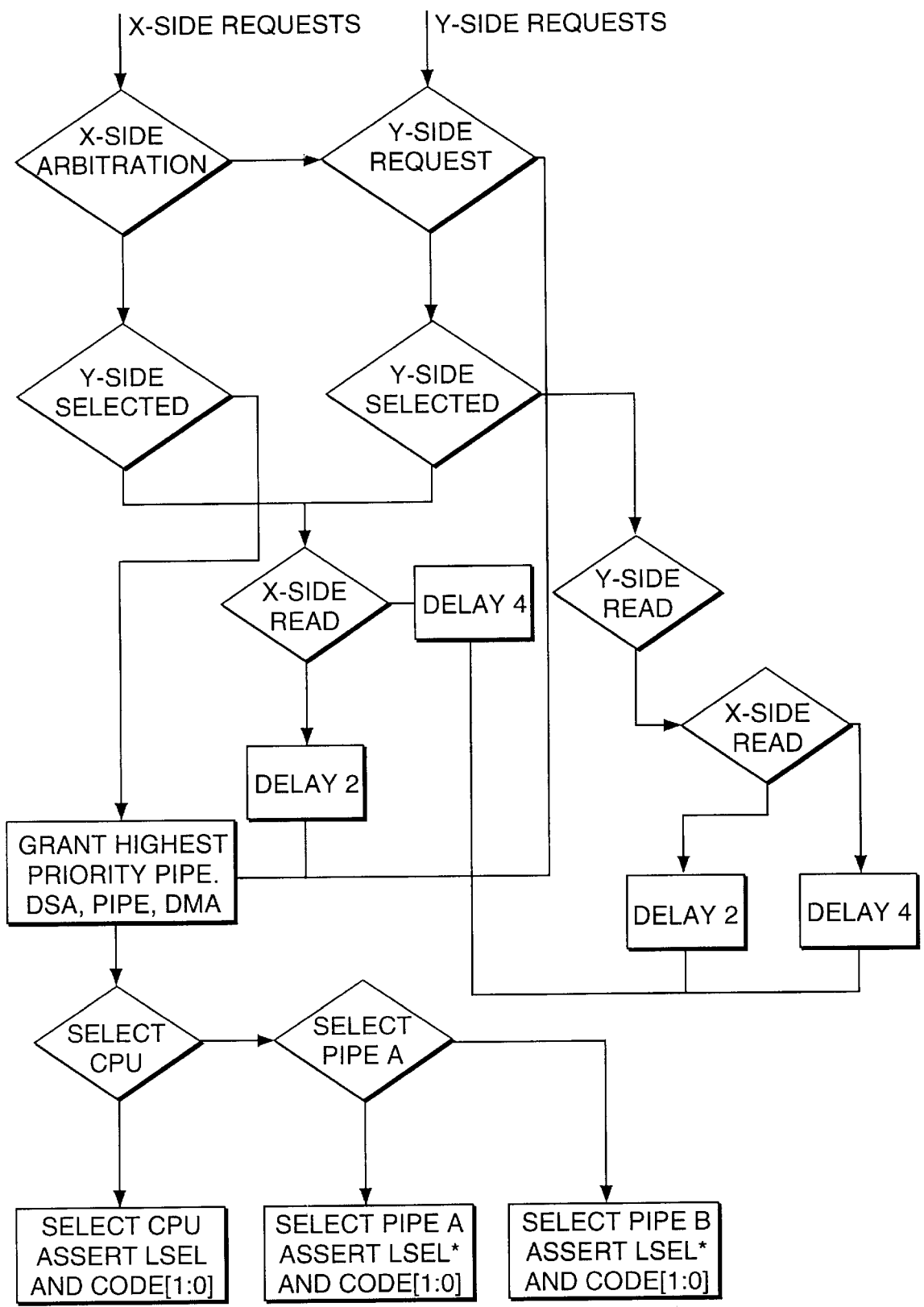
FIG. 13 is a flow chart illustrating Lower Machine operation for an X side read request.

Operation on the lower side of the DPR is under control of the Lower Machine PLD 256. The Lower Machine, as illustrated in FIGS. 12 and 13, takes care of: generation of DPR control signals for the lower side of the pipeline(s); generation of EDAC control signals; and generation of X and Y MDR control signals to effect the functionality described hereinbefore. The Lower machine also implements arbitration for the lower side of DPR. As there is only one bus on the lower side of the DPR (via the EDAC) this must be shared by all eight pipes on a Director. Only one pipe/processor can be active at a time. Any pipe wishing to use the lower side of DPR asserts its request line in to the lower arbiter contained in the Lower Machine PLD.

In the case of the A and B pipes the request line comes from the data gate array for the respective pipe, while for the DMA and DSA pipes it comes from the ADGA. For DMA/DSA requests, the ADGA receives a signal (#CSDXA) from the CPU Control gate array 111, 211 to indicate the start of a DMA or DSA cycle. From the state of the #IOAB bus bit-9 the CPU Control gate array determines if it is a DMA or DSA cycle and asserts a DMA or DSA request (#CPU__REQ__DSA or #CPU__REQ__DMA) as appropriate. The lower machine also receives a unique direction line for each pipe (#A__EDC2DPR for the A pipe and #B__EDC2DPR for the B pipe). These lines are driven as a function of the pipe command registers in the ADGA. A 68060 line (#SLOWRW*), generated as a function of the 68060 read/write line, determines the direction for the DMA/DSA pipes.

The lower arbiter, in the Lower Machine PLD evaluates all active requests for the lower side of DPR and grants access based on a defined priority scheme. There is cyclic priority between pipes in the X and Y groups, that is if a pipe from the X group had it last and there is currently a request active from both the X and Y groups, the Y group will be granted next. Within each group there is further prioritization. DSA is highest, DMA is next, while A/B are lowest with cyclic priority between A and B pipes.

Requests to use the lower side of DPR (and EDAC) are received from each pipe, from the pipe gate arrays in the case of the A and B pipes or from the Address gate array in the DMA/DSA case. In all there are 8 request lines, 4 associated with each processor, coming in to the arbiter in the Lower Machine. as illustrated in FIG. 12. In the case of the A or B pipes, the arbiter asserts the corresponding RESUME line of the pipe that has won arbitration. RESUME will remain asserted while that particular pipe has control of the low side of DPR. There are no resume lines for the DSA/DMA pipes. The arbiter also outputs a code on the XLSEL 1:0 lines and asserts XSEL* for the X side or on the YLSEL 1:0 lines and asserts YSEL* for the Y side. These lines are used by the Address GA 124, 224 to select the correct lower pointer to address the low side of the DPR 136. The signals XSEL* and YSEL* should never be asserted simultaneously (except for on the SA board). A mux is used to select between a lower pointer for the X or Y group. The DPR__MSB line, from the lower machine PLD controls the switching of this mux depending on the arbitration result, DPR__MSB=0 for X, and DPR__MSB=1 for Y.

The lower machine PLD receives "direction" signals for each pipe indicating the operation (EDC2DPR for the A and B pipes and SLOWRW* for the DMA/DSA). These signals are used to establish the correct control signal sequence to steer the data along the pipe for read or write operations. The device also captures the identification of the pipe that was active if/when the EDAC detects any single bit errors (SBE) or multi-bit errors (MBE) during a read. The SBE and MBE information is returned to the ADGA where it is reported as error status bits (7:6) of the error status register which is accessible to the 68060.

The Lower Machine looks at all pipes in effecting arbitration in the SA Director. All pipes are looked at substantially simultaneously for the purpose of minimizing the delay between activities undertaken by the pipes with the affect of ultimately reducing delay and interleaving memory accesses. In an example illustrated in FIG. 13, involving a single side, the X-side Pipe requests a read operation (on either Pipe A or Pipe B). The Lower Machine determines who has arbitration (X or Y side). If X wins the arbitration, the Lower Machine checks if the Y side is already selected. If Y is not selected then the highest priority pipe on the X-side gets the grant. If Y is selected, a determination is made as to whether it is a read or write. The Lower Machine only knows that Y is selected. It then has to check who is selected and what operation it is doing (i.e. read or write). Depending on what operation is being done, the Lower Machine will delay 2 or 4 clocks before granting highest priority on X-side. Again, the selective delay is a function of a determination of what the other pipes on the side are doing, and has the affect of optimizing (i.e. minimizing) delay between operations as a function of the determination. It should be noted that although one side (X) and one operation (Read) is involved in the example illustrated in FIG. 13, that the concept is extensible to include analysis of the other pipe and take into consideration other operations.

Operation on the Upper side of DPR and the memory interface is under control of the Upper Machine PLD 252, illustrated in FIG. 14. The Upper Machine PLD 252 takes care of arbitration for the upper side of DPR, while it also effects: generation of DPR control signals on the upper side only; transfer size calculation (from address and burst); write cycle clock generation; Memory Lock cycle implementation; Memory Interface Control; and Memory timeout generation in accordance with the functionality described hereinbefore.

On the upper side of the DPR 136, transfers between the DPR and Global memory, via the backplane register 254 on the Director and the memory interface, are managed by the Upper machine. Once again there is only one bus on the upper side, however the DPR is partitioned with the first and second buffer sections, of 32 memory words each, assigned for each pipe's use. Each of these sections can independently request global memory. Memory requests are generated when a particular section is full or at the end of a transfer (EOT) in the case of a write operation, or when a section is empty in the case of a read operation. The DPR controlling circuitry, internal to the ADGA monitors the pointer values and generates a global memory request when any DPR section requires service. In the event of multiple simultaneous requests within either of the X or Y group, the ADGA will arbitrate based on a defined priority structure.

Arbitration between the X and Y group is cyclic and is handled by the Upper Machine PLD. Assuming a pipe has won arbitration internally in the ADGA then the address gate array will assert an upper request line (#UREQ*) to the Upper Machine PLD. The upper machine receives two request lines, one for the X group (XUREQ*), and one for the Y group (YUREQ*). If both X and Y requests are active, the upper arbiter decides which will be allowed to proceed and responds by asserting acknowledge (#UACK*) to that group. The acknowledge remains asserted while the upper side of DPR is being used. The upper machine then has to initiate a memory cycle.

Initiation of the memory cycle commences with the upper machine looking for use of the bus/backplane by asserting a signal (REQ_OUT*). The signal (REQ_OUT) is buffered and routed off the board to a bus master (it should be noted that one of the Directors in a backplane is designated as a bus master as a function of its position in the back plane). Assuming the Director wins arbitration for the backplane the bus master responds by returning the 3-bit slot code which is routed into the Upper Machine PLD on ICU_SEL(2:0) lines. The bus master then asserts IRES* into the upper machine to indicate that the code on the ICU_SEL(2:0) lines is valid. When the upper machine sees the correct code while IRES* is asserted it then knows it has won the bus/backplane arbitration. The upper machine proceeds by attempting to select the memory board. The ADGA then outputs the pipe's associated upper pointer, memory address and drives the command lines. The upper machine then drives the memory interface and DPR upper side control lines. Data is transferred in a read or write transfer as described hereinbefore. On completion of the memory transfer or in the event of a memory timeout (request or select), the upper machine asserts #UDONE* back to the ADGA. In the case of a DSA write cycle the ADGA then asserts a signal (#DXAAK) back to the CPU Control gate array which then returns TA* to the processor to complete the cycle.

Back End, Global Memory-to-Disk Array Adapter

In the illustrative embodiment described herein, only one type of interface is implemented at the back-end (see e.g. FIG. 3E). The back end adapters moving data between the Global Memory and disk arrays are configured for moving data to/from an array of disks, each of which is configured for data transfers in accordance with a SCSI I/O protocol, which is described in detail in the IEEE technical publication incorporated by reference hereinbefore. The back end interface is implemented having a dual processor, pipelined architecture that is virtually identical to the architecture of the front end interfaces described hereinbefore.

Figure 15B:
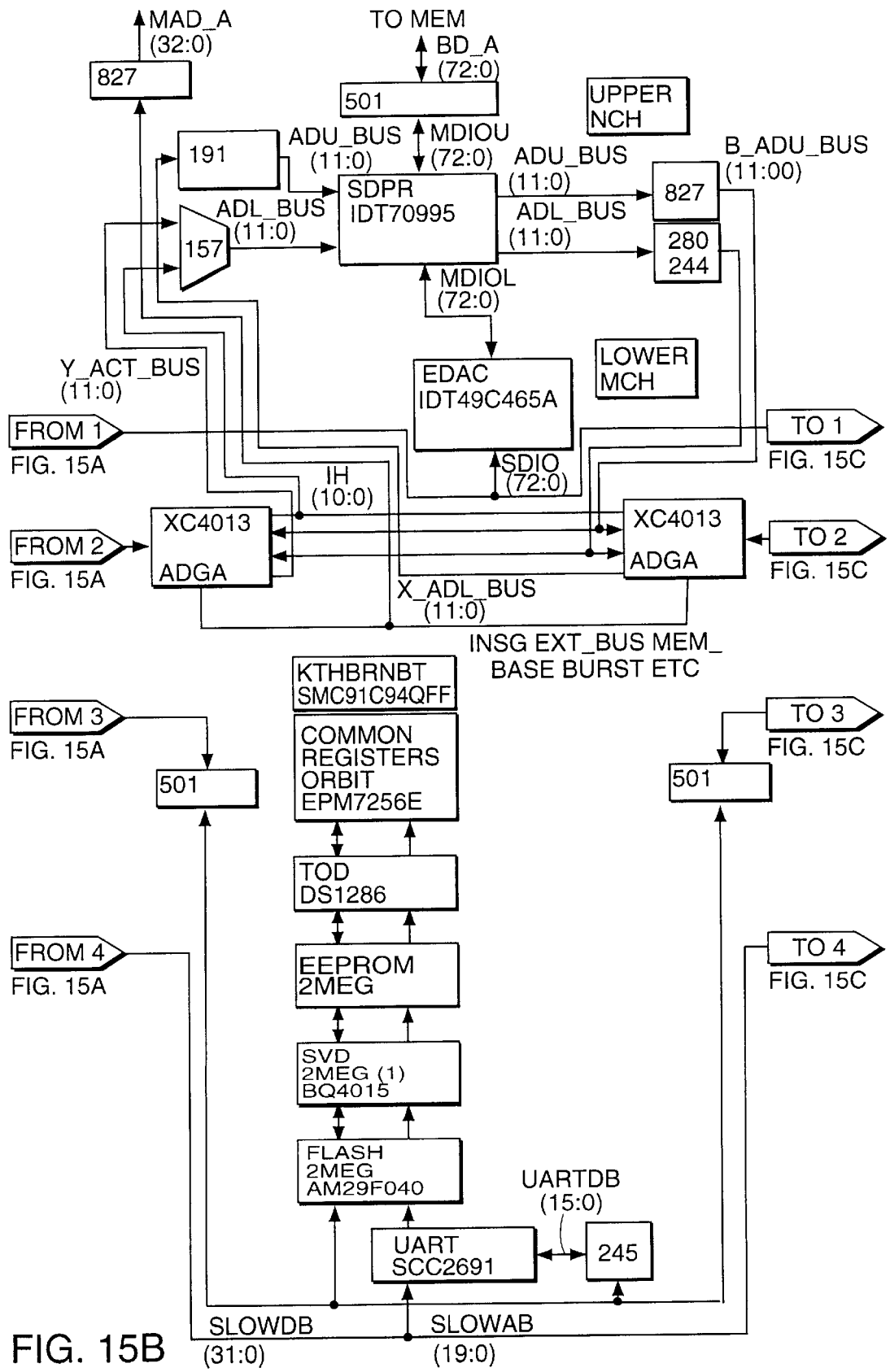
FIG. 15 is a block diagram of a single ended SCSI Global Memory to Disk array interface according to the invention.
Figure 15C:
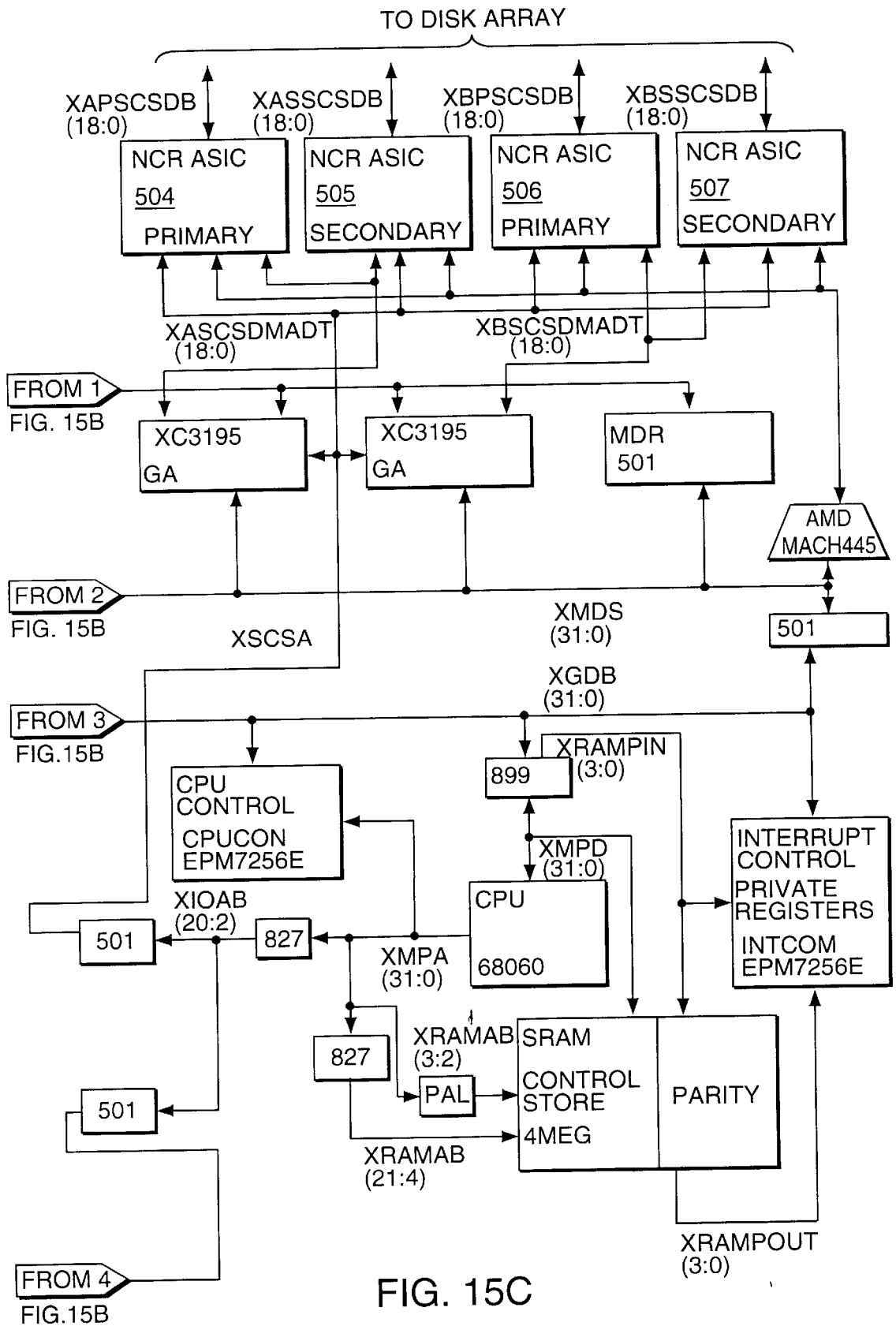
Figure 16A:
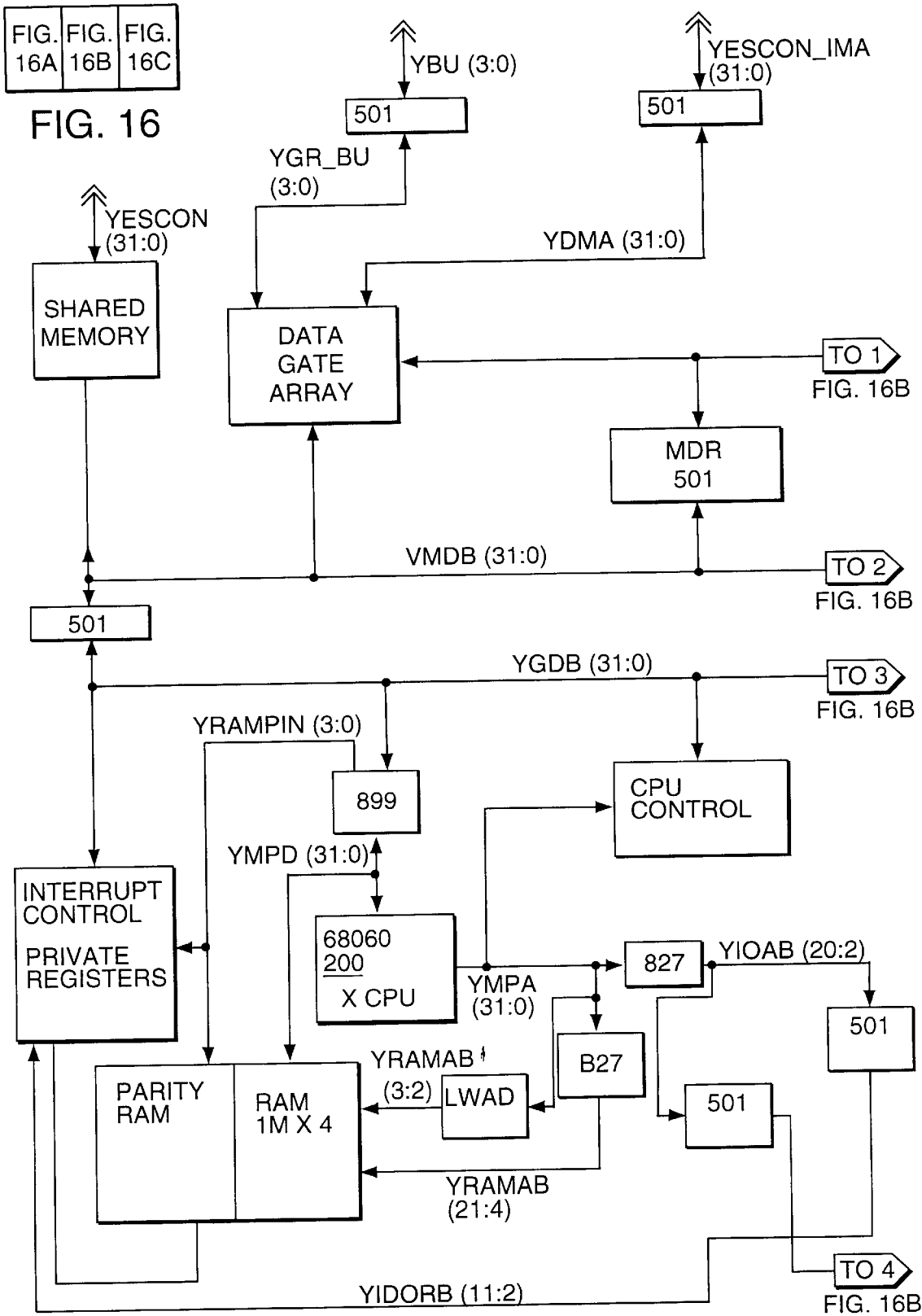
FIG. 16 is a block diagram of an ESCON host to Global Memory front end interface according to the invention.
Figure 16B:
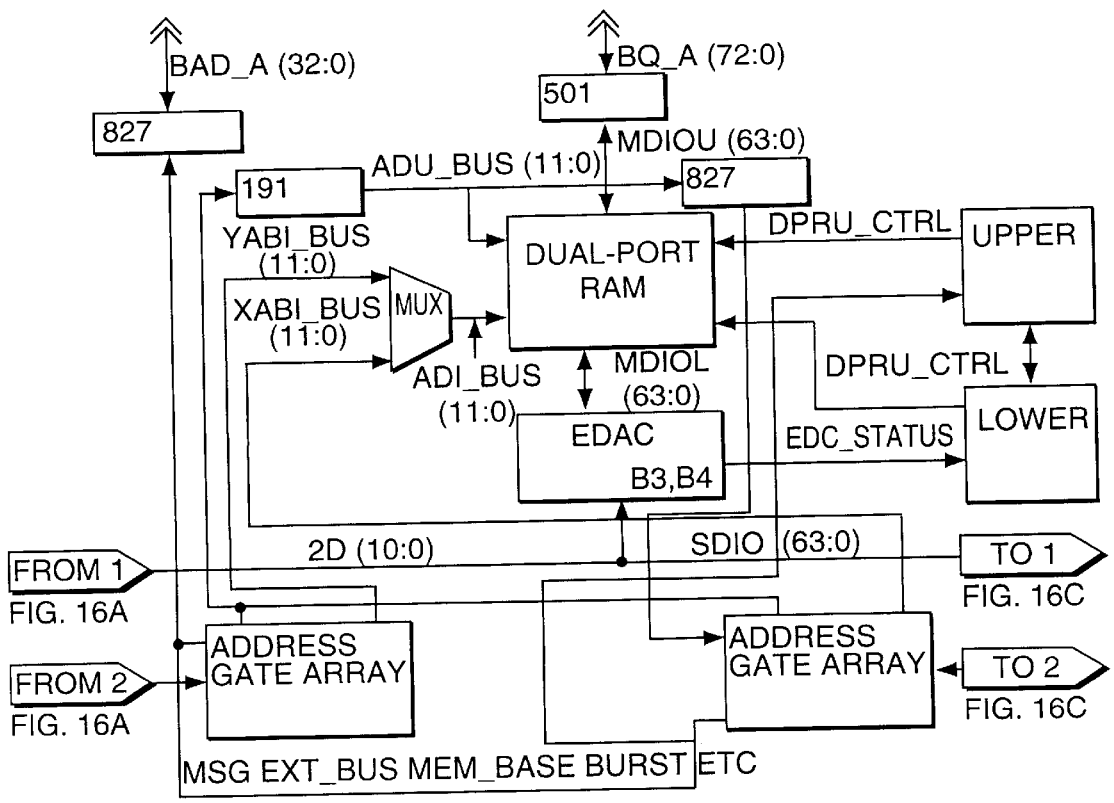
Figure 16B:
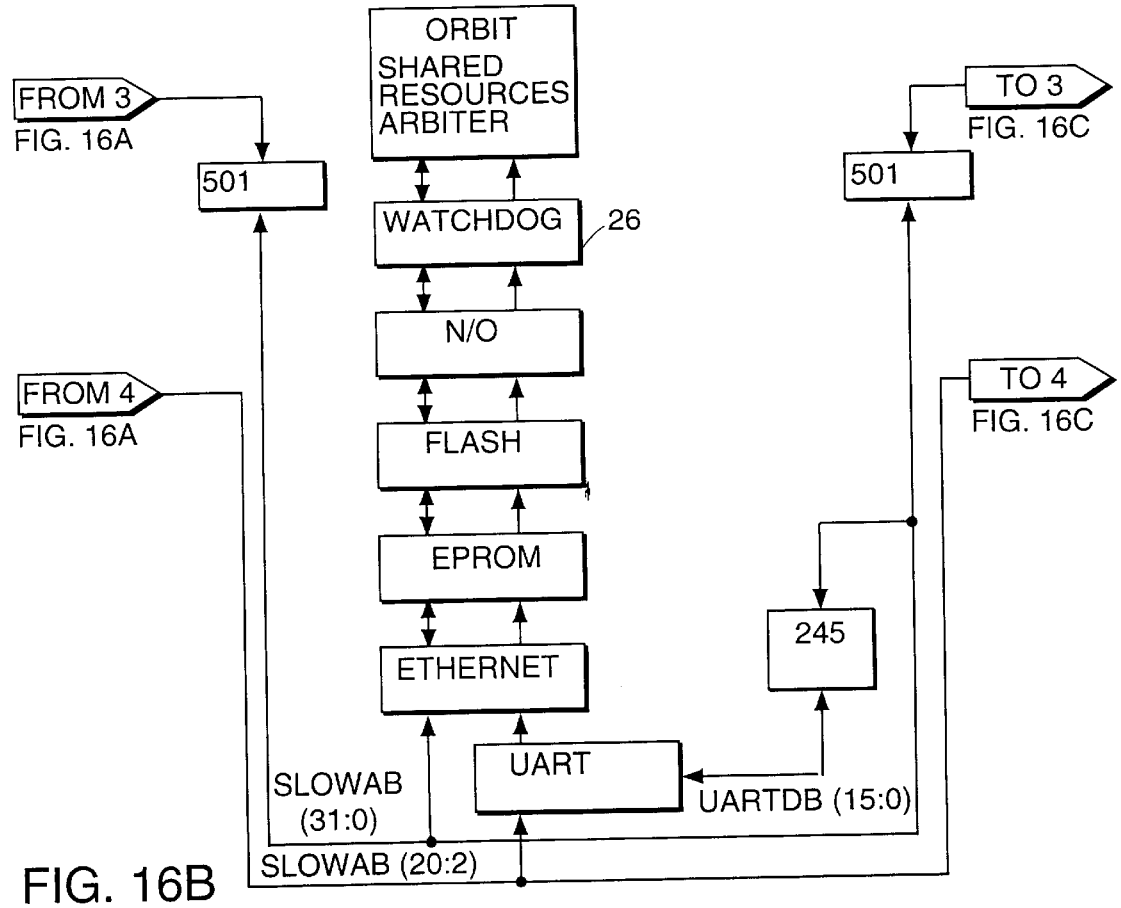
Figure 16C:
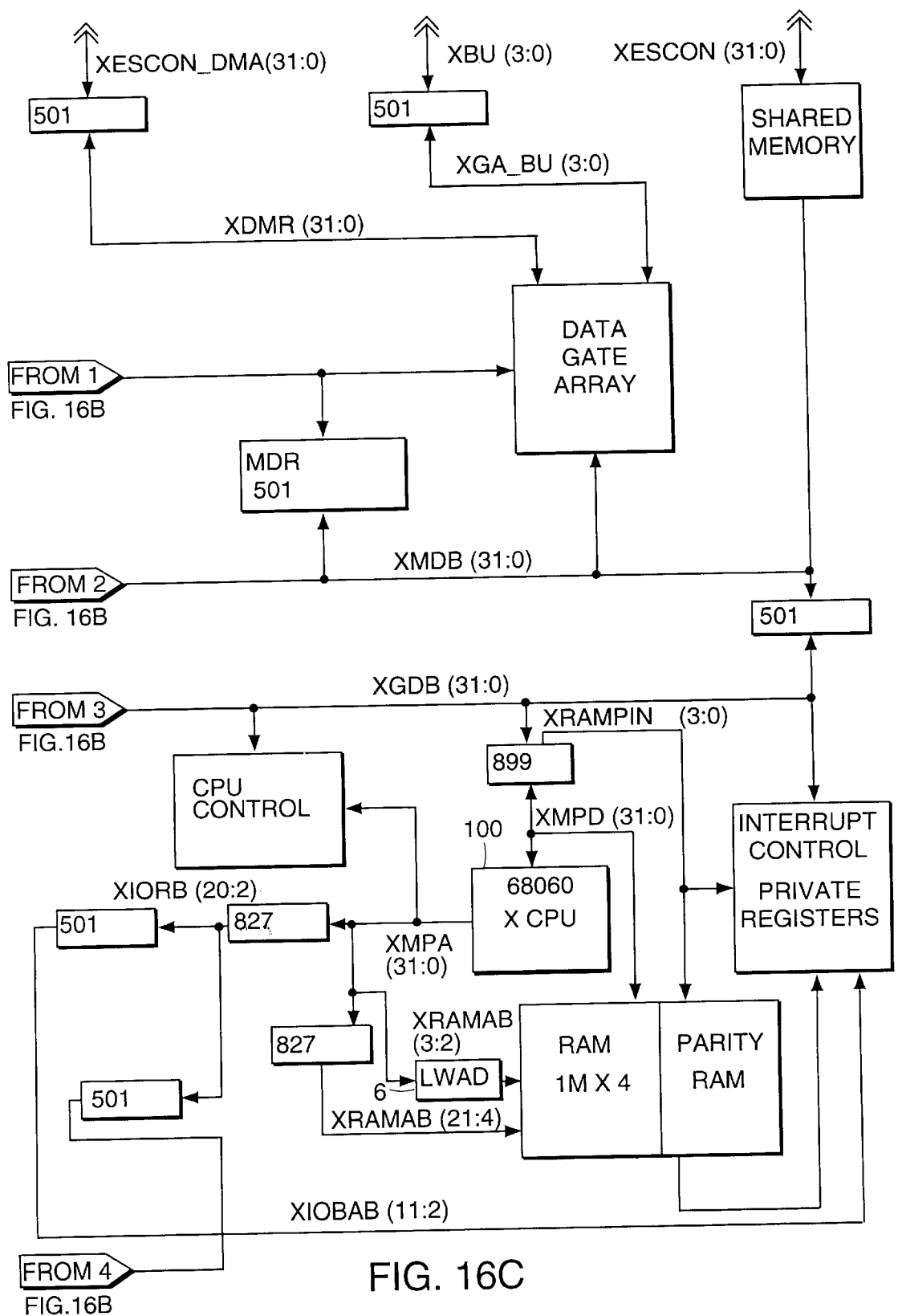

A back end SCSI Director (DA) board, illustrated in FIG. 15, includes X and Y sides based on dual 68060 microprocessors. The microprocessors have available the same shared resources that are accessed in accordance with the same CPLD (ORBIT). CPU control and Interrupt control are implemented in the same manner and via programmable logic devices. The pipelines are virtually identical in terms of structure and functionality. In the back end configuration of the architecture and concepts according to the invention, a different mode of the standard SCSI communication is implemented to communicate with the disk array(s). The SCSI chip described herein is configured in the back end implementation, as SCSI ASICs 500 though 507, in a mode using the built in drivers to directly drive a single ended SCSI bus. The chip has the selectable capability as a configuration option, to interface to single ended narrow (8 bit) or Wide (16 bit) drives.

Any difference in the implementation of the architecture described hereinbefore, configured as a front end interface or as a back end interface, is primarily a function of differences in the host I/O or disk array I/O interfaces, as will be appreciated by those skilled in the art.

Furthermore, as can be seen from the block diagram of an ESCON front end Director, illustrated in FIG. 16, the architecture according to the invention presents a flexible modular design that can be implemented in varied applications.

Similarly, the front end based on the IBM Bus and Tag interface or Channel is implemented with virtually identical architecture and function.

While the illustrative implementations of front end and back end adapters in the system described herein implemented X and Y sides based on dual 68060 microprocessors, it will be appreciated that alternative processors could be implemented in such an architecture, such as Pentium, PowerPC or the like.

While the system described herein can be implemented as an integrated cached disk array storing information at the back end to a plurality of disk drives forming a disk array, it should be appreciated that the system described hereinbefore can be implemented with storage devices other than disk drives, such as memory arrays or solid state devices, magneto-optical devices, or the like.

Furthermore, although the integrated cached storage system is described herein generally as receiving data from "a host" it will be appreciated that the system can be interfaced to plural hosts of a heterogeneous or homogeneous nature.

Although addressing in the Global Memory described herein is based on an odd/even memory bank structure assigning contiguous memory locations with sequential addresses, various alternative addressing arrangements are possible. That is, it will be appreciated by those skilled in the art that address mapping upon initialization can be effected in accordance with any of numerous organizational and logical addressing schemes, which will likewise have implications when decoding the address to determine its physical location with respect to the logical organization of memory.

Although the interface(s) described herein include host adapter portions in accordance with the IBM Bus and Tag and ESCON, and SCSI I/O standards, it should be appreciated that architecture and other aspects of the front and back end interfaces according to the invention can be implemented with other standard and/or proprietary host I/O interfaces, such as Fiber Channel, Serial SCSI Architecture (SSA), or the like.

Although the invention has been shown and described with respect to an illustrative embodiment thereof, various other changes, omissions and additions in the form and detail thereof may be made therein without departing from the spirit and scope of the invention.

What is claimed is:

1. An integrated cache storage system moving host data in accordance with a host I/O protocol between a host and at least one array of storage devices for storage of said host data in and retrieval of said host data from said at least one array of storage devices, comprising:

at least one front end adapter having a first front end control processor and a second front end control processor and at least a first front end pipeline and a second front end pipeline for transferring said host data under control of said first front end control processor and said second front end control processor respectively, each of said first and second front end pipeline including, an I/O portion receiving a portion of said host data from said host and converting said host data from said host I/O protocol into at least one memory word, said at least one front end adapter further including a front end buffer memory receiving said at least one memory word;

a cache memory configured to receive said at least one memory word from said front end buffer memory to temporarily store said at least one memory word; and at least one back end adapter having a first back end control processor and a second back end control processor and at least a first back end pipeline and a second back end pipeline for transferring said at least one memory word under control of said first back end control processor and said second back end control processor respectively, each of said first and second back end pipeline including, a back end buffer memory receiving said at least one memory word from said cache memory and an I/O portion receiving said memory word from said back end buffer memory and converting said at least one memory word into host data for transfer to said host according to said host I/O protocol.

2. The integrated cache storage system according to claim 1 wherein each of said first front end pipeline, said second front end pipeline, said first back end pipeline and said second back end pipeline further includes Error Detection and Correction circuitry between respective ones of said I/O portion and said buffer memory.

3. The integrated cache storage system according to claim 1 wherein said front end buffer memory comprises a first buffer memory section and a second buffer memory section and wherein said at least one memory word comprises a plurality of memory words and one of said first buffer memory section and said second buffer memory section is configured to receive a portion of said plurality of memory words from said I/O portion while the other of said first buffer memory section and said second buffer memory section is configured to transfer another portion of said plurality of memory words to said cache memory.

4. The integrated cache storage system according to claim 1 wherein said back end buffer memory comprises a first buffer memory section and a second buffer memory section and wherein said at least one memory word comprises a plurality of memory words and one of said first buffer memory section and said second buffer memory section is configured to receive a portion of said plurality of memory words from said cache memory while the other of said first buffer memory section and said second buffer memory section is configured to transfer another portion of said plurality of memory words to said I/O portion.

5. The integrated cache storage system according to claim 1 wherein said I/O portion of said at least one front end adapter converts data in accordance with one of a SCSI, Bus and Tag, and ESCON I/O protocol.

6. The integrated cache storage system according to claim 1 wherein said I/O portion of said at least one back end adapter converts data in accordance with a SCSI I/O protocol.

7. The integrated cache storage system according to claim 3 further including a bus transceiver configured to receive at least one memory word from one of said first memory buffer section and said second memory buffer section and to transfer said at least one memory word to a bus connected to said cache memory, and wherein said I/O portion of said front end adapter includes at least one memory word assembly register configured to transfer an assembled memory word to one of said first memory buffer section and said second memory buffer section:

wherein said system includes timing mechanisms that effect storage of at least one memory word in said bus transceiver available for transfer on said bus connected to said cache memory substantially simultaneous with loading of said at least one memory word in one of said first memory buffer section and said second memory buffer section while host data is received, converted and stored in said at least one memory word assembly register.

8. The integrated cache storage system according to claim 1 wherein said a least one front end adapter further includes first and second control stores storing a first control program for said first front end control processor and a second control program for said second front end control processor, said first control program and said second control program being substantially identical and specifying at least one memory address for accessing during execution, and wherein said at least one front end adapter includes a shared program memory having a first portion accessible to said first front end control processor and a second portion accessible to said second front end control processor, said first portion and said second portion having differing respective first and second address ranges, said at least one front end adapter having a transparency mechanism to receive said at least one memory address and determine which one of said first and second address ranges said at least one memory address is located in, and to determine a corresponding memory address in one of said first and second address ranges in which said at least one memory address is not located.

9. The integrated cache storage system according to claim 1 wherein said at least one front end adapter is configured to transfer said portion of host data from said host and to convert said portion of host data into said at least one memory word stored in said buffer memory. and wherein said at least one front end adapter is configured to write said at least one memory word in said cache memory in each of a first address and a second address.

10. A controller transferring data from a source to a destination, comprising:

a first control processor controlling at least a first pipeline selectable to transfer at least a first portion of said data from said source to said destination;

a second control processor controlling at least a second pipeline selectable to transfer at least a second portion of said data from said source to said destination;

a control program run by both said first control processor and said second control processor to control said first pipeline and said second pipeline to transfer said at least said first portion and said at least said second portion of data from said source to said destination, said control program specifying at least one memory address for accessing during execution;

shared resource memory having a first portion accessible to said first control processor and a second portion accessible to said second control processor, said first portion and said second portion having different respective first and second address ranges; and a transparency mechanism receiving said at least one memory address and determining which one of said first address ranges said at least one memory address is located in for access by said first control processor, and determining a corresponding memory address in said second address range in which said at least one memory address is not located for access by said second control processor.

11. The controller of claim 10 electrically connected to a cache memory for receiving said data after leaving said source and prior to arriving at said destination, said cache memory configured to receive data from and transfer data to said first pipeline and said second pipeline, wherein said first and second pipelines each include an I/O portion receiving host data from a host connected to said controller said host data being in accordance with a host I/O protocol, said I/O portion converting said host data into at least one memory word, said controller further including a buffer memory receiving said at least one memory word from said I/O portion configured to transfer said at least one memory word to said cache memory.

12. The controller of claim 11 wherein said buffer memory comprises a first buffer memory section and a second buffer memory section and wherein said at least one memory word comprises a plurality of memory words and one of said first buffer memory section and said second buffer memory section is configured to receive a portion of said plurality of memory words from said I/O portion while the other of said first buffer memory section and said second buffer memory section is configured to transfer another portion of said plurality of memory words to said cache memory.

13. The controller of claim 11 wherein said I/O portion converts data in accordance with one of a SCSI, Bus and Tag, and ESCON I/O protocol.

14. The controller of claim 10 electrically connected to a cache memory storing at least one memory word and said first pipeline and said second pipeline are configured to receive said at least one memory word from said cache memory, wherein each of said first and second pipelines include, a buffer memory configured to receive said at least one memory word from said cache memory and an I/O portion receiving said at least one memory word from said buffer memory and converting said at least one memory word into host data for transfer to a host according to a host I/O protocol.

15. The controller of claim 14 wherein said buffer memory comprises a first buffer memory section and a second buffer memory section and wherein said at least one memory word comprises a plurality of memory words and one of said first buffer memory section and said second buffer memory section is configured to receive a portion of said plurality of memory words from said cache memory while the other of said first buffer memory section and said second buffer memory section is configured to transfer another portion of said plurality of memory words to said I/O portion.

16. The controller of claim 10 wherein said I/O portion converts data in accordance with a SCSI I/O protocol.

17. The controller of claim 12 further including a bus transceiver configured to receive said portion of said plurality of memory words from one of said first memory buffer section and said second memory buffer section and to transfer said at least one memory word to a bus connected to said cache memory, and wherein said I/O portion includes at least one memory word assembly register configured to transfer an assembled memory word to one of said first memory buffer section and said second memory buffer section, wherein said system includes timing mechanisms that effect storage of at least one memory word in said bus transceiver available for transfer on said bus connected to said cache memory substantially simultaneous with loading of said at least one memory word in one of said first memory buffer section and said second memory buffer section while data is received for conversion into a memory word and stored in said at least one memory word assembly register.

18. The controller of claim 10 wherein said controller is implemented in an integrated cache disk array system, said source is a host computer and said data is host data transferred in accordance with a host I/O protocol, and said destination is at least one array of disk drives for storage of said host data in and retrieval of said host data from said at least one array of disk drives.

19. The controller of claim 12 wherein said controller is configured to transfer said host data from said host computer and to convert said host data into said at least one memory word stored in said buffer memory, and wherein said at least one controller is configured to write said at least one memory word in said cache memory in each of a first address and a second address.

20. A method of pipelining data for transfer between a data source and a data destination, said method comprising the steps of:

receiving data from said data source during a write operation and assembling said data into a plurality of data destination words;

storing each of said plurality of data destination words individually in at least one register pipeline stage;

configuring a first and a second buffer memory, said first and said second buffer memory being in communication with said at least one register pipeline stage to receive respective ones of each of said plurality of data destination word therefrom;

transferring a first write portion of said plurality of data destination words into said first buffer memory until a first selected number of data destination words are transferred to said first buffer memory;

transferring said first write portion of said plurality of data destination words from said first buffer memory to said data destination until said first selected number of data destination words are transferred from said first buffer memory to said data destination;

transferring a second write portion of said plurality of data destination words assembled and stored in said at least one register pipeline stage into said second buffer memory until a second selected number of data destination words are transferred to said second buffer memory, while said step of transferring said first write portion of said plurality of data destination words from said first buffer memory to said data destination is taking place; and transferring said second write portion of said plurality of data destination words from said second buffer memory to said data destination until said second selected number of data destination words are transferred from said second buffer memory to said data destination, while said first buffer memory is available to receive another write portion of said plurality of data destination words assembled for transfer by said at least one register pipeline stage.

21. The method of claim 20 wherein said at least one register pipeline stage comprises a first register pipeline stage and a second register pipeline stage, said first register pipeline stage is configured to receive said data and assemble said data into respective ones of said plurality of data destination words, and said second register pipeline stage is configured to receive said respective ones of said plurality of data destination words from said first register pipeline stage and to transfer said respective ones of said plurality of data destination words to one of said first buffer memory and said second buffer memory.

22. The method of claim 20 wherein said first and second buffer memory are configured using dual port random access memory (DPR) and wherein a first port of said DPR is configured for handling data transferred between said DPR and said data source, and a second port is configured for handling data transferred between said DPR and said data destination.

23. The method of claim 20 wherein each of said plurality of data destination words is processed by an error detection and correction mechanism prior to being received by said first buffer memory and said second buffer memory.

24. The method of claim 20 wherein each of said plurality of data destination words comprises 64 bits of data and 8 Error Correction Code bits and said first selected number of data destination words and said second selected number of data destination words each equal 32.

25. The method of claim 20 wherein said steps of transferring said first portion of said plurality of data destination words from said first buffer memory to said data destination and transferring said second portion of said plurality of data destination words from said second buffer memory to said data destination include passing each of said plurality of data destination words from one of said first buffer memory and said second buffer memory to a data transceiver for holding until said data destination is available to receive each of said plurality of data destination words.

26. The method of claim 20 wherein said data source is a computer system and wherein said data destination is a cache memory in an integrated cache disk array.

27. The method of claim 20 further including the steps of:
receiving each of a plurality of data destination words from said data destination during a read operation;
transferring a first read portion of said plurality of data destination words into said first buffer memory until said first selected number of data destination words are transferred to said first buffer memory;
storing each of said first read portion of said plurality of data destination words individually in said at least one register pipeline stage, disassembling each individual data destination word into data and passing said data to said data source;
transferring a second read portion of said plurality of data destination words into said second buffer memory until said second selected number of data destination words are transferred to said second buffer memory, while said step of storing each of said first read portion of said plurality of data destination words individually in said at least one register pipeline stage is taking place; and
storing each of said second read portion of said plurality of data destination words from said second buffer memory individually into said at least one register pipeline stage, disassembling each individual data destination word into data and passing said data to said data source, while said first buffer memory is available to receive another portion of said plurality of data destination words from said data destination.

28. The method of claim 27 wherein said at least one register pipeline stage comprises a first register pipeline stage and a second register pipeline stage, said second register pipeline stage is configured to receive said destination data words from said first buffer memory and said second buffer memory and to pass said destination data words to said first pipeline stage, and said first pipeline stage is configured to disassemble said data destination words into data and to transfer said data to said data source.

29. The method of claim 27 wherein each of said plurality of data destination words is processed by an error detection and correction mechanism prior to being received by said at least one register pipeline stage.

\* \* \* \* \*